US011601187B2

(12) United States Patent
Ashworth et al.

(10) Patent No.: US 11,601,187 B2
(45) Date of Patent: Mar. 7, 2023

(54) CARRIER-AGGREGATION REPEATER

(71) Applicant: Wilson Electronics, LLC, St. George, UT (US)

(72) Inventors: Christopher Ken Ashworth, Toquerville, UT (US); Dale Robert Anderson, Colleyville, TX (US); Patrick Lee Cook, Cedar City, UT (US)

(73) Assignee: Wilson Electronics, LLC, St. George, UT (US)

( * ) Notice: Subject to any disclaimer, the term of this patent is extended or adjusted under 35 U.S.C. 154(b) by 87 days.

(21) Appl. No.: 16/852,074

(22) Filed: Apr. 17, 2020

(65) Prior Publication Data

US 2020/0336199 A1    Oct. 22, 2020

Related U.S. Application Data

(60) Provisional application No. 62/835,407, filed on Apr. 17, 2019.

(51) Int. Cl.
*H04B 7/155*    (2006.01)

(52) U.S. Cl.
CPC .................................. *H04B 7/155* (2013.01)

(58) Field of Classification Search
CPC ....... H04B 3/56; H04B 7/04; H04W 72/0453; H04W 16/24; H04W 24/02; H04W 36/22; H04W 84/047; H04W 24/04; H04W 52/52

See application file for complete search history.

(56) References Cited

U.S. PATENT DOCUMENTS

| 4,776,032 A | 10/1988 | Odate et al. |
| 5,303,395 A | 4/1994 | Dayani |
| 5,737,687 A | 4/1998 | Martin et al. |
| 5,777,530 A | 7/1998 | Nakatuka |
| 5,835,848 A | 11/1998 | Bi et al. |
| 6,005,884 A | 12/1999 | Cook et al. |
| 6,711,388 B1 | 3/2004 | Neitiniemi |
| 6,889,033 B2 | 5/2005 | Bongfeldt |

(Continued)

FOREIGN PATENT DOCUMENTS

EP    1525678 B1    7/2008

OTHER PUBLICATIONS

3GPP TS 36.104 V16.1.0 (Mar. 2019) TABLE 1 , pp. 1, 29-30.*

(Continued)

*Primary Examiner* — Khalid W Shaheed
(74) *Attorney, Agent, or Firm* — Thorpe North & Western LLP

(57) ABSTRACT

A technology is described for a repeater. A repeater can comprise: a server port; a donor port; a first uplink (UL) filtering and amplification path coupled between the server port and the donor port, wherein the first UL filtering and amplification path is configured to filter an UL signal of a first frequency range; a first downlink (DL) filtering and amplification path coupled between the server port and the donor port, wherein the first DL filtering and amplification path is configured to filter a DL signal of the first frequency range; and a second DL filtering and amplification path coupled between the server port and the donor port, wherein the second DL filtering and amplification path is configured to filter a DL signal of a second frequency range.

41 Claims, 20 Drawing Sheets

(56) References Cited

U.S. PATENT DOCUMENTS

| | | |
|---|---|---|
| 6,990,313 B1 | 1/2006 | Yarkosky |
| 7,035,587 B1 | 4/2006 | Yarkosky |
| 7,221,967 B2 | 5/2007 | Van Buren et al. |
| 7,974,573 B2 | 7/2011 | Dean |
| 2002/0044594 A1 | 4/2002 | Bongfeldt |
| 2003/0123401 A1 | 7/2003 | Dean |
| 2004/0137854 A1 | 7/2004 | Ge |
| 2004/0146013 A1 | 7/2004 | Song et al. |
| 2004/0166802 A1 | 8/2004 | McKay, Sr. et al. |
| 2004/0219876 A1 | 11/2004 | Baker et al. |
| 2004/0235417 A1 | 11/2004 | Dean |
| 2005/0118949 A1 | 6/2005 | Allen et al. |
| 2006/0084379 A1 | 4/2006 | O'Neill. |
| 2007/0071128 A1 | 3/2007 | Meir et al. |
| 2007/0188235 A1 | 8/2007 | Dean |
| 2008/0081555 A1 | 4/2008 | Kong et al. |
| 2008/0096483 A1 | 4/2008 | Van Buren et al. |
| 2008/0278237 A1 | 11/2008 | Blin |
| 2011/0151775 A1 | 6/2011 | Kang et al. |
| 2011/0170476 A1* | 7/2011 | Shapira et al. ....... H04L 12/413 370/328 |
| 2014/0072298 A1* | 3/2014 | Hou ................. H04B 10/11 398/16 |
| 2015/0009889 A1* | 1/2015 | Zhan ................. H04B 7/15542 370/315 |
| 2018/0331752 A1* | 11/2018 | Ashworth .......... H04B 7/15507 |

OTHER PUBLICATIONS

3GPP TS 38.104 (Release Jan. 15, 2019) TABLE 2-3, pp. 1, 41.*

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

* cited by examiner

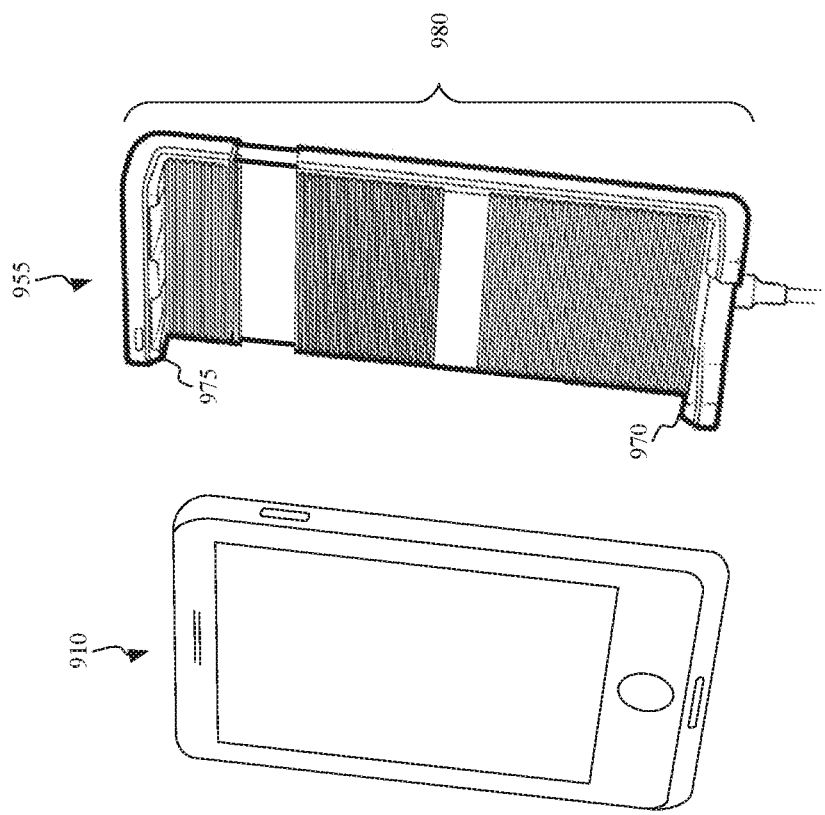

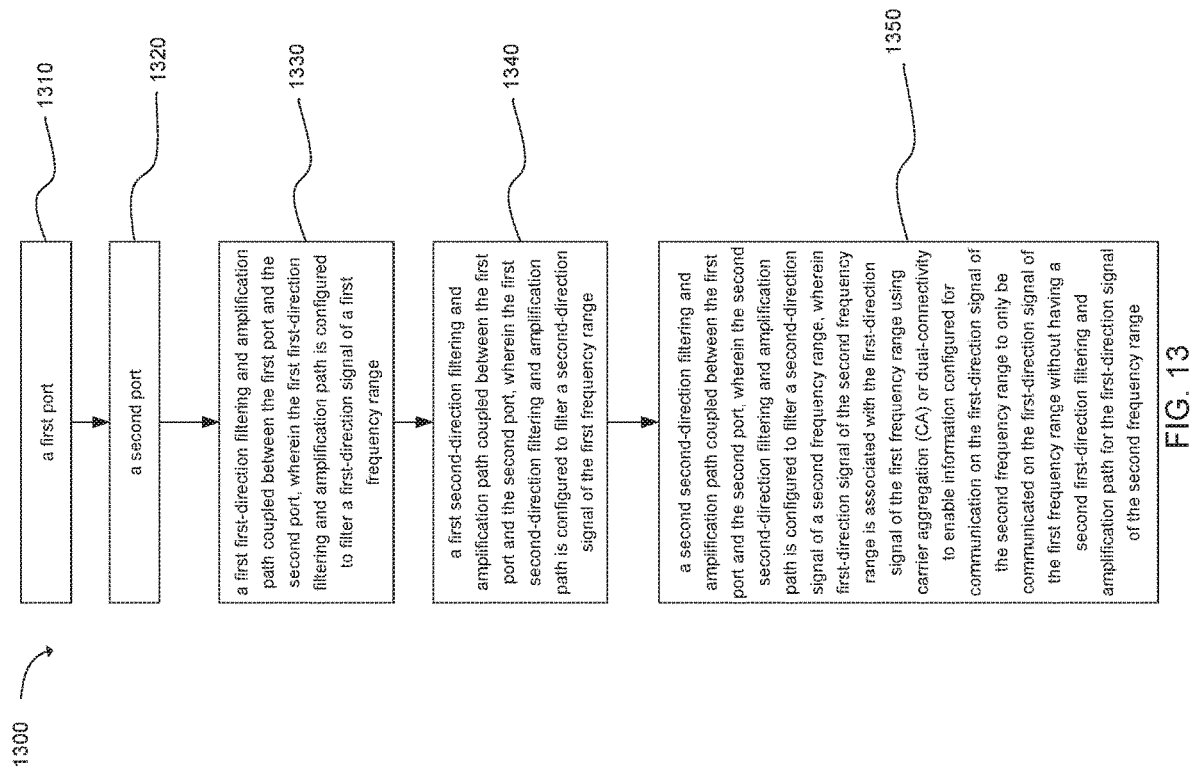

CARRIER-AGGREGATION REPEATER

RELATED APPLICATIONS

The present application claims the benefit of U.S. Provisional Patent Application No. 62/835,407, filed Apr. 17, 2019, the entire specification of which is hereby incorporated by reference in its entirety for all purposes.

BACKGROUND

Repeaters can be used to increase the quality of wireless communication between a wireless device and a wireless communication access point, such as a cell tower. Repeaters can improve the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 9b illustrates a cradle in accordance with an example;

FIG. 13 depicts a repeater in accordance with an example.

Figure 1:
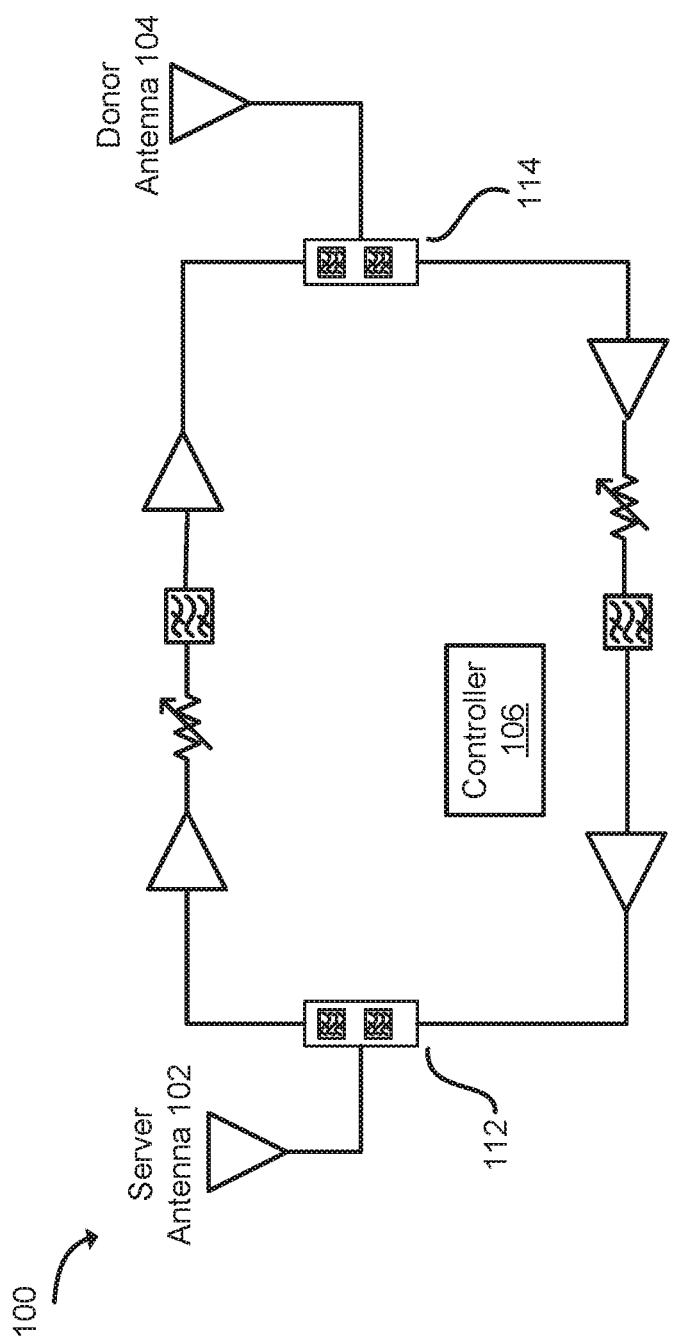
FIG. 1 illustrates a repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Regulatory entities, such as the Federal Communications Commission (FCC), do not allow cellular repeaters, such as consumer signal boosters to amplify some cellular bands because of potential interference with adjacent bands. Companies have commented to the FCC that repeater operation on some Third Generation Partnership Project (3GPP) long term evolution (LTE) frequency bands (e.g., 3GPP LTE frequency band 30) can interfere on adjacent, occupied frequency bands. Even when repeater operation on some 3GPP LTE frequency bands (e.g., 3GPP LTE frequency band 41) does not present an interference concern to some carriers, regulatory entities may still prohibit cellular repeaters from boosting on those frequency bands because of potential in-band interference to incumbents or shared users.

3GPP LTE frequency band 30 (B30) is a frequency division duplex (FDD) frequency band that includes an uplink operating band with a range of 2305 megahertz (MHz) to 2315 MHz and a downlink operating band with a range of 2350 MHz to 2360 MHz.

In some situations, operation on B30 uplink (UL) can present a greater interference concern than the interference concern presented by B30 downlink (DL). For example, a repeater typically amplifies and transmits an uplink signal over a relatively large distance to a base station. The distance to the base station can be several kilometers. The transmission of an amplified signal over this distance, which may potentially interfere with signals on adjacent, occupied frequency bands, can be problematic.

However, repeaters are typically configured differently for the transmission of downlink signals than uplink signals. Amplified downlink signals are typically only transmitted a short distance by a repeater. The actual distance can depend on the type of repeater. The distance may be from several centimeters to several meters. Due to the shorter range of transmission of the downlink signal, it is possible to spatially isolate the downlink signal that is amplified and transmitted by a repeater to a selected area. The transmission of the downlink signal in just the selected area can reduce interference with adjacent, occupied frequency bands in other locations.

In such a situation, operation of a repeater configured to amplify a downlink band, such as B30 DL, can enhance the downlink data-rate of a user equipment (UE) receiving an amplified downlink signal from the repeater. For example, a downlink-only repeater might be able to amplify a downlink signal of an operating band without re-transmission using the uplink operating band. However, one-way consumer signal boosters are prohibited by some regulatory bodies (as provided by FCC Part 20 or 47 Code of Federal Regulations (C.F.R.) Part 20.21 (Mar. 21, 2013)).

Cellular communication standards, such as the 3GPP LTE Releases 8-16, typically use both UL and DL communication between a UE and a base station (BS) to enable a wireless link to function. Downlink signals are used to send the UE information to allow a data link to be formed with the UE. The downlink signal from the base station sends information that includes, but is not limited to, signal power information (i.e. reference signals), distance information of the UE from the base station, and time and frequency grants for the UE to transmit data back to the base station. In addition, the UE can send control information used to maintain the data link with the base station. The control information sent by the UE can be referred to as uplink control information (UCI). UCI information includes, but is not limited to, acknowledgment (ACK) non-acknowledgement (NACK) information for information received on a downlink, channel quality information, such as channel state information, modulation and coding scheme information, scheduling requests, resource indicators, and so forth. The term UCI, as used herein, is not intended to be the 3GPP term UCI. Rather, it is intended to generally refer to information sent in a cellular uplink signal that allows a link to be maintained between a UE and a BS.

Without the ability to receive control information in the downlink signal, and send UCI information back in the uplink signal, a data link may not be maintained between the UE and the BS. Accordingly, a repeater, such as a consumer signal booster, that can only amplify a DL signal, and not amplify an UL signal, may not enable a UE to maintain a data link with a BS and receive a DL signal from the BS.

In one example, a repeater can be configured to filter and amplify multiple bands used in carrier aggregation or dual-connectivity between one or more base stations and a UE. The use of carrier aggregation or dual connectivity can enable a UE to receive information on a DL signal, and send information on a different UL signal. For example, the UE may communicate with a BS using a first band (referred to as Band 1 or B1), and a second band (referred to as Band 2 or B2). The B1 and B2 band designations, as used herein, are used for exemplary purposes only, and are not related to 3GPP defined frequency bands in this example. Both B1 and B2 can each include a downlink frequency band and a separate UL frequency band. The UL frequency band for B2 may have adjacent interference problems. A regulatory, such as the FCC, may require B2 to not be amplified to limit interference of B2 with signals in an adjacent frequency band.

A UE can be configured to receive B1 and B2 using carrier aggregation or dual-connectivity. The repeater can be configured to filter and amplify the B1 UL and DL signals, and the B2 DL signal. The B2 UL signal will not be amplified by the repeater so that there will not be interference of the B2 UL signal with adjacent signals. Control information related to the B2 DL signal, which is typically communicated as UCI on the B2 UL signal, can be communicated on the B1 UL signal instead.

Associating the DL signal of B2 with the UL signal of B1 using carrier aggregation or dual connectivity can enable the communication from a UE of UCI for B2 to a base station without amplification of an operating band prohibited by a regulatory body (e.g., B2 UL). Communicating control information such as UCI on an operating band that is not prohibited (e.g., the B1 uplink frequency range) can enable the DL signal of the B2 frequency range to be operable without causing interference with adjacent occupied frequency bands.

This enables the repeater to amplify the B2 DL signal using carrier aggregation or dual connectivity, providing additional downlink bandwidth and a higher downlink data rate to the UE to download information, without amplifying the B2 UL signal and potentially causing undesired levels of interference with the adjacent signals. In one example, the B2 DL signal transmitted by the repeater can be limited to a selected power. This can allow the B2 DL signal to be limited to a desired geographic location (i.e. a spatial area) where interference with adjacent signals is not problematic. The use of a repeater with carrier aggregation and/or dual connectivity communication between an UE and one or more base stations will be discussed more fully in the proceeding paragraphs.

An understanding of basic repeater functionality is provided. In an example, as illustrated in FIG. 1, a bi-directional repeater system can comprise a repeater 100 connected to an outside antenna 104 or donor antenna 104 and an inside antenna 102 or server antenna 102. The repeater 100 can include a donor antenna port that can be internally coupled to a second duplexer (or diplexer or multiplexer or circulator or splitter) 114. The repeater 100 can include a server antenna port that can also be coupled to a first duplexer (or diplexer or multiplexer or circulator or splitter) 112. Between the two duplexers, 114 and 112, can be two paths: a first path and a second path. The first path can comprise a low noise amplifier (LNA) with an input coupled to the first duplexer 112, a variable attenuator coupled to an output of the LNA, a filter coupled to the variable attenuator, and a power amplifier (PA) coupled between the filter and the second duplexer 114. The LNA can amplify a lower power signal without degrading the signal to noise ratio. The PA can adjust and amplify the power level by a desired amount. A second path can comprise an LNA with an input coupled to the second duplexer 114, a variable attenuator coupled to an output of the LNA, a filter coupled to the variable attenuator, and a PA coupled between the filter and the first duplexer 112. The first path can be a downlink amplification path or an uplink amplification path. The second path can be a downlink amplification path or an uplink amplification path. The repeater 100 can also comprise a controller 106. In one example, the controller 106 can include one or more processors and memory.

Figure 2:
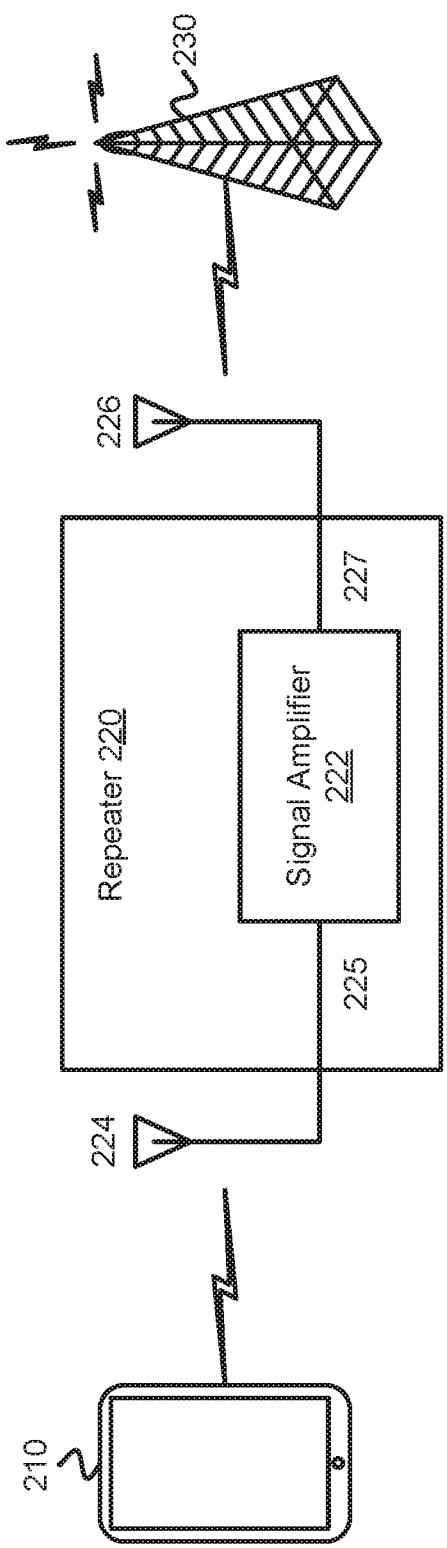
FIG. 2 illustrates a repeater in communication with a user equipment (UE) and a base station (BS) in accordance with an example.

FIG. 2 illustrates an exemplary repeater 220 in communication with a wireless device 210 and a base station 230. The repeater 220 (also referred to as a cellular signal amplifier) can improve the quality of wireless communication by amplifying, filtering, and/or applying other processing techniques via a signal amplifier 222 to uplink signals communicated from the wireless device 210 to the base station 230 and/or downlink signals communicated from the base station 230 to the wireless device 210. In other words, the repeater 220 can amplify or boost uplink signals and/or downlink signals bi-directionally. In one example, the repeater 220 can be at a fixed location, such as in a home or office. Alternatively, the repeater 220 can be attached to a mobile object, such as a vehicle or a wireless device 210. The repeater can be a signal booster, such as a cellular signal booster.

In one configuration, the repeater 220 can be configured to be connected to a device antenna 224 (e.g., an inside antenna, server antenna, or a coupling antenna) and a node antenna 226 (e.g., an outside antenna or donor antenna). The node antenna 226 can receive the downlink signal from the base station 230. The downlink signal can be provided to the signal amplifier 222 via a second coaxial cable 227 or other type of wired, wireless, optical, or radio frequency connection operable to communicate radio frequency signals. The signal amplifier 222 can include one or more radio signal amplifiers for amplification and filtering of cellular signals. The downlink signal that has been amplified and filtered can be provided to the device antenna 224 via a first coaxial cable 225 or other type of radio frequency connection operable to communicate radio frequency signals. The device antenna 224 can communicate the downlink signal that has been amplified and filtered to the wireless device 210.

Similarly, the device antenna 224 can receive an uplink signal from the wireless device 210. The uplink signal can be provided to the signal amplifier 222 via the first coaxial cable 225 or other type of wired, wireless, optical, or radio frequency connection operable to communicate radio frequency signals. The signal amplifier 222 can include one or more radio signal amplifiers for amplification and filtering of cellular signals. The uplink signal that has been amplified and filtered can be provided to the node antenna 226 via the second coaxial cable 227 or other type of wired, wireless, optical, or radio frequency connection operable to communicate radio frequency signals. The node antenna 226 can communicate the uplink signal that has been amplified and filtered to a node, such as a base station 230.

In one embodiment, the device antenna 224 and the node antenna 226 can be integrated as part of the repeater 220. Alternatively, the repeater 220 can be configured to be connected to a separate device antenna 224 or node antenna 226. The device antenna and the node antenna may be provided by a different provider than the repeater 220.

In one example, the repeater 220 can send uplink signals to a node and/or receive downlink signals from the node. While FIG. 2 shows the node as a base station 230, this is not intended to be limiting. The node can comprise a wireless wide area network (WWAN) access point (AP), a base station (BS), an evolved Node B (eNB), a next generation Node B (gNB), a new radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 220 used to amplify the uplink and/or a downlink signal can be a handheld booster. The handheld booster can be implemented in a sleeve of the wireless device 210. The wireless device sleeve may be attached to the wireless device 210, but may be removed as needed. In this configuration, the repeater 220 can automatically power down or cease amplification when the wireless device 210 approaches a particular base station. In other words, the repeater 220 may determine to stop performing signal amplification when the quality of uplink and/or downlink signals is above a defined threshold based on a location of the wireless device 210 in relation to the base station 230.

In one example, the repeater 220 can include a battery to provide power to various components, such as the signal amplifier 222, the device antenna 224, and the node antenna 226. The battery can also power the wireless device 210 (e.g., phone or tablet). Alternatively, the repeater 220 can receive power from the wireless device 210.

In one configuration, the repeater 220 can be a Federal Communications Commission (FCC)-compatible consumer repeater. As a non-limiting example, the repeater 220 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 220 can be configured to automatically self-monitor its operation to ensure compliance with applicable noise and gain limits. The repeater 220 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 220 can improve the wireless connection between the wireless device 210 and the base station 230 (e.g., cell tower) or another type of wireless wide area network (WWAN) access point (AP) by amplifying desired signals relative to a noise floor. The repeater 220 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 220 can boost signals for 3GPP LTE Release 16.1.0 (March 2019) or other desired releases.

The repeater 220 can boost signals from the 3GPP Technical Specification (TS) 36.101 (Release 16 Jan. 2019) bands, referred to as LTE frequency bands. For example, the repeater 220 can boost signals from one or more of the LTE frequency bands: 2, 4, 5, 12, 13, 17, 25, and 26. In addition, the repeater 220 can boost selected frequency bands based on the country or region in which the repeater is used, including any of bands 1-85 or other bands, as disclosed in 3GPP TS 36.104 V16.1.0 (March 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 76 | N/A | 1427 MHz-1432 MHz | FDD (NOTE 2) |
| 85 | 698 MHz-716 MHz | 728 MHz-746 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1A.
NOTE 5:
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the repeater 220 can boost signals from the 3GPP Technical Specification (TS) 38.104 (Release 15 Jan. 2019) bands, referred to as 5G frequency bands. In addition, the repeater 220 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V15.5.0 (March 2019), and depicted in Table 2 and Table 3:

TABLE 2

| NR operating band | Uplink (UL) operating band BS receive/UE transmit $F_{UL,\,low}$-$F_{UL,\,high}$ | Downlink (DL) operating band BS transmit/UE receive $F_{DL,\,low}$-$F_{DL,\,high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 3

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Figure 3:
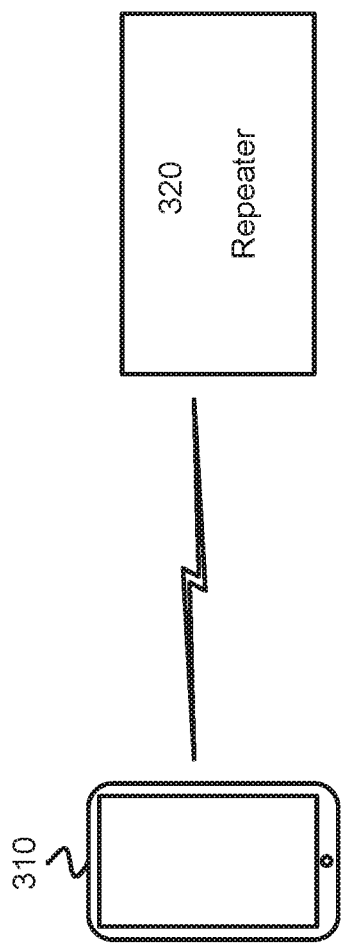
FIG. 3 illustrates a repeater in communication with a wireless device in accordance with an example.

As illustrated in FIG. 3, a cellular signal booster or repeater 320 can be configured to receive a signal from a user equipment (UE) or wireless device 310 via a wireless connection of the wireless device 310 with the repeater 320. The wireless connection of the wireless device 310 with the repeater 320 can be one or more of a wireless personal area network (W-PAN), which can include a Bluetooth v4.0, Bluetooth Low Energy, Bluetooth v4.1, or Bluetooth v4.2 configured radio access technology (RAT), or a wireless local area network (W-LAN), which can include an Institute of Electronics and Electrical Engineers (IEEE) 802.11a, IEEE 802.11b, IEEE 802.11g, IEEE 802.11n, IEEE 802.11ac, or IEEE 802.11ad configured RAT. The repeater 320 can be configured to communicate with the wireless device 310 through a direct connection, a Near-Field Communication (NFC) configured radio access technology (RAT), an Ultra High Frequency (UHF) configured RAT, a TV White Space Band (TVWS) configured RAT, or any other industrial, scientific and medical (ISM) radio band configured RAT. Examples of such ISM bands include 2.4 gigahertz (GHz), 3.6 GHz, 4.9 GHz, 5 GHz, 5.9 GHz, or 6.1 GHz.

Figure 4:
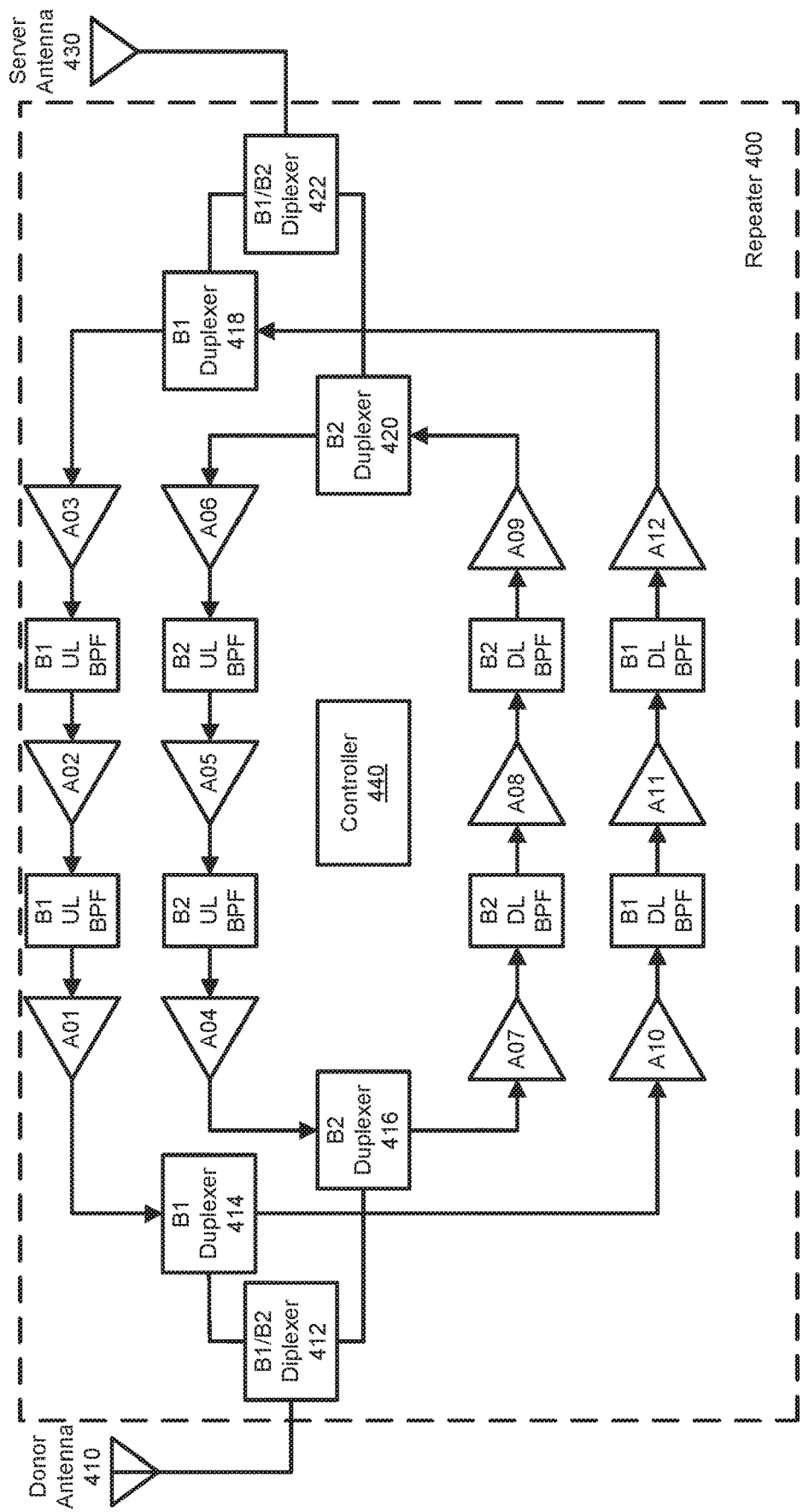
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

While FIG. 4 illustrates a symmetrical booster, with B1 UL and DL, and B2 UL and DL, this is not intended to be limiting. A multiband repeater, such as the repeater 400 can have more DL filtering and amplification paths than UL, or vice versa. In addition, a single filtering and amplification path can be configured for more than one UL band or more than one DL band by selecting filters, duplexers, and/or diplexers for the multiple bands.

Figure 5A:
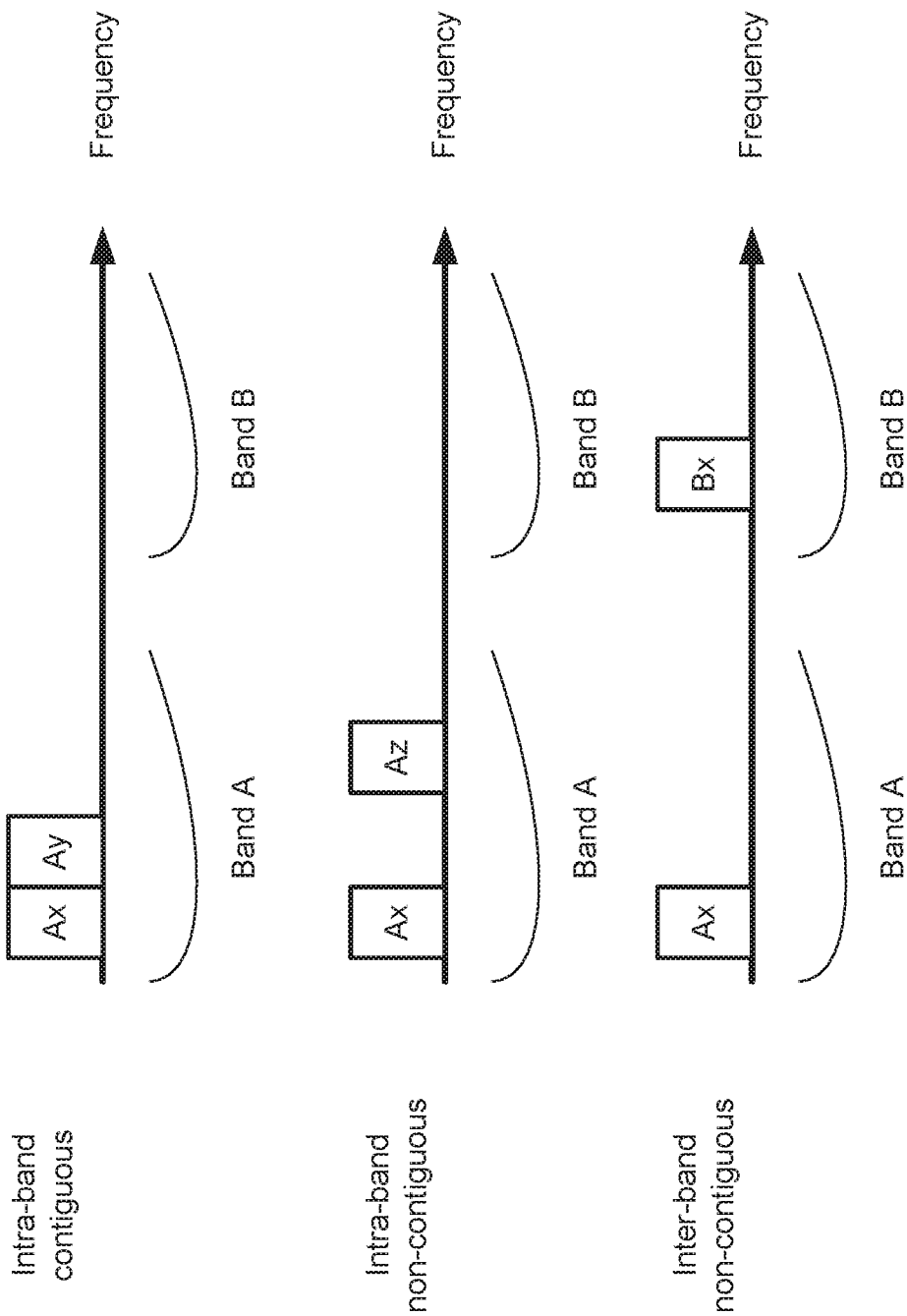
FIG. 5a illustrates carrier aggregation (CA) in accordance with an example.

In another example, as illustrated in FIG. 5a, carrier aggregation (CA) can be used to increase bandwidth for both a frequency division duplex (FDD) system and a time division duplex (TDD) system. For both FDD and TDD systems, an aggregated resource can comprise two or more component carriers (CCs), wherein each CC can have a particular bandwidth.

In another example, a first frequency range can comprise an uplink (UL) frequency range that can be used for transmission and reception of UL signals and a downlink (DL) frequency range that can be used for transmission and reception of DL signals. The UL frequency range and the DL frequency range can be contiguous or non-contiguous.

In another example, a second frequency range can comprise a UL frequency range that can be used for transmission and reception of UL signals and a DL frequency range that can be used for transmission and reception of DL signals. The UL frequency range and the DL frequency range can be contiguous or non-contiguous.

In another example, in the case of intra-band contiguous carrier aggregation, a first frequency range can comprise a first DL frequency range or a first UL frequency range, and a second frequency range can comprise a second DL frequency range or a second UL frequency range. In one example, a first frequency range can include the frequency range Ax and the second frequency range can include the frequency range Ay. The frequency range Ax can comprise a CC that is contiguous with the frequency range Ay that is a CC. Both the frequency range Ax and the frequency range Ay can be located in a frequency range that includes a single band (e.g., Band A).

In another example, in the case of intra-band non-contiguous carrier aggregation, a first frequency range can comprise a first DL frequency range (e.g., Ax) or a first UL frequency range (e.g., Ax), and a second frequency range can comprise a second DL frequency range (e.g., Az) or a second UL frequency range (e.g., Az). The frequency range Ax can comprise a CC that is non-contiguous with the frequency range Az that is a CC. Both the frequency range Ax and the frequency range Az can be located in a frequency range that includes a single band (e.g., Band A).

In another example, in the case of inter-band non-contiguous carrier aggregation, a first frequency range can comprise a first DL frequency range (e.g., Ax) or a first UL frequency range (e.g., Ax), and a second frequency range can comprise a second DL frequency range (e.g., Bx) or a second UL frequency range (e.g., Bx). The frequency range Ax can comprise a CC that is non-contiguous with the frequency range Bx that is a CC. The frequency range Ax can be located in a single band (e.g., Band A) and the frequency range Bx can be located in a frequency range that includes a different band (e.g., Band B).

In another example, in the case of inter-band contiguous carrier aggregation (not shown), the CC in a first frequency range in band A and the CC in a second frequency range in band B can be contiguous.

In another example, each component carrier can be associated with a serving cell. The coverage of the serving cells can differ because CCs on different frequency bands can experience different pathloss. A primary component carrier can be associated with a primary serving cell, and one or more secondary component carriers can be associated with one or more secondary serving cells. The primary serving cell can transmit and receive control information and data. The secondary serving cells may only transmit and receive data.

In another example, a primary component carrier can be used for transmission of control information and data from a wireless device to a primary serving cell. A secondary component carrier may only be used to receive data from a secondary serving cell. A primary serving cell can be used for reception of uplink signals and transmission of downlink signals. A secondary serving cell may only be used for transmission of downlink signals. A primary serving cell can receive control information, such as UCI associated with data transmitted by a secondary serving cell in order to maintain carrier aggregation.

Accordingly, the UCI associated with the DL information transmitted from the secondary serving cell can be communicated by the UE on the primary component carrier to the primary serving cell. The UCI associated with the DL information transmitted from the secondary serving cell on the secondary component carrier can be transmitted from the UE on both the primary component carrier and the secondary component carrier. The UE may be configured to determine that the UCI transmitted from the UE on the secondary component carrier is not received by the base station. When this occurs, the UE may be configured to determine that the UCI for the secondary serving cell can be transmitted from the UE on the primary component carrier, which can be filtered, amplified, and transmitted by the repeater to the base station. Alternatively, the UE may be configured to automatically send the UCI for the secondary serving cell on the primary component carrier. Either way, the UE can determine to transmit the UCI for both the primary component carrier and the secondary component carrier on the primary component carrier. The UL signal from the UE for the primary component carrier can be received at the repeater, and filtered, amplified, and transmitted by the repeater to the base station, as previously discussed.

For example, ACK NACK information, such as hybrid automatic repeat request (HARQ) information for the DL signal from a secondary serving cell on a secondary component carrier can be communicated from a UE in UCI to a primary serving cell on a primary component carrier. The primary serving cell may be configured to retransmit symbols that were originally transmitted by the secondary serving cell on the secondary component carrier based on the HARQ ACK NACK information for the secondary serving cell received in UCI at the primary serving cell from the UE.

Accordingly, the repeater can be configured to amplify a downlink component carrier and an uplink component carrier for a serving cell, as well as a downlink component carrier for one or more secondary serving cells. Information necessary to maintain the UL and DL connection with the primary serving cell, and at least a DL connection with each secondary serving cell, can be communicated through the repeater, where the signals can be filtered and amplified. The repeater can enable the UE to maintain a connection with DL component carriers in a secondary serving cell without having a connection with one or more UL component carriers in the secondary serving cell. This can allow the UE to have additional DL bandwidth and higher DL data rates, while limiting interference to adjacent frequency bands, or to incumbents or shared users of the same frequency band since the UL component carrier is not amplified and transmitted by the repeater.

In one example embodiment, the repeater can include a UL filtering and amplification path for the UL component carrier that is not amplified. In this example, one or more amplifiers of the UL filtering and amplification path for the UL component carrier can be turned off, a variable attenuator can be increased, and/or a switch can be opened to reduce or turn off an output of the UL filtering and amplification so that the repeater meets the requirements of the regulatory body for transmission of an UL signal on the frequency range (i.e. band, bands, channel, or channels) associated with the UL component carrier.

Figure 5B:
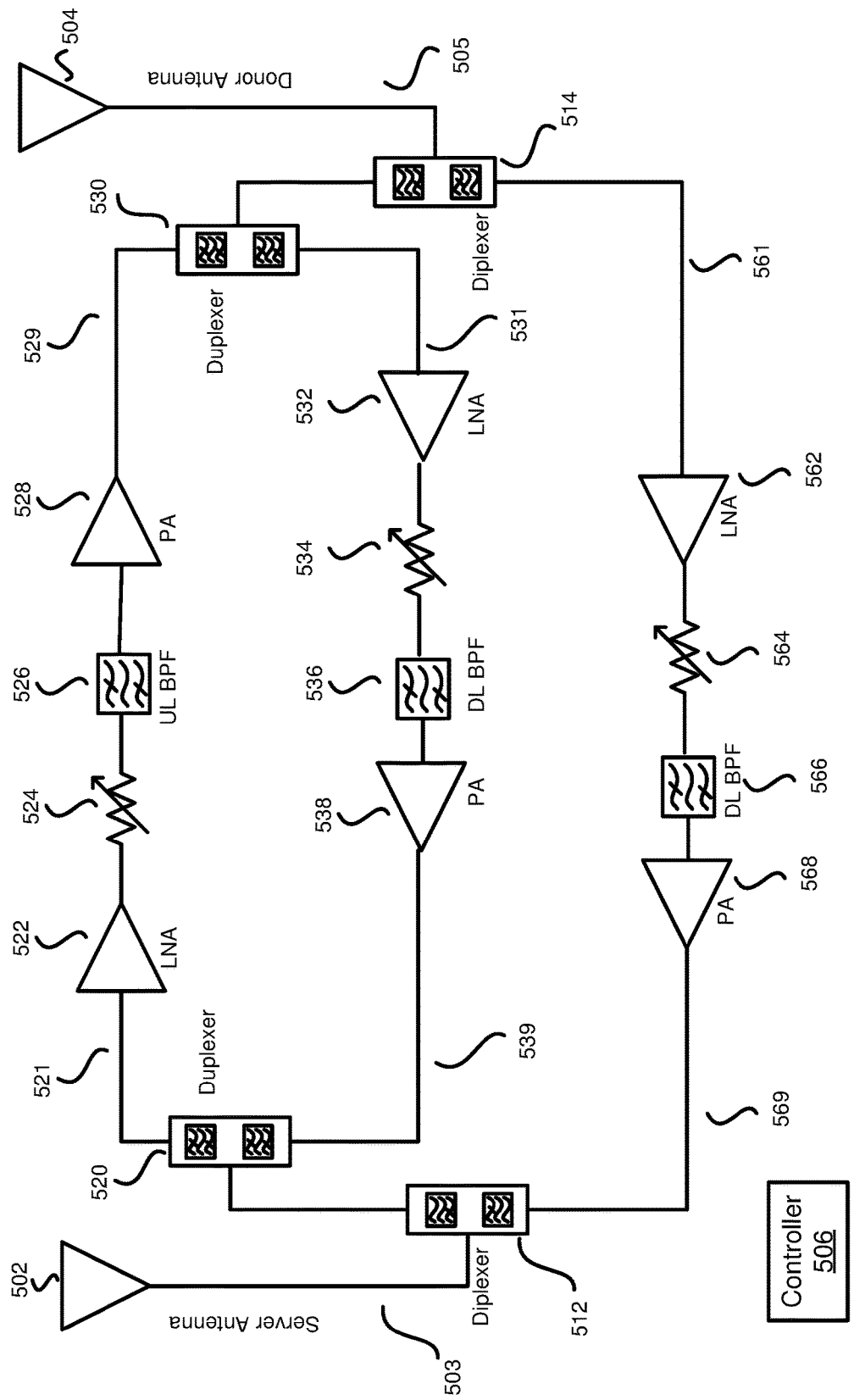
FIG. 5b illustrates a carrier-aggregation (CA) repeater in accordance with an example.

In another example, as illustrated in FIG. 5b, a repeater can comprise a first port 503 (e.g., a server port, a device port, or an inside port) and a second port 505 (e.g., a donor port, a node port, or an outside port). The first port 503 can be configured to be coupled to a first antenna 502 (a server antenna, a device antenna, or an inside antenna). The first antenna 502 can be configured to receive a first-direction signal (e.g., an uplink signal) from a wireless device and transmit a second-direction signal (e.g., a downlink signal) to a wireless device after the second-direction signal has been amplified by the repeater. The second port 505 can be configured to be coupled to a second antenna 504 (a donor antenna, a node antenna, or an outside antenna). The second antenna 504 can be configured to transmit a first-direction signal (e.g., an uplink signal) to a base station (e.g., an evolved node B (eNB), a new radio (NR) node B (gNB), or an NR base station (NR BS)) and receive a second-direction signal (e.g., a downlink signal) from a base station. The repeater can also comprise a controller 506. In one example, the controller 506 can include one or more processors and memory.

In another example, the first port 503 can be configured to be coupled to a diplexer 512 (or a duplexer, a multiplexer, a circulator, or a splitter). The diplexer 512 can be configured to be coupled to a first path and a second path. A first-direction signal received at the first port 503 can be directed to the diplexer 512. The diplexer 512 can direct the first-direction signal, based on its frequency, to a duplexer 520 (or a diplexer, a multiplexer, a circulator, or a splitter). The duplexer 520 can be configured to be coupled between the diplexer 512 and a first-direction path 521 (e.g., an uplink path) on the first path and a second-direction path 539 (e.g., a downlink path) on the first path.

In another example, the second port 505 can be configured to be coupled to a diplexer 514 (or a duplexer, a multiplexer, a circulator, or a splitter). The diplexer 514 can be configured to be coupled to the first path and the second path. A second-direction signal received at the second port 505 can be directed to the diplexer 514. The diplexer 514 can direct the second-direction signal, based on its frequency, to a duplexer 530 (or a diplexer, a multiplexer, a circulator, or a splitter). The duplexer 530 can be configured to be coupled between the diplexer 514 and a first-direction path 529 (e.g., the uplink path) on the first path and a second-direction path 531 (e.g., the downlink path) on the first path. In another example, the first path can comprise the first-direction path (e.g., the uplink path) and the second-direction path (e.g., the downlink path).

In another example, a first-direction signal can be directed from the duplexer 520 to the first-direction path of the first path. The first-direction path of the first path can comprise one or more of: one or more low noise amplifiers (LNAs) 522, one or more variable attenuators 524, one or more filters 526, or one or more power amplifiers (PAs) 528. The one or more PAs 528 can comprise: a variable gain amplifier, a fixed-gain power amplifier, or a gain block. The one or more filters 526 can be configured to pass one or more of a first-direction (e.g., an uplink direction) of a first frequency range (e.g., one or more of 3GPP FDD frequency bands 2, 4, 5, 12, 13, 17, 25, 26, or 71). In another example, the one or more filters 526 can be configured to pass one or more of a first-direction (e.g., an uplink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 526 can be configured to pass a selected channel within a 3GPP FDD band. The first-direction can be an uplink direction or a downlink direction.

In another example, after being directed along the first-direction path, a first-direction signal of the first frequency range can be amplified and filtered in accordance with the type of amplifiers and filters including along the first-direction path of the first path. The first-direction signal can be further directed to the duplexer 530. The duplexer 530 can direct the amplified and/or filtered first-direction signal to the diplexer 514. The first-direction signal can be directed from the diplexer 514 to the second port 505. The first-direction signal can be directed from the second port 505 to the second antenna 504.

In another example, a second-direction signal can be directed from the duplexer 530 to the second-direction path of the first path 531. The second-direction path of the first path can comprise one or more of: one or more low noise amplifiers (LNAs) 532, one or more variable attenuators 534, one or more filters 536, or one or more power amplifiers (PAs) 538. The one or more PAs 538 can comprise: a variable gain amplifier, a fixed-gain power amplifier, or a gain block. The one or more filters 536 can be configured to pass one or more of a second-direction (e.g., a downlink direction) of a first frequency range (e.g., 3GPP LTE FDD frequency bands 2, 4, 5, 12, 13, 17, 25, 26, or 71). In another example, the one or more filters 536 can be configured to pass one or more of a second-direction (e.g., a downlink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 536 can be configured to pass a selected channel within a 3GPP FDD band. The second-direction can be an uplink direction or a downlink direction.

In another example, after being directed along the second-direction path, a second-direction signal of the first frequency range can be amplified and filtered in accordance with the type of amplifiers and filters including along the second-direction path of the first path. The second-direction signal can be further directed to the duplexer 520. The duplexer 520 can direct the amplified and/or filtered second-direction signal to the diplexer 512. The second-direction signal can be directed from the diplexer 512 to the first port 503. The second-direction signal can be directed from the first port 503 to the first antenna 502.

In another example, the diplexer 514 can be configured to be coupled to the second path 561. A second-direction signal received at the second port 505 can be directed to the diplexer 514. The diplexer 514 can direct the second-direction signal, based on its frequency, to the second path 561. The second path 561 can be configured to be coupled between the diplexer 514 and the diplexer 512. In another example, the second path may only comprise the second-direction path (e.g., the downlink path).

In another example, a second-direction signal can be directed from the second path 569 to the diplexer 512. The second-direction path of the second path can comprise one or more of: one or more low noise amplifiers (LNAs) 562, one or more variable attenuators 564, one or more filters 566, or one or more power amplifiers (PAs) 568. The one or more PAs 568 can comprise: a variable gain amplifier, a fixed-gain power amplifier, or a gain block. The one or more filters 566 can be configured to pass one or more of a second-direction (e.g., a downlink direction) of a second frequency range (e.g., 3GPP LTE FDD frequency bands 2, 4, 5, 12, 13, 17, 25, 26, 30, or 71). In another example, the one or more filters 566 can be configured to pass one or more of a second-direction (e.g., a downlink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 566 can be configured to pass a selected channel within a 3GPP FDD band. The second-direction can be a downlink direction.

In another example, after being directed along the second-direction path of the second path, a second-direction signal of the second frequency range can be amplified and filtered in accordance with the type of amplifiers and filters including along the second-direction path of the second path. The second-direction signal can be further directed to the diplexer 512. The second-direction signal can be directed from the diplexer 512 to the first port 503. The second-direction signal can be directed from the first port 503 to the first antenna 502.

In another example, a first-direction signal (e.g., an uplink signal) of the second frequency range (e.g., 3GPP LTE operating band 30) can be associated with the first-direction signal of the first frequency range using carrier aggregation (CA) to enable information configured for communication on the first-direction signal of the second frequency range (e.g., 3GPP LTE operating band 30) to only be communicated on the first-direction signal of the first frequency range without having a second first-direction filtering and amplification path for the first-direction signal of the second frequency range (e.g., 3GPP LTE operating band 30).

In another example, the carrier-aggregated first-direction signal can be directed from the duplexer 520 to the first-direction path of the first path. As discussed in the preceding, the first-direction path of the first path can comprise one or more of: one or more low noise amplifiers (LNAs) 522, one or more variable attenuators 524, one or more filters 526, or one or more power amplifiers (PAs) 528.

In another example, after being directed along the first-direction path, the carrier-aggregated first-direction signal of the first frequency range can be amplified and filtered in accordance with the type of amplifiers and filters including along the first-direction path of the first path. The carrier-aggregated first-direction signal can be further directed to the duplexer 530. The duplexer 530 can direct the amplified and/or filtered carrier-aggregated first-direction signal to the diplexer 514. The carrier-aggregated first-direction signal can be directed from the diplexer 514 to the second port 505. The carrier-aggregated first-direction signal can be directed from the second port 505 to the second antenna 504.

In another example, a downlink output power from an output of the second second-direction filtering and amplification path can be less than a threshold power level in accordance with FCC regulations. In one example, the threshold can be 50 milliwatts (mW) (or 17 decibel-milliwatts (dBm)) conducted and equivalent isotropic radiated power (EIRP) for each band of operation.

In another example, the first-direction signal (e.g., an uplink signal) of the second frequency range (e.g., 3GPP LTE operating band 30) can be prohibited by a regulatory body (e.g., the FCC) from amplification using a repeater. In another example, the repeater can be an FCC-compliant consumer signal booster.

In another example, the first-direction signal (e.g., an uplink signal) of the second frequency range (e.g., 3GPP LTE operating band 30) can be prohibited by a regulatory body (e.g., the FCC) from amplification using a repeater (e.g., a consumer signal booster) due to adjacent signal interference with the first-direction signal of the second frequency range. Regulatory bodies may prohibit the repeater from amplification on the first-direction signal of the second frequency range because of potential in-band interference to incumbent or shared users on the same frequency band or interference to adjacent frequency bands.

In another example, information, such as UCI, that is typically configured for communication on the first-direction signal (e.g., an uplink signal) of the second frequency range can be communicated using an additional first-direction signal than the first-direction signal (e.g., an uplink signal) of the second frequency range. In one example, the first-direction signal of the second frequency range can be selected from FR2 and the other-frequency first-direction signal can be selected from FR1.

In another example, one or more second-direction amplification and filtering paths can be configured to be coupled to one first port and one second port. The first port can be configured to be coupled to one first antenna and the second port can be configured to be coupled to one second antenna.

In another example, the first-direction power (e.g., UL power) transmitted from the repeater can be reduced based on the second-direction power (e.g., DL power) received at the repeater for purposes of network protection. When information configured for communication on the first-direction signal of the second frequency range is configured for communication on the first-direction signal of the first frequency range using carrier aggregation or dual-connectivity, then network protection may not be based on the second-direction power of the second frequency range. In this situation, the first-direction power can be reduced based on the second-direction power of the first frequency range and not the second-direction power of the second frequency range.

In another example, a wireless connection between a wireless device and a repeater, as previously discussed in relation to FIG. 3, can be used to communicate carrier aggregation usage between the wireless device and the repeater. Network protection can be adjusted based on the carrier aggregation usage.

In another example, the first frequency range and the second frequency range can be configured for carrier aggregation in CA operating band combinations selected from the 3GPP operating band combinations included in Table 5.5A-2 from 3GPP TS 36.101 V16.0.0 (2018-12), and depicted in Table 4.

TABLE 4

| 3GPP LTE CA Band | 3GPP LTE Band |
|---|---|
| CA_1-3 | 1, 3 |
| CA_1-1-3 | 1, 3 |
| CA_1-1-5 | 1, 5 |
| CA_1-1-7 | 1, 7 |
| CA_1-1-28 | 1, 28 |
| CA_1-3-3 | 1, 3 |
| CA_1-5 | 1, 5 |
| CA_1-7 | 1, 7 |
| CA_1-7-7 | 1, 7 |
| CA_1-8 | 1, 8 |
| CA_1-11 | 1, 11 |
| CA_1-18 | 1, 18 |
| CA_1-19 | 1, 19 |
| CA_1-20 | 1, 20 |
| CA_1-21 | 1, 21 |
| CA_1-26 | 1, 26 |
| CA_1-28 | 1, 28 |
| CA_1-32 | 1, 32 |
| CA_1-38 | 1, 38 |
| CA_1-40 | 1, 40 |
| CA_1-41 | 1, 41 |
| CA_1-42 | 1, 42 |
| CA_1-42-42 | 1, 42 |
| CA_1-43 | 1, 43 |
| CA_1-46 | 1, 46 |
| CA_2-4 | 2, 4 |
| CA_2-2-4 | 2, 4 |
| CA_2-2-4-4 | 2, 4 |
| CA_2-4-4 | 2, 4 |
| CA_2-5 | 2, 5 |
| CA_2-2-5 | 2, 5 |
| CA_2-2-7 | 2, 7 |
| CA_2-7 | 2, 7 |
| CA_2-7-7 | 2, 7 |
| CA_2-12 | 2, 12 |
| CA_2-2-12 | 2, 12 |
| CA_2-2-12-12 | 2, 12 |
| CA_2-2-29 | 2, 29 |

TABLE 4-continued

| 3GPP LTE CA Band | 3GPP LTE Band |
|---|---|
| CA_2-7-46 | 2, 7, 46 |
| CA_2-12-12 | 2, 12 |
| CA_2-13 | 2, 13 |
| CA_2-2-13 | 2, 13 |
| CA_2-14 | 2, 14 |
| CA_2-2-14 | 2, 14 |
| CA_2-17 | 2, 17 |
| CA_2-28 | 2, 28 |
| CA_2-29 | 2, 29 |
| CA_2-30 | 2, 30 |
| CA_2-2-30 | 2, 30 |
| CA_2-46 | 2, 46 |
| CA_2-2-46 | 2, 46 |
| CA_2-46-46 | 2, 46 |
| CA_2-48-48 | 2, 48 |
| CA_2-49 | 2, 49 |
| CA_2-66 | 2, 66 |
| CA_2-48 | 2, 48 |
| CA_2-2-66 | 2, 66 |
| CA_2-2-66-66 | 2, 66 |
| CA_2-66-66 | 2, 66 |
| CA_2-66-66-66 | 2, 66 |
| CA_2-71 | 2, 71 |
| CA_2-2-71 | 2, 71 |
| CA_3-5 | 3, 5 |
| CA_3-7 | 3, 7 |
| CA_3-3-7 | 3, 7 |
| CA_3-3-7-7 | 3, 7 |
| CA_3-7-7 | 3, 7 |
| CA_3-8 | 3, 8 |
| CA_3-3-8 | 3, 8 |
| CA_3-11 | 3, 11 |
| CA_3-18 | 3, 18 |
| CA_3-19 | 3, 19 |
| CA_3-3-19 | 3, 19 |
| CA_3-20 | 3, 20 |
| CA_3-3-20 | 3, 20 |
| CA_3-3-21 | 3, 21 |
| CA_3-3-28 | 3, 28 |
| CA_3-3-41 | 3, 41 |
| CA_3-3-42 | 3, 42 |
| CA_3-21 | 3, 21 |
| CA_3-26 | 3, 26 |
| CA_3-27 | 3, 27 |
| CA_3-28 | 3, 28 |
| CA_3-31 | 3, 31 |
| CA_3-32 | 3, 32 |
| CA_3-38 | 3, 38 |
| CA_3-40 | 3, 40 |
| CA_3-40-40 | 3, 40 |
| CA_3-41 | 3, 41 |
| CA_3-42 | 3, 42 |
| CA_3-42-42 | 3, 42 |
| CA_3-43 | 3, 43 |
| CA_3-46 | 3, 46 |
| CA_3-3-46 | 3, 46 |
| CA_3-69 | 3, 69 |
| CA_4-5 | 4, 5 |
| CA_4-4-5 | 4, 5 |
| CA_4-7 | 4, 7 |
| CA_4-4-7 | 4, 7 |
| CA_4-7-7 | 4, 7 |
| CA_4-12 | 4, 12 |
| CA_4-4-12 | 4, 12 |
| CA_4-4-12-12 | 4, 12 |
| CA_4-12-12 | 4, 12 |
| CA_4-13 | 4, 13 |
| CA_4-4-13 | 4, 13 |
| CA_4-17 | 4, 17 |
| CA_4-27 | 4, 27 |
| CA_4-28 | 4, 28 |
| CA_4-29 | 4, 29 |
| CA_4-4-29 | 4, 29 |
| CA_4-30 | 4, 30 |
| CA_4-4-30 | 4, 30 |
| CA_4-46 | 4, 46 |
| CA_4-46-46 | 4, 46 |
| CA_4-48 | 4, 48 |
| CA_4-71 | 4, 71 |
| CA_4-4-71 | 4, 71 |
| CA_5-5-40 | 5, 40 |
| CA_5-7 | 5, 7 |
| CA_5-7-7 | 5, 7 |
| CA_5-12 | 5, 12 |
| CA_5-12-12 | 5, 12 |
| CA_5-13 | 5, 13 |
| CA_5-17 | 5, 17 |
| CA_5-25 | 5, 25 |
| CA_5-28 | 5, 28 |
| CA_5-29 | 5, 29 |
| CA_5-30 | 5, 30 |
| CA_5-38 | 5, 38 |
| CA_5-40 | 5, 40 |
| CA_5-40-40 | 5, 40 |
| CA_5-41 | 5, 41 |
| CA_5-46 | 5, 46 |
| CA_5-48 | 5, 48 |
| CA_5-66 | 5, 66 |
| CA_5-5-66 | 5, 66 |
| CA_5-66-66 | 5, 66 |
| CA_5-5-66-66 | 5, 66 |
| CA_7-8 | 7, 8 |
| CA_7-7-8 | 7, 8 |
| CA_7-12 | 7, 12 |
| CA_7-20 | 7, 20 |
| CA_7-22 | 7, 22 |
| CA_7-26 | 7, 26 |
| CA_7-7-26 | 7, 26 |
| CA_7-28 | 7, 28 |
| CA_7-7-28 | 7, 28 |
| CA_7-30 | 7, 30 |
| CA_7-32 | 7, 32 |
| CA_7-40 | 7, 40 |
| CA_7-42 | 7, 42 |
| CA_7-42-42 | 7, 42 |
| CA_7-46 | 7, 46 |
| CA_7-7-46 | 7, 46 |
| CA_7-7-66 | 7, 66 |
| CA_7-66 | 7, 66 |
| CA_7-66-66 | 7, 66 |
| CA_7-7-66-66 | 7, 66 |
| CA_8-11 | 8, 11 |
| CA_8-20 | 8, 20 |
| CA_8-27 | 8, 27 |
| CA_8-28 | 8, 28 |
| CA_8-32 | 8, 32 |
| CA_8-38 | 8, 38 |
| CA_8-39 | 8, 39 |
| CA_8-40 | 8, 40 |
| CA_8-41 | 8, 41 |
| CA_8-42 | 8, 42 |
| CA_8-46 | 8, 46 |
| CA_11-18 | 11, 18 |
| CA_11-26 | 11, 26 |
| CA_11-28 | 11, 28 |
| CA_11-41 | 11, 41 |
| CA_11-42 | 11, 42 |
| CA_11-46 | 11, 46 |
| CA_12-25 | 12, 25 |
| CA_12-30 | 12, 30 |
| CA_12-46 | 12, 46 |
| CA_12-48 | 12, 48 |
| CA_12-48 | 12, 48 |
| CA_12-66 | 12, 66 |
| CA_12-66-66 | 12, 66 |
| CA_13-46 | 13, 46 |
| CA_13-48 | 13, 48 |
| CA_13-48-48 | 13, 48 |
| CA_13-66 | 13, 66 |
| CA_13-66-66 | 13, 66 |
| CA_14-66 | 14, 66 |
| CA_14-66-66 | 14, 66 |
| CA_14-66-66-66 | 14, 66 |
| CA_14-30 | 14, 30 |
| CA_18-281 | 18, 28 |
| CA_18-42 | 18, 42 |

TABLE 4-continued

| 3GPP LTE CA Band | 3GPP LTE Band |
|---|---|
| CA__19-21 | 19, 21 |
| CA__19-282 | 19, 28 |
| CA__19-42 | 19, 42 |
| CA__19-46 | 19, 46 |
| CA__20-281 | 20, 28 |
| CA__20-31 | 20, 31 |
| CA__20-32 | 20, 32 |
| CA__20-38 | 20, 38 |
| CA__20-40 | 20, 40 |
| CA__20-40-40 | 20, 40 |
| CA__20-42 | 20, 42 |
| CA__20-42-42 | 20, 42 |
| CA__20-43 | 20, 43 |
| CA__20-67 | 20, 67 |
| CA__20-75 | 20, 75 |
| CA__20-76 | 20, 76 |
| CA__21-28 | 21, 28 |
| CA__21-42 | 21, 42 |
| CA__21-46 | 21, 46 |
| CA__23-29 | 23, 29 |
| CA__25-26 | 25, 26 |
| CA__25-25-26 | 25, 26 |
| CA__25-41 | 25, 41 |
| CA__25-25-41 | 25, 41 |
| CA__25-46 | 25, 46 |
| CA__26-41 | 26, 41 |
| CA__26-46 | 26, 46 |
| CA__26-48 | 26, 48 |
| CA__26-48-48 | 26, 48 |
| CA__28-32 | 28, 32 |
| CA__28-38 | 28, 38 |
| CA__28-40 | 28, 40 |
| CA__28-41 | 28, 41 |
| CA__28-42 | 28, 42 |
| CA__28-42-42 | 28, 42 |
| CA__28-46 | 28, 46 |
| CA__29-30 | 29, 30 |
| CA__29-66 | 29, 66 |
| CA__29-66-66 | 29, 66 |
| CA__29-70 | 29, 70 |
| CA__30-66 | 30, 66 |
| CA__30-66-66 | 30, 66 |
| CA__32-42 | 32, 42 |
| CA__32-43 | 32, 43 |
| CA__34-39 | 34, 39 |
| CA__34-41 | 34, 41 |
| CA__38-40 | 38, 40 |
| CA__38-40-40 | 38, 40 |
| CA__39-41 | 39, 41 |
| CA__39-40 | 39, 40 |
| CA__39-42 | 39, 42 |
| CA__39-46 | 39, 46 |
| CA__40-41 | 40, 41 |
| CA__40-42 | 40, 42 |
| CA__40-43 | 40, 43 |
| CA__40-46 | 40, 46 |
| CA__41-42 | 41, 42 |
| CA__41-42-42 | 41, 42 |
| CA__41-46 | 41, 46 |
| CA__41-48 | 41, 48 |
| CA__42-43 | 42, 43 |
| CA__42-46 | 42, 46 |
| CA__46-48 | 46, 48 |
| CA__46-48-48 | 46, 48 |
| CA__46-66 | 46, 66 |
| CA__46-46-66 | 46, 66 |
| CA__46-66-66 | 46, 66 |
| CA__46-70 | 46, 70 |
| CA__46-71 | 46, 71 |
| CA__48-66 | 48, 66 |
| CA__48-66-66 | 48, 66 |
| CA__48-66-66-66 | 48, 66 |
| CA__48-48-66 | 48, 66 |
| CA__48-71 | 48, 71 |
| CA__48-48-71 | 48, 71 |
| CA__66-70 | 66, 70 |
| CA__66-66-70 | 66, 70 |
| CA__66-71 | 66, 71 |
| CA__66-66-71 | 66, 71 |
| CA__70-71 | 70, 71 |

In another example, the first frequency range and the second frequency range can be configured for carrier aggregation in CA operating band combinations selected from the 3GPP operating band combinations included in Table 5.2A.2-1 from 3GPP TS 38.101-1 V15.5.0 (2019-03), Table 5.2A.2-1 from 3GPP TS 38.101-2 V15.5.0 (2019-03), and Table 5.2A.1-1 from 3GPP TS 38.101-3 V15.5.0 (2019-03), and depicted in Table 5.

TABLE 5

| 3GPP NR CA Band | 3GPP NR Band |
|---|---|
| CA__n3-n77 | n3, n77 |
| CA__n3-n78 | n3, n78 |
| CA__n3-n79 | n3, n79 |
| CA__n8-n75 | n8, n75 |
| CA n8-n78 | n8, n78 |
| CA__n8-n79 | n8, n79 |
| CA__n28-n75 | n28, n75 |
| CA__n28_n78 | n28, n78 |
| CA__n41-n78 | n41, n78 |
| CA__n75-n78 | n75, n78 |
| CA__n77-n79 | n77, n79 |
| CA__n78-n79 | n78, n79 |
| CA__nX-nY | nX, nY |
| CA__n8-n258 | n8, n258 |
| CA__n71-n257 | n71, n257 |
| CA__n77-n257 | n77, n257 |
| CA__n78-n257 | n78, n257 |
| CA__n79-n257 | n79, n257 |

In another example, the first frequency range and the second frequency range can be configured for carrier aggregation in intra-band CA operating bands selected from the 3GPP operating band combinations included in Table 5.5A-1 from 3GPP TS 36.101 V16.0.0 (2018-12), and depicted in Table 6.

TABLE 6

| 3GPP LTE CA Band | 3GPP LTE Band |
|---|---|
| CA__1 | 1 |
| CA__2 | 2 |
| CA__3 | 3 |
| CA__5 | 5 |
| CA__7 | 7 |
| CA__8 | 8 |
| CA__12 | 12 |
| CA__23 | 23 |
| CA__27 | 27 |
| CA__28 | 28 |
| CA__38 | 38 |
| CA__39 | 39 |
| CA__40 | 40 |
| CA__41 | 41 |
| CA__42 | 42 |
| CA__43 | 43 |
| CA__48 | 48 |
| CA__66 | 66 |
| CA__70 | 70 |

In another example, the first frequency range and the second frequency range can be configured for carrier aggregation in intra-band CA operating bands selected from the 3GPP operating band combinations included in Table 5.2A.1-1 from 3GPP TS 38.101-1 V15.5.0 (2019-03) and Table 5.2A.1-1 from 3GPP TS 38.101-2 V15.5.0 (2019-03), and depicted in Table 7.

TABLE 7

| NR CA Band | NR Band |
|---|---|
| CA_n77 | n77 |
| CA_n78 | n78 |
| CA_n79 | n79 |
| CA_n257B | n257 |
| CA_n257D | n257 |
| CA_n257E | n257 |
| CA_n257F | n257 |
| CA_n257G | n257 |
| CA_n257H | n257 |
| CA_n257I | n257 |
| CA_n257J | n257 |
| CA_n257K | n257 |
| CA_n257L | n257 |
| CA_n257M | n257 |
| CA_n260B | n260 |
| CA_n260C | n260 |
| CA_n260D | n260 |
| CA_n260E | n260 |
| CA_n260F | n260 |
| CA_n260G | n260 |
| CA_n260H | n260 |
| CA_n260I | n260 |
| CA_n260J | n260 |
| CA_n260K | n260 |
| CA_n260L | n260 |
| CA_n260M | n260 |
| CA_n260O | n260 |
| CA_n260P | n260 |
| CA_n260Q | n260 |
| CA_n261B | n261 |
| CA_n261C | n261 |
| CA_n261D | n261 |
| CA_n261E | n261 |
| CA_n261F | n261 |
| CA_n261G | n261 |
| CA_n261H | n261 |
| CA_n261I | n261 |
| CA_n261J | n261 |
| CA_n261K | n261 |
| CA_n261L | n261 |
| CA_n261M | n261 |
| CA_n261O | n261 |
| CA_n261P | n261 |
| CA_n261Q | n261 |

Figure 5C:
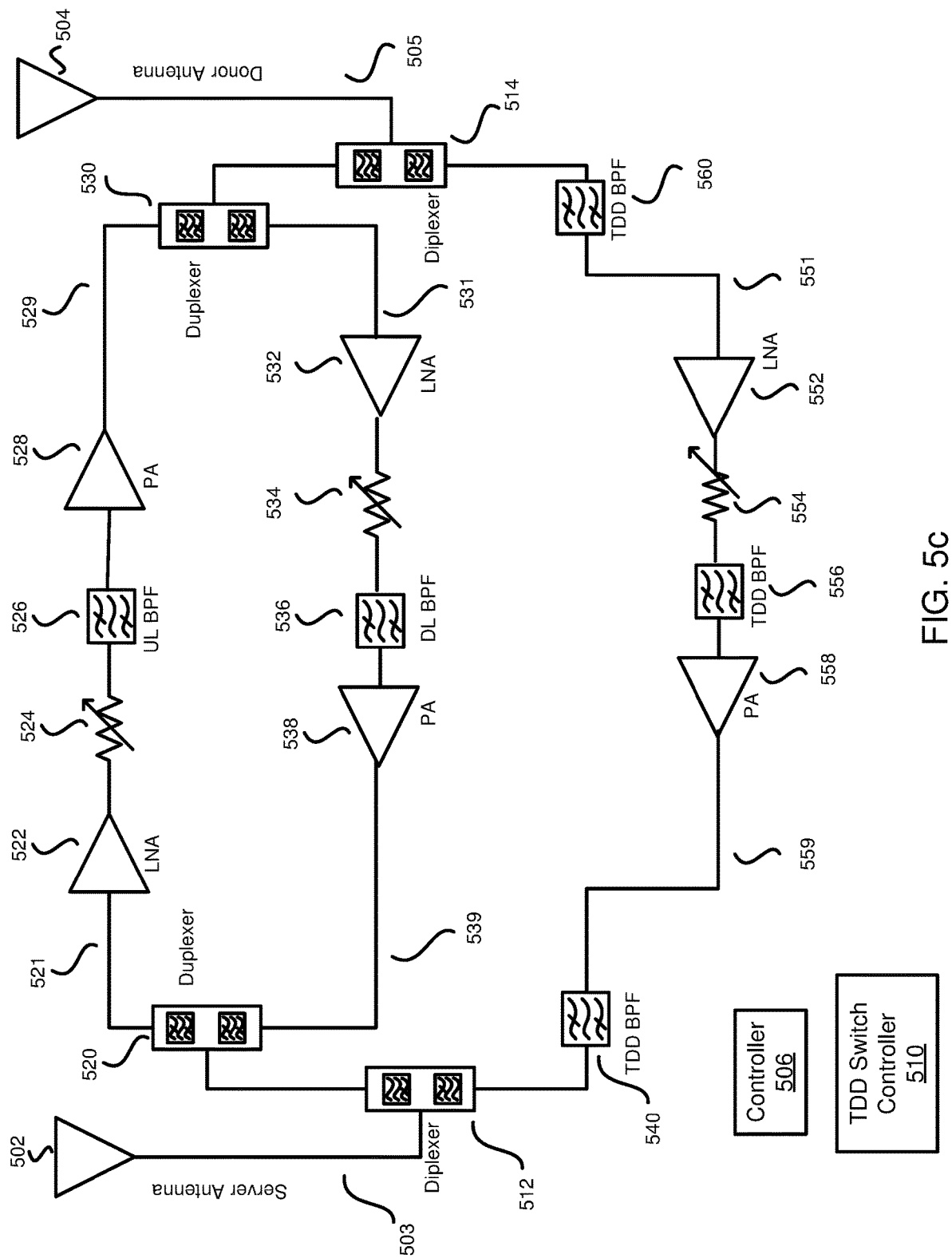
FIG. 5c illustrates a carrier-aggregation (CA) repeater in accordance with an example.

In another example, as illustrated in FIG. 5c, the diplexer 514 can be configured to be coupled to a TDD bandpass filter (BPF) 560 on a second path 551. A second-direction signal (e.g., a downlink signal) received at the second port 505 can be directed to the diplexer 514. The diplexer 514 can direct the second-direction signal, based on its frequency, to the TDD BPF 560 and the second path 551. The second path 551 can be configured to be coupled between the diplexer 514 and the diplexer 512. In another example, the second path may only comprise the second-direction path (e.g., the downlink path).

In another example, a second-direction signal can be directed from the second path 559 to the diplexer 512. The second-direction path of the second path can comprise one or more of: one or more low noise amplifiers (LNAs) 552, one or more variable attenuators 554, one or more filters 556, or one or more power amplifiers (PAs) 558. The one or more PAs 558 can comprise: a variable gain amplifier, a fixed-gain power amplifier, or a gain block. The one or more filters 556 can be configured to pass one or more of a second-direction (e.g., a downlink direction) of a second frequency range (e.g., 3GPP LTE TDD frequency bands 41, 48, or 49). In another example, the one or more filters 556 can be configured to pass one or more of a second-direction (e.g., a downlink direction) of 3GPP LTE TDD frequency bands 33-53, or 3GPP NR TDD frequency bands n34, n38-n41, n50, n51, n77-n79, n257, n258, n260, or n261. In another example, the one or more filters 556 can be configured to pass a selected channel within a 3GPP TDD band. The second-direction can be a downlink direction.

In another example, after being directed along the second-direction path of the second path, a second-direction signal of the second frequency range can be amplified and filtered in accordance with the type of amplifiers and filters including along the second-direction path of the second path. The second-direction signal can be further directed from the second path 559 to the TDD BPF 540 and to the diplexer 512. The second-direction signal can be directed from the diplexer 512 to the first port 503. The second-direction signal can be directed from the first port 503 to the first antenna 502.

The repeater can also comprise a controller 506. In one example, the controller 506 can include one or more processors and memory.

In another example, the repeater can comprise a TDD switch controller 510. The TDD switch controller 510 can comprise one or more of a modem, a field-programmable gate array (FPGA), or an application-specific integrated circuit (ASIC) that is configured to receive UL/DL configuration information from a base station or a UE and send a signal to one or more switches on the second path (not shown). The TDD switch controller 510 can be configured to switch between a DL configuration and an UL configuration in a 1 millisecond (ms) subframe basis for 3GPP LTE. The TDD switch controller 510 can be configured to switch between a DL configuration and an UL configuration on a symbol basis for 3GPP 5G, wherein the duration of a symbol can vary based on numerology.

In another example, a first-direction TDD frequency band (e.g., TDD band 41 UL) can be configured for carrier aggregation with a first-direction FDD band or frequency range (e.g., one or more of 3GPP FDD frequency bands 5, 25, or 26). In another example, a first-direction TDD frequency band (e.g., one or more of 3GPP LTE TDD frequency bands 33-53 or 3GPP 5G TDD frequency bands n34, n38-n41, n50, n51, n77-n79, n257, n258, n260, or n261) can be configured for carrier aggregation with a first-direction FDD band or frequency range (e.g., one or more of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74). In another example, a first-direction TDD frequency band can be configured for carrier aggregation or dual-connectivity to enable information configured for communication on the first-direction signal of the second frequency range to only be communicated on the first-direction signal of the first-frequency range without having a second first-direction filtering and amplification path for the first-direction signal of the second frequency range.

Figure 5D:
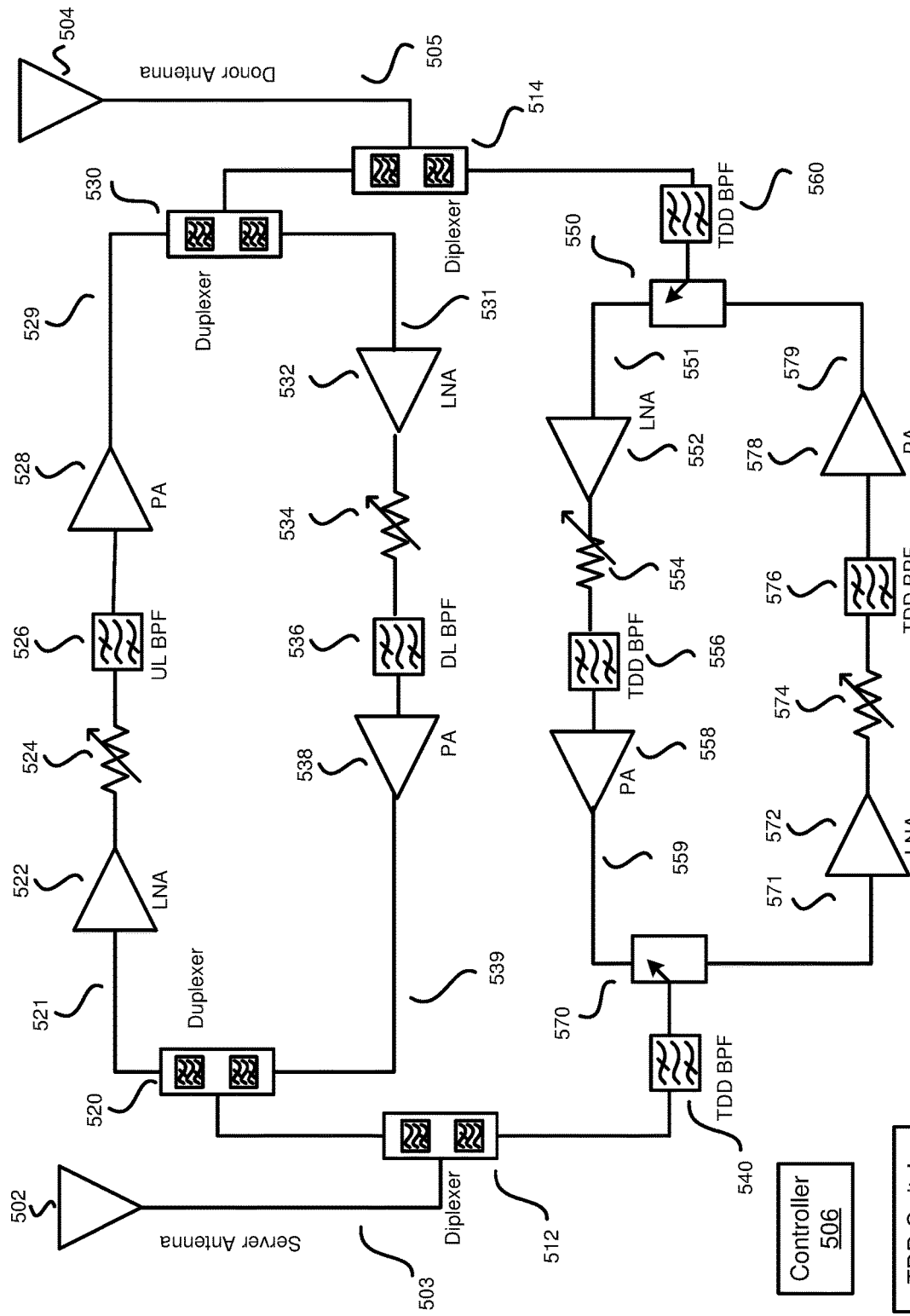
FIG. 5d illustrates a carrier aggregation (CA) repeater in accordance with an example.

In another example, as illustrated in FIG. 5d, a repeater can be configured to filter and amplify both FDD signals and TDD signals. As previously discussed, the repeater can be configured to amplify carrier aggregated signals that include one or more FDD DL signals that are not paired with an FDD UL signal. The UCI information for the one or more FDD DL signals can be communicated on another FDD UL signal of a different frequency band or channel. Typically, the UCI information can be sent on a primary component carrier to a primary cell. The UCI information on the primary component carrier can be amplified on a first direction path and sent to the second port 505 for communication to a donor antenna 504 for transmission to a base station.

Similarly, carrier aggregation can be performed by a UE and base station using multiple TDD signals. The repeater can be configured to amplify and filter one or more TDD DL signals without a corresponding TDD UL signal. A TDD UL signal and DL signal typically occupy the same bandwidth. UCI information for the TDD DL signal can be communicated on a different TDD UL signal or a FDD UL signal. The TDD UL signal or FDD UL signal on which the UCI information is sent will typically be communicated on a primary component carrier to a primary cell of the carrier aggregated signal. Alternatively, the TDD UL signal or FDD UL signal on which the UCI is sent can be communicated to a secondary base station (i.e. eNB) when the UE is configured for dual connectivity. In either case, the signal containing the UCI information can be amplified on a first direction path 571 of the repeater and sent to the second port 505 for communication to a donor antenna 504 for transmission to a base station associated with the primary cell or the secondary eNB. The TDD DL signals or FDD DL signals can also be amplified and transmitted from the repeater. This will be discussed more fully below.

The repeater illustrated in FIG. 5d can comprise a first switch 570 and a second switch 550. The first switch 570 can be coupled between a TDD BPF 540, the second-direction path of the second path 559 and a first-direction path of the second path 571. The second switch 550 can be coupled between the TDD BPF 560, the second-direction path of the second path 551 and the first-direction path of the second path 579. The first switch 570 or the second switch 550 can comprise one or more single-throw double pole switches.

In another example, a second-direction signal can be directed from the TDD BPF 560 to the second switch 550. The second switch 550 can be configured to direct the second-direction signal to the second-direction path of the second path 551. The second-direction path of the second path 551 can comprise one or more of: one or more low noise amplifiers (LNAs) 552, one or more variable attenuators 554, one or more filters 556, or one or more power amplifiers (PAs) 558. The one or more PAs 558 can comprise: a variable gain amplifier, a fixed-gain power amplifier, or a gain block. The one or more filters 556 can be configured to pass one or more of a second-direction (e.g., a downlink direction) of a second frequency range (e.g., 3GPP LTE TDD frequency bands 41, 48, or 49). In another example, the one or more filters 556 can be configured to pass one or more of a second-direction (e.g., a downlink direction) of 3GPP LTE TDD frequency bands 33-53, or 3GPP NR TDD frequency bands n34, n38-n41, n50, n51, n77-n79, n257, n258, n260, or n261. In another example, the one or more filters 556 can be configured to pass a selected channel within a 3GPP TDD band. The second-direction can be a downlink direction.

In another example, after being directed along the second-direction path of the second path, a second-direction signal of the second frequency range can be amplified and filtered in accordance with the type of amplifiers and filters including along the second-direction path of the second path. The second-direction signal can be further directed from the second path 559 to the first switch 570. The first switch 570 can be configured to direct the second-direction signal to the TDD BPF 540 and to the diplexer 512. The second-direction signal can be directed from the diplexer 512 to the first port 503. The second-direction signal can be directed from the first port 503 to the first antenna 502.

In another example, a first-direction signal can be directed from the TDD BPF 540 to the first switch 570. The first switch 570 can be configured to direct the first-direction signal to a first-direction path of the second path 571. The first-direction path of the second path 571 can comprise one or more of: one or more low noise amplifiers (LNAs) 572, one or more variable attenuators 574, one or more filters 576, or one or more power amplifiers (PAs) 578. The one or more PAs 578 can comprise: a variable gain amplifier, a fixed-gain power amplifier, or a gain block. The one or more filters 576 can be configured to pass one or more of a first-direction (e.g., an uplink direction) of a second frequency range (e.g., 3GPP LTE TDD frequency bands 41, 48, or 49). In another example, the one or more filters 576 can be configured to pass one or more of a first-direction (e.g., an uplink direction) of 3GPP LTE TDD frequency bands 33-53, or 3GPP NR TDD frequency bands n34, n38-n41, n50, n51, n77-n79, n257, n258, n260, or n261. In another example, the one or more filters 576 can be configured to pass a selected channel within a 3GPP TDD band. The first direction can be an uplink direction.

In another example, after being directed along the first-direction path of the second path, a first-direction signal of the second frequency range can be amplified and filtered in accordance with the type of amplifiers and filters including along the first-direction path of the second path. The first-direction signal can be further directed from the second path 579 to the second switch 550. The second switch 550 can be configured to direct the first-direction signal to the TDD BPF 550 and to the diplexer 514. The first-direction signal can be directed from the diplexer 514 to the second port 505. The first-direction signal can be directed from the second port 505 to the second antenna 504.

In another example, one or more amplifiers of the first-direction filtering and amplification path for the second path can be turned off, a variable attenuator can be increased, and/or a switch can be opened to reduce or turn off an output of the first-direction filtering and amplification so that the repeater meets the requirements of the regulatory body for transmission of a first-direction signal on the frequency range (i.e. band, bands, channel, or channels).

In another example, one or more amplifiers of the second-direction filtering and amplification path for the second path can be turned off, a variable attenuator can be increased, and/or a switch can be opened to reduce or turn off an output of the second-direction filtering and amplification so that the repeater meets the requirements of the regulatory body for transmission of a second-direction signal on the frequency range (i.e. band, bands, channel, or channels).

The TDD switch controller 510 can be configured to switch the first switch 570 and the second switch 550 between a DL configuration and an UL configuration in a 1 millisecond (ms) subframe basis for 3GPP LTE. The TDD switch controller 510 can be configured to switch the first switch 570 and the second switch 550 between a DL configuration and an UL configuration on a symbol basis for 3GPP 5G, wherein the duration of a symbol can vary based on numerology.

In another example, a first-direction TDD frequency band (e.g., TDD band 41 UL) can be configured for carrier aggregation with a first-direction FDD band or frequency range (e.g., one or more of 3GPP FDD frequency bands 5, 25, or 26), or a second-direction TDD frequency band (e.g., TDD band 41 UL) can be configured for carrier aggregation with a second-direction FDD band or frequency range (e.g., one or more of 3GPP FDD frequency bands 5, 25, or 26). In another example, a first-direction TDD frequency band (e.g., one or more of 3GPP LTE TDD frequency bands 33-53 or 3GPP 5G TDD frequency bands n34, n38-n41, n50, n51, n77-n79, n257, n258, n260, or n261) can be configured for carrier aggregation with a first-direction FDD band or frequency range (e.g., one or more of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74), or a second-direction TDD frequency band (e.g., one or more of 3GPP LTE TDD frequency bands 33-53 or 3GPP 5G TDD frequency bands n34, n38-n41, n50, n51, n77-n79, n257, n258, n260, or n261) can be configured for carrier aggregation with a second-direction FDD band or frequency range (e.g., one or more of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74). In another example, a first-direction TDD frequency band or a second-direction TDD frequency band can be configured for carrier aggregation or dual-connectivity to enable information configured for communication on the first-direction signal of the second frequency range or the second-direction signal of the second frequency range to only be communicated on the first-direction signal of the first-frequency range or the second-direction signal of the first-frequency range.

Figure 5F:
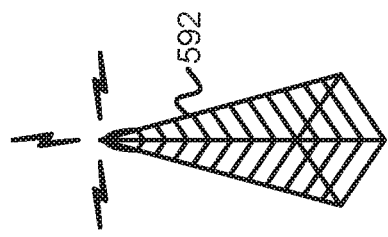
FIG. 5f illustrates a repeater with spatial isolation in accordance with an example.
Figure 5F:
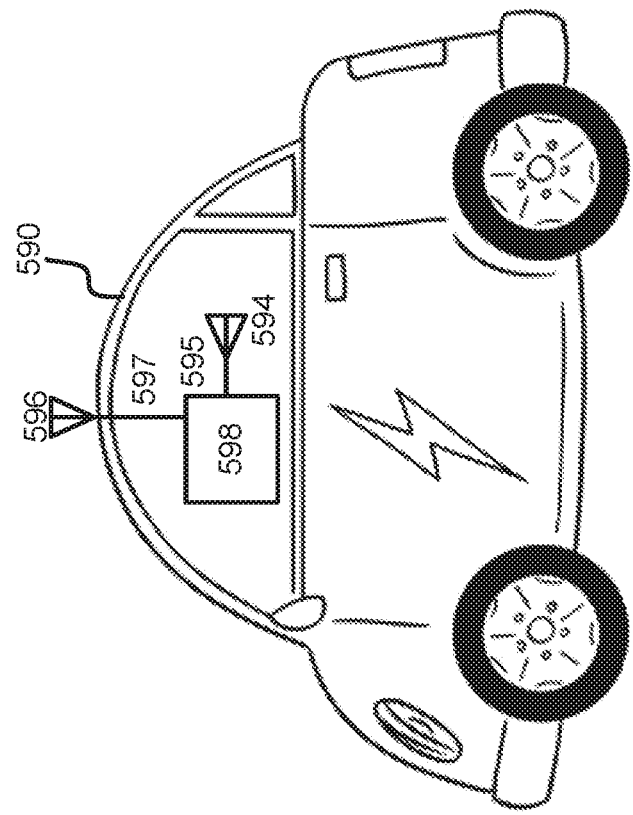
Figure 5E:
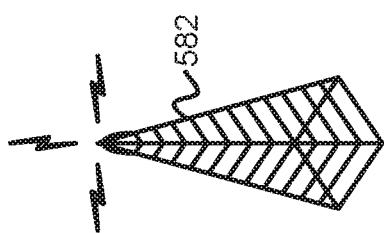
FIG. 5e illustrates a repeater with spatial isolation in accordance with an example.
Figure 5E:
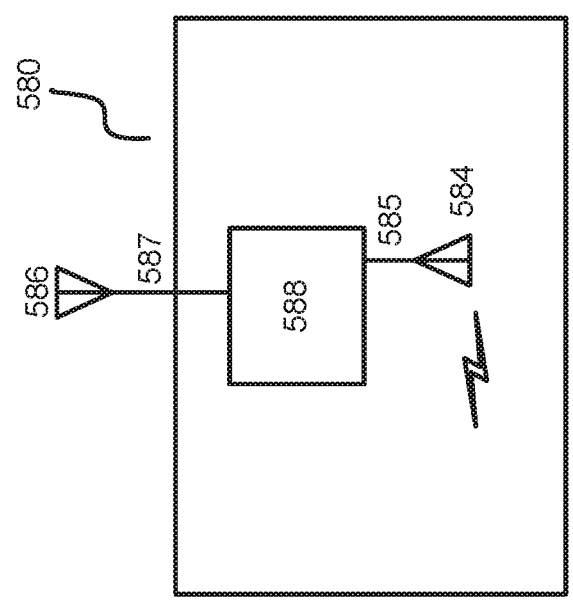

In another example, as illustrated in FIG. 5e, a repeater 588 can include a first port 585 and a second port 587. The first port 585 can be a server port that can be configured to be coupled to a first antenna 584 that can be a server antenna (or an inside antenna or device antenna). The second port 587 can be a donor port that can be configured to be coupled to a second antenna 586 that can be a donor antenna (or an outside antenna or node antenna).

In another example, the first antenna 584 can be located inside a structure 580 (e.g., a building). The structure 580 can provide spatial isolation for a first-direction signal or a second-direction signal (e.g., a downlink signal) of a second frequency range. The second frequency range, as discussed in the preceding, can be one or more of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. A downlink power of a first-direction signal or a second-direction signal can be limited to 50 mW (or 17 dBm) EIRP to allow the structure to adequately isolate the first-direction signal or the second-direction signal, wherein the first-direction signal or the second-direction signal can be a downlink signal. The first-direction signal or the second-direction signal of the second frequency range can be transmitted from the first antenna 584 to a user equipment, and a user equipment can transmit a first-direction signal or a second direction signal to the first antenna 584.

In another example, the second antenna 586 can be located outside the structure 580. A first-direction signal (e.g., an uplink signal) can be transmitted from the second antenna 586 to a base station 582.

In another example, as illustrated in FIG. 5f, a repeater can include a first port 595 and a second port 597. The first port 595 can be a server port that can be configured to be coupled to a first antenna 594 that can be a server antenna (or an inside antenna or device antenna). The second port 597 can be a donor port that can be configured to be coupled to a second antenna 596 that can be a donor antenna (or an outside antenna or node antenna).

In another example, the first antenna 594 can be located inside a vehicle 590. The vehicle 590 can provide spatial isolation for a first-direction signal or a second-direction signal (e.g., a downlink signal) of a second frequency range. The second frequency range, as discussed in the preceding, can be one or more of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. A gain of a downlink signal of a first-direction signal or a second-direction signal can be limited to 50 dB when using an inside antenna to allow the vehicle 590 to adequately isolate the first-direction signal or the second-direction signal, wherein the first-direction signal or the second-direction signal can be a downlink signal. The first-direction signal or the second-direction signal of the second frequency range can be transmitted from the first antenna 594, with a maximum gain of 50 dB, to a user equipment, and a user equipment can transmit a first-direction signal or a second direction signal to the first antenna 594.

In another example, the second antenna 596 can be located outside the vehicle 590. A first-direction signal (e.g., an uplink signal) can be transmitted from the second antenna 596 to a base station 592. The transmitted UL signal will be in a band or frequency range that is compliant with a regulatory body.

Figure 6A:
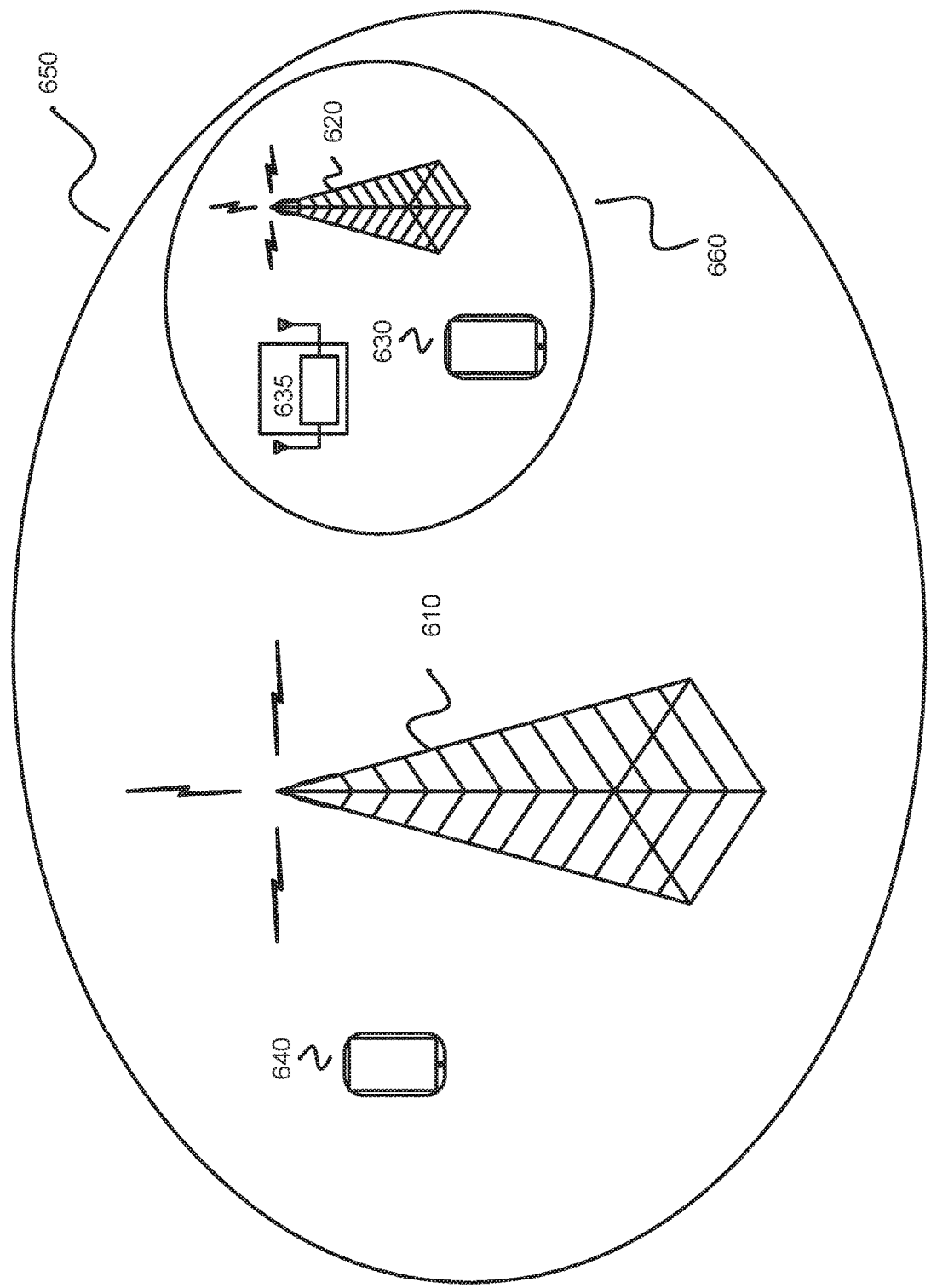
FIG. 6a illustrates a repeater configured for dual-connectivity in accordance with an example.

In another example, as illustrated in FIG. 6a, a wireless device 640 can be configured to be wirelessly connected to a base station 610. The base station 610 can have a coverage area 650. In another example, a wireless device 630 can be configured to be wirelessly connected to the base station 610 (e.g., a master eNB (MeNB)) and a base station 620 (e.g., a secondary eNB (SeNB)). The base station 620 can have a coverage area 660. A backhaul link (e.g., an X2 interface) can couple the base station 610 and the base station 620.

In another example, a repeater 635 can be configured to receive a second-direction signal (e.g., a downlink signal) of a first frequency range (e.g., 3GPP LTE FDD frequency bands 2, 4, 5, 12, 13, 17, 25, 26, or 71) from a base station 610. The repeater 635 can be configured to transmit the second-direction signal of the first frequency range to a wireless device 630.

In another example, the repeater 635 can be configured to receive a first-direction signal (e.g., an uplink signal) of a first frequency range (e.g., 3GPP LTE FDD frequency bands 2, 4, 5, 12, 13, 17, 25, 26, or 71) from the wireless device 630. The repeater 635 can be configured to transmit the first-direction signal of the first frequency range to the base station 610.

In another example, the repeater 635 can be configured to receive a second-direction signal (e.g., a downlink signal) of a second frequency range (e.g., 3GPP LTE FDD frequency bands 2, 4, 5, 12, 13, 17, 25, 26, 30, or 71) from a base station 620. The second-direction signal of the second frequency range can be transmitted from the repeater 635 to the wireless device 630.

In another example, the first-direction signal (e.g., an uplink signal) of the second frequency range (e.g., 3GPP LTE FDD frequency bands 2, 4, 5, 12, 13, 17, 25, 26, 30, or 71) can be associated with the first-direction signal of the first frequency range using dual-connectivity to enable information configured for communication on the first-direction signal of the second frequency range (e.g., 3GPP LTE FDD frequency bands 2, 4, 5, 12, 13, 17, 25, 26, 30, or 71) to only be communicated on the first-direction signal of the first frequency range without having a second first-direction filtering and amplification path in the repeater for the first-direction signal of the second frequency range.

In one example, UCI information transmitted by the UE to the MeNB 610 for the SeNB 620 can then be communicated by the MeNB 610 to the SeNB 620 via the X2 connection between the MeNB 610 and the SeNB 620. For example, ACK NACK information, such as hybrid automatic repeat request (HARQ) information for the DL signal from the SeNB 620 can be communicated from a UE in UCI to the MeNB 610. The MeNB 610 can then relay the ACK NACK information to the SeNB 620 to enable the SeNB to re-transmit symbols that were not received at the UE, Alternatively, the MeNB 610 may be configured to retransmit symbols that were originally transmitted by the SeNB 620 based on the HARQ ACK NACK information for the SeNB 620 received in UCI at the MeNB 610 from the UE.

In another example, the first frequency range and the second frequency range can be configured for dual-connectivity in operating band combinations selected from the 3GPP operating band combinations included in Table 5.5C-1 from 3GPP TS 36.101 V16.0.0 (2018-12), and depicted in Table 8.

TABLE 8

| 3GPP LTE Dual-Connectivity Band | 3GPP LTE Band |
|---|---|
| DC_1-3 | 1, 3 |
| DC_1-5 | 1, 5 |
| DC_1-7 | 1, 7 |
| DC_1-8 | 1, 8 |
| DC_1-11 | 1, 11 |
| DC_1-19 | 1, 19 |
| DC_1-20 | 1, 20 |
| DC_1-21 | 1, 21 |
| DC_1-42 | 1, 42 |
| DC_2-4 | 2, 4 |
| DC_2-5 | 2, 5 |
| DC_2-7 | 2, 7 |
| DC_2-12 | 2, 12 |
| DC_2-13 | 2, 13 |
| DC_2-30 | 2, 30 |
| DC_2-66 | 2, 66 |
| DC_3-5 | 3, 5 |
| DC_3-7 | 3, 7 |
| DC_3-8 | 3, 8 |
| DC_3-11 | 3, 11 |
| DC_3-18 | 3, 18 |
| DC_3-19 | 3, 19 |
| DC_3-20 | 3, 20 |
| DC_3-21 | 3, 21 |
| DC_3-26 | 3, 26 |
| DC_3-28 | 3, 28 |
| DC_3-40 | 3, 40 |
| DC_3-42 | 3, 42 |
| DC_4-5 | 4, 5 |
| DC_4-7 | 4, 7 |
| DC_4-12 | 4, 12 |
| DC_4-13 | 4, 13 |
| DC_4-17 | 4, 17 |
| DC_5-7 | 5, 7 |
| DC_5-12 | 5, 12 |
| DC_5-17 | 5, 17 |
| DC_5-30 | 5, 30 |
| DC_5-40 | 5, 40 |
| DC_5-66 | 5, 66 |
| DC_7-8 | 7, 8 |
| DC_7-20 | 7, 20 |
| DC_7-26 | 7, 26 |
| DC_7-28 | 7, 28 |
| DC_8-39 | 8, 39 |
| DC_8-41 | 8, 41 |
| DC_11-18 | 11, 18 |
| DC_11-26 | 11, 26 |
| DC_12-30 | 12, 30 |
| DC_12-66 | 12, 66 |
| DC_19-21 | 19, 21 |
| DC_19-42 | 19, 42 |
| DC_21-42 | 21, 42 |
| DC_21-28 | 21, 28 |
| DC_26-46 | 26, 46 |
| DC_26-48 | 26, 48 |
| DC_28-41 | 28, 41 |
| DC_28-42 | 28, 42 |
| DC_30-66 | 30, 66 |
| DC_39-41 | 39, 41 |
| DC_40-42 | 40, 42 |
| DC_41-42 | 41, 42 |

Figure 6B:
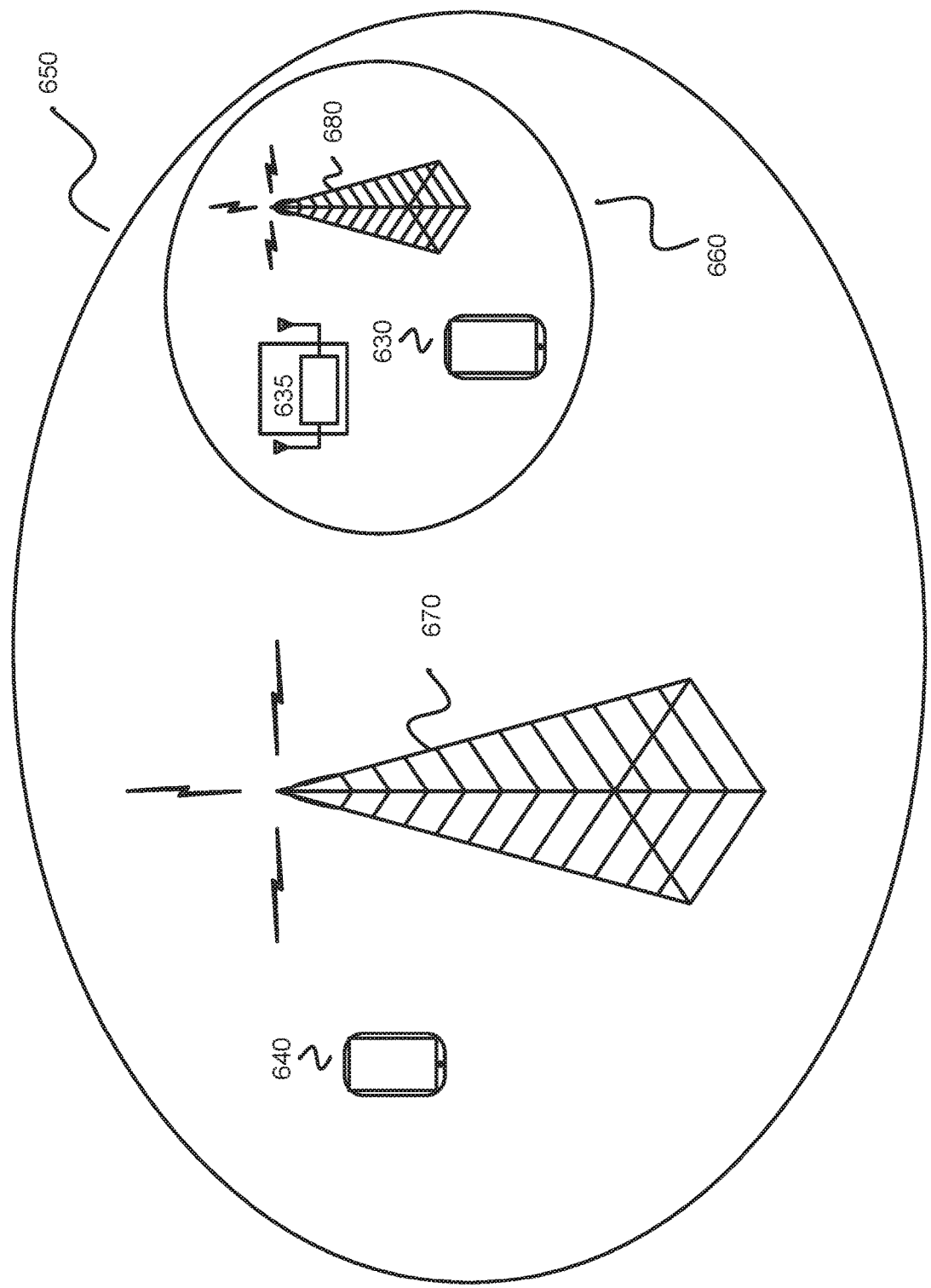
FIG. 6b illustrates a repeater configured for dual-connectivity in accordance with an example.

In another example, as illustrated in FIG. 6b, a base station 670 can be an eNB and a base station 680 can be an NR BS. In another example, the first frequency range and the second frequency range can be configured for dual-connectivity in operating band combinations selected from the 3GPP operating band combinations included in Table 5.2B.4.1-1 from 3GPP TS 38.101-3 V15.4.0 (2018-12), Table 5.2B.5.1-1 from 3GPP TS 38.101-3 V15.4.0 (2018-12), and Table 5.2B.7.1-1 from 3GPP TS 38.101-3 V15.4.0 (2018-12), and depicted in Table 9.

TABLE 9

| 3GPP Dual-Connectivity Band | 3GPP LTE Band | 3GPP NR Band |
|---|---|---|
| DC_1_n28 | 1 | n28 |
| DC_1_n40 | 1 | n40 |
| DC_1_n51 | 1 | n51 |
| DC_1_n77 | 1 | n77 |
| DC_1_n78 | 1 | n78 |
| DC_1_n79 | 1 | n79 |
| DC_2_n5 | 2 | n5 |
| DC_2_n66 | 2 | n66 |
| DC_2_n71 | 2 | n71 |
| DC_2_n78 | 2 | n78 |
| DC_3_n7 | 3 | n7 |
| DC_3_n28 | 3 | n28 |
| DC_3_n40 | 3 | n40 |
| DC_3_n51 | 3 | n51 |
| DC_3_n77 | 3 | n77 |
| DC_3_n78 | 3 | n78 |
| DC_3_n79 | 3 | n79 |
| DC_5_n40 | 5 | n40 |
| DC_5_n66 | 5 | n66 |
| DC_5_n78 | 5 | n78 |
| DC_7_n28 | 7 | n28 |
| DC_7_n51 | 7 | n51 |
| DC_7_n78 | 7 | n78 |
| DC_7-7_n78 | CA_7-7 | n78 |
| DC_8_n40 | 8 | n40 |
| DC_8_n77 | 8 | n77 |
| DC_8_n78 | 8 | n78 |
| DC_8_n79 | 8 | n79 |
| DC_11_n77 | 11 | n77 |
| DC_11_n78 | 11 | n78 |
| DC_11_n79 | 11 | n79 |
| DC_12_n5 | 12 | n5 |
| DC_12_n66 | 12 | n66 |
| DC_18_n77 | 18 | n77 |
| DC_18_n78 | 18 | n78 |
| DC_18_n79 | 18 | n79 |
| DC_19_n77 | 19 | n77 |
| DC_19_n78 | 19 | n78 |
| DC_19_n79 | 19 | n79 |
| DC_20_n8 | 20 | n8 |
| DC_20_n28 | 20 | n28 |
| DC_20_n51 | 20 | n51 |
| DC_20_n77 | 20 | n77 |
| DC_20_n78 | 20 | n78 |
| DC_21_n77 | 21 | n77 |

TABLE 9-continued

| 3GPP Dual-Connectivity Band | 3GPP LTE Band | 3GPP NR Band |
|---|---|---|
| DC_21_n78 | 21 | n78 |
| DC_21_n79 | 21 | n79 |
| DC_25_n41 | 25 | n41 |
| DC_26_n41 | 26 | n41 |
| DC_26_n77 | 26 | n77 |
| DC_26_n78 | 26 | n78 |
| DC_26_n79 | 26 | n79 |
| DC_28_n51 | 28 | n51 |
| DC_28_n77 | 28 | n77 |
| DC_28_n78 | 28 | n78 |
| DC_28_n79 | 28 | n79 |
| DC_30_n5 | 30 | n5 |
| DC_30_n66 | 30 | n66 |
| DC_38_n78 | 38 | n78 |
| DC_39_n78 | 39 | n78 |
| DC_39_n79 | 39 | n79 |
| DC_40_n77 | 40 | n77 |
| DC_41_n77 | 41 | n77 |
| DC_41_n78 | 41 | n78 |
| DC_41_n79 | 41 | n79 |
| DC_42_n51 | 42 | n51 |
| DC_42_n77 | 42 | n77 |
| DC_42_n78 | 42 | n78 |
| DC_42_n79 | 42 | n79 |
| DC_66_n71 | 66 | n71 |
| DC_66_n5 | 66 | n5 |
| DC_66_n78 | 66 | n78 |
| DC_1_n257 | 1 | n257 |
| DC_2-2_n257 | CA_2-2 | n257 |
| DC_2_n257 | CA_2 | n257 |
| DC_2_n260 | 2 | n260 |
| DC_2_n260 | CA_2 | n260 |
| DC_2-2_n260 | CA_2-2 | n260 |
| DC_3_n257 | 3 | n257 |
| DC_3_n258 | 3 | n258 |
| DC_5_n257 | 5 | n257 |
| DC_5-5_n257 | CA_5-5 | n257 |
| DC_5-5_n260 | CA_5-5 | n260 |
| DC_5_n260 | 5 | n260 |
| DC_5_n261 | 5 | n261 |
| DC_7-7_n257 | CA_7-7 | n257 |
| DC_7_n257 | 7 | n257 |
| DC_7_n258 | 7 | n258 |
| DC_8_n257 | 8 | n257 |
| DC_8_n258 | 8 | n258 |
| DC_11_n257 | 11 | n257 |
| DC_12_n260 | 12 | n260 |
| DC_13_n257 | 13 | n257 |
| DC_13_n260 | 13 | n260 |
| DC_18_n257 | 18 | n257 |
| DC_19_n257 | 19 | n257 |
| DC_20_n258 | 20 | n258 |
| DC_21_n257 | 21 | n257 |
| DC_26_n257 | 26 | n257 |
| DC_28_n257 | 28 | n257 |
| DC_28_n258 | 28 | n258 |
| DC_30_n260 | 30 | n260 |
| DC_39_n258 | 39 | n258 |
| DC_41_n257 | 41 | n257 |
| DC_41_n258 | 41 | n258 |
| DC_42_n257 | 42 | n257 |
| DC_48-48_n257 | CA_48-48 | n257 |
| DC_48_n257 | CA_48 | n257 |
| DC_48-48_n260 | CA_48-48 | n260 |
| DC_48_n260 | CA_48 | n260 |
| DC_66-66_n257 | CA_66-66 | n257 |
| DC_66_n257 | 66 | n257 |
| DC_66-66_n260 | CA_66-66 | n260 |
| DC_66_n260 | 66 | n260 |
| DC_66_n261 | 66 | n261 |
| DC_n77-n257 | N/A | n77, n257 |
| DC_n78-n257 | N/A | n78, n257 |
| DC_n79-n257 | N/A | n79, n257 |

Figure 7A:
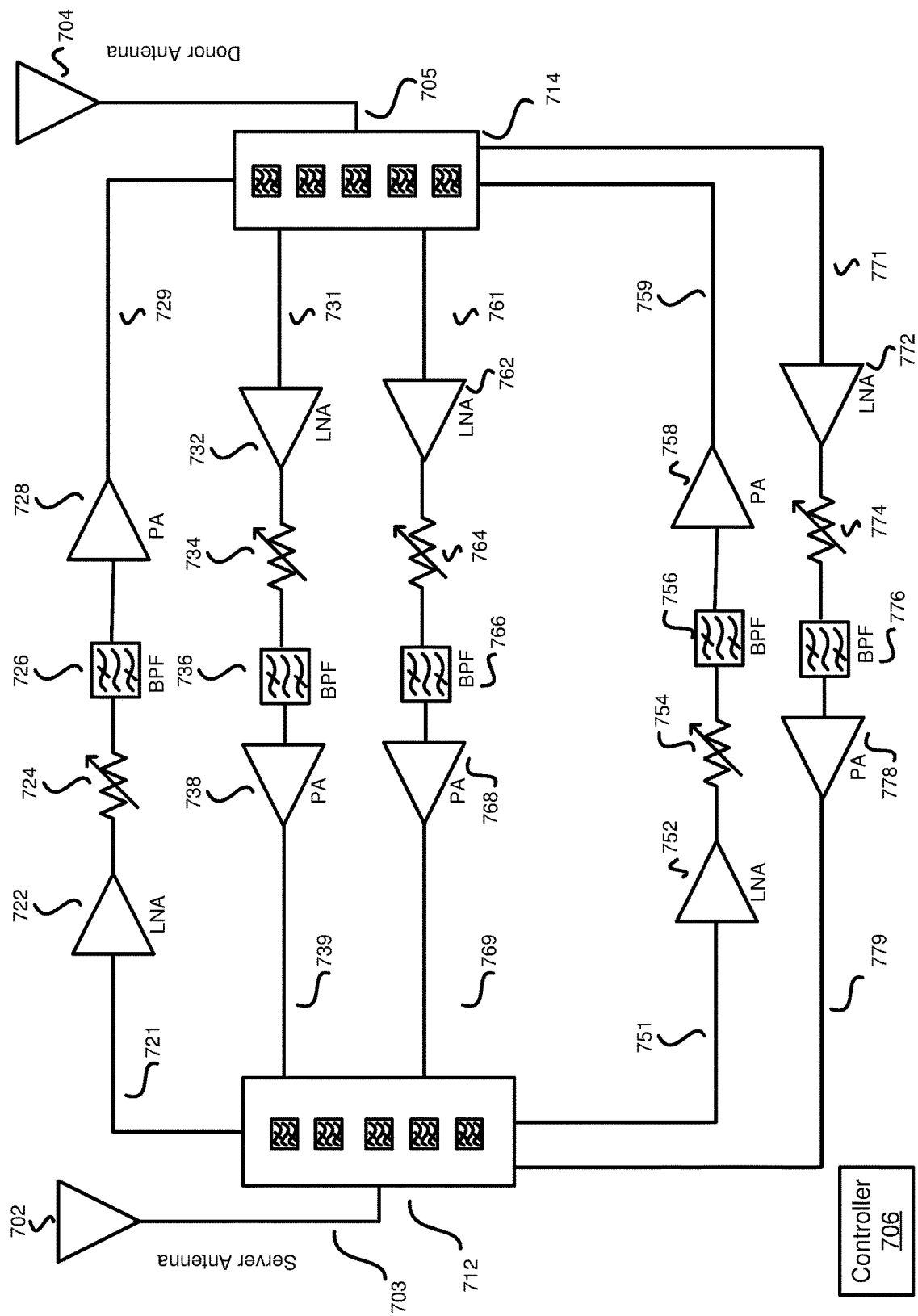
FIG. 7a illustrates a carrier-aggregation (CA) repeater in accordance with an example.

In another example, as illustrated in FIG. 7a, a repeater can comprise a first port 703 (e.g., a server port, a device port, or an inside port) and a second port 705 (e.g., a donor port, a node port, or an outside port). The first port 703 can be configured to be coupled to a first antenna 702 (a server antenna, a device antenna, or an inside antenna). The first antenna 702 can be configured to receive a first-direction signal (e.g., an uplink signal) from a wireless device and transmit a second-direction signal (e.g., a downlink signal) to a wireless device. The second port 705 can be configured to be coupled to a second antenna 704 (a donor antenna, a node antenna, or an outside antenna). The second antenna 704 can be configured to transmit a first-direction signal (e.g., an uplink signal) to a base station (e.g., an evolved node B (eNB), a new radio (NR) node B (gNB), or an NR base station (NR BS)) and receive a second-direction signal (e.g., a downlink signal) from a base station. The repeater can also comprise a controller 706. In one example, the controller 706 can include one or more processors and memory.

In another example, the first port 703 can be configured to be coupled to a multiplexer 712 (or a diplexer, a duplexer, a circulator, or a splitter). The multiplexer 712 can be configured to be coupled to a first-direction path (e.g., an uplink path) 721, a first-direction path (e.g., an uplink path) 751, a second-direction path (e.g., a downlink path) 739, a second-direction path (e.g., a downlink path) 769, and a second-direction path (e.g., a downlink path) 779. A first-direction signal received at the first port 703 can be directed to the multiplexer 712. The multiplexer 712 can direct the first-direction signal, based on its frequency, to the first-direction path 721 or the first-direction path 751.

In another example, the second port 705 can be configured to be coupled to a multiplexer 714 (or a diplexer, a duplexer, a circulator, or a splitter). The multiplexer 714 can be configured to be coupled to the first-direction path (e.g., an uplink path) 729, the first-direction path (e.g., an uplink path) 759, the second-direction path (e.g., a downlink path) 731, the second-direction path (e.g., a downlink path) 761, and the second-direction path (e.g., a downlink path) 771. A second-direction signal received at the second port 705 can be directed to the multiplexer 714. The multiplexer 714 can direct the second-direction signal, based on its frequency, to the second-direction path 731, the second-direction path 761, or the second-direction path 771.

In another example, a first-direction signal can be directed from the multiplexer 712 to the first-direction path of the first path 721 (i.e. a first first-direction path). The first-direction path of the first path 721 can comprise one or more of: one or more low noise amplifiers (LNAs) 722, one or more variable attenuators 724, one or more filters 726, or one or more power amplifiers (PAs) 728. The one or more PAs 728 can comprise: a variable gain amplifier, a fixed-gain power amplifier, or a gain block. The one or more filters 726 can be configured to pass one or more of a first-direction (e.g., an uplink direction) of a first frequency range (e.g., one or more of 3GPP FDD frequency bands 2, 4, 5, 12, 13, 17, 25, 26, or 71). In another example, the one or more filters 726 can be configured to pass one or more of a first-direction (e.g., an uplink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 726 can be configured to pass a selected channel within a 3GPP FDD band. The first-direction can be an uplink direction or a downlink direction.

In another example, after being directed along the first-direction path of the first path 721, a first-direction signal of the first frequency range can be amplified and filtered in accordance with the type of amplifiers and filters including along the first-direction path of the first path 721. The first-direction signal can be further directed to the multiplexer 714. The multiplexer 714 can direct the amplified and/or filtered first-direction signal from 729 to the second port 705. The first-direction signal can be directed from the second port 705 to the second antenna 704.

In another example, a second-direction signal can be directed from the multiplexer 714 to the second-direction path of the first path 731 (i.e. the first second-direction path). The second-direction path of the first path 731 can comprise one or more of: one or more low noise amplifiers (LNAs) 732, one or more variable attenuators 734, one or more filters 736, or one or more power amplifiers (PAs) 738. The one or more PAs 738 can comprise: a variable gain amplifier, a fixed-gain power amplifier, or a gain block. The one or more filters 736 can be configured to pass one or more of a second-direction (e.g., a downlink direction) of a first frequency range (e.g., 3GPP LTE FDD frequency bands 2, 4, 5, 12, 13, 17, 25, 26, or 71). In another example, the one or more filters 736 can be configured to pass one or more of a second-direction (e.g., a downlink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 736 can be configured to pass a selected channel within a 3GPP FDD band. The second-direction can be an uplink direction or a downlink direction.

In another example, after being directed along the second-direction path 731, a second-direction signal of the first frequency range can be amplified and filtered in accordance with the type of amplifiers and filters including along the second-direction path of the first path 731. The second-direction signal can be further directed to the multiplexer 712. The multiplexer 712 can direct the amplified and/or filtered second-direction signal from 739 to the first port 703. The second-direction signal can be directed from the first port 703 to the first antenna 702.

In another example, the multiplexer 714 can be configured to be coupled to the second-direction path 761. A second-direction signal received at the second port 705 can be directed to the multiplexer 714. The multiplexer 714 can direct the second-direction signal, based on its frequency, to the second path 761. The second path 761 can be configured to be coupled between the multiplexer 714 and the multiplexer 712. In another example, the second path may only comprise the second-direction path (e.g., the downlink path) without further comprising an associated first-direction path (e.g., the uplink path).

In another example, a second-direction signal can be directed from the second path 761 to the multiplexer 712. The second-direction path of the second path can comprise one or more of: one or more low noise amplifiers (LNAs) 762, one or more variable attenuators 764, one or more filters 766, or one or more power amplifiers (PAs) 768. The one or more PAs 768 can comprise: a variable gain amplifier, a fixed-gain power amplifier, or a gain block. The one or more filters 766 can be configured to pass one or more of a second-direction (e.g., a downlink direction) of a second frequency range (e.g., 3GPP LTE FDD frequency bands 2, 4, 5, 12, 13, 17, 25, 26, 30, or 71). In another example, the one or more filters 766 can be configured to pass one or more of a second-direction (e.g., a downlink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 766 can be configured to pass a selected channel within a 3GPP FDD band. The second-direction can be a downlink direction.

In another example, after being directed along the second-direction path of the second path 761, a second-direction signal of the second frequency range can be amplified and filtered in accordance with the type of amplifiers and filters including along the second-direction path of the second path. The second-direction signal can be further directed from 769 to the multiplexer 712. The second-direction signal can be directed from the multiplexer 712 to the first port 703. The second-direction signal can be directed from the first port 703 to the first antenna 702.

In another example, a first-direction signal (e.g., an uplink signal) of the second frequency range (e.g., 3GPP LTE operating band 30) can be associated with the first-direction signal of the first frequency range using carrier aggregation (CA) to enable information configured for communication on the first-direction signal of the second frequency range (e.g., 3GPP LTE operating band 30) to only be communicated on the first-direction signal of the first frequency range without having a second first-direction filtering and amplification path for the first-direction signal of the second frequency range (e.g., 3GPP LTE operating band 30).

In another example, the carrier-aggregated first-direction signal can be directed from the multiplexer 712 to the first-direction path of the first path 721. As discussed in the preceding, the first-direction path of the first path 721 can comprise one or more of: one or more low noise amplifiers (LNAs) 722, one or more variable attenuators 724, one or more filters 726, or one or more power amplifiers (PAs) 728.

In another example, after being directed along the first-direction path, the carrier-aggregated first-direction signal of the first frequency range can be amplified and filtered in accordance with the type of amplifiers and filters including along the first-direction path of the first path. The carrier-aggregated first-direction signal can be further directed to the multiplexer 714. The multiplexer 714 can direct the amplified and/or filtered carrier-aggregated first-direction signal to the second port 705. The carrier-aggregated first-direction signal can be directed from the second port 705 to the second antenna 704.

In another example, a downlink output power from an output of the second second-direction filtering and amplification path can be less than a threshold in accordance with FCC regulations. In one example, the threshold can be 50 milliwatts (mW) (or 17 decibel-milliwatts (dBm)) conducted power and equivalent isotropic radiated power (EIRP) for each band of operation.

In another example, the first-direction signal (e.g., an uplink signal) of the second frequency range (e.g., 3GPP LTE operating band 30) can be prohibited by a regulatory body (e.g., the FCC) from amplification using a repeater. In another example, the repeater can be an FCC-compliant consumer signal booster.

In another example, the first-direction signal (e.g., an uplink signal) of the second frequency range (e.g., 3GPP LTE operating band 30) can be prohibited by a regulatory body (e.g., the FCC) from amplification using a repeater (e.g., a consumer signal booster) due to adjacent signal interference with the first-direction signal of the second frequency range. Regulatory bodies may prohibit the repeater from amplification on the first-direction signal of the second frequency range because of potential in-band interference to incumbent or shared users on the same frequency band or interference to adjacent frequency bands.

In another example, a first-direction signal can be directed from the multiplexer 712 to the first-direction path of the third path 751 (i.e. a third first-direction path). The first-direction path of the third path 751 can comprise one or more of: one or more low noise amplifiers (LNAs) 752, one or more variable attenuators 754, one or more filters 756, or one or more power amplifiers (PAs) 758. The one or more PAs 758 can comprise: a variable gain amplifier, a fixed-gain power amplifier, or a gain block. The one or more filters 756 can be configured to pass one or more of a first-direction (e.g., an uplink direction) of a third frequency range (e.g., one or more of 3GPP FDD frequency bands 2, 4, 5, 12, 13, 17, 25, 26, or 71), wherein the third frequency range may not include the same frequency range as the second frequency range. In another example, the one or more filters 756 can be configured to pass one or more of a first-direction (e.g., an uplink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 756 can be configured to pass a selected channel within a 3GPP FDD band. The first-direction can be an uplink direction or a downlink direction.

In another example, after being directed along the first-direction path of the third path 751, a first-direction signal of a third frequency range can be amplified and filtered in accordance with the type of amplifiers and filters including along the first-direction path of the third path 751. The first-direction signal can be further directed from 759 to the multiplexer 714. The multiplexer 714 can direct the amplified and/or filtered first-direction signal from 759 to the second port 705. The first-direction signal can be directed from the second port 705 to the second antenna 704. In another example, the third frequency range may not include the same frequency range as the second frequency range.

In another example, a second-direction signal can be directed from the multiplexer 714 to the second-direction path of the third path 771 (i.e. the third second-direction path). The second-direction path of the third path 771 can comprise one or more of: one or more low noise amplifiers (LNAs) 772, one or more variable attenuators 774, one or more filters 776, or one or more power amplifiers (PAs) 778. The one or more PAs 778 can comprise: a variable gain amplifier, a fixed-gain power amplifier, or a gain block. The one or more filters 776 can be configured to pass one or more of a second-direction (e.g., a downlink direction) of a third frequency range (e.g., 3GPP LTE FDD frequency bands 2, 4, 5, 12, 13, 17, 25, 26, or 71), wherein the third frequency range may not include the same frequency range as the second frequency range. In another example, the one or more filters 736 can be configured to pass one or more of a second-direction (e.g., a downlink direction) of 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261. In another example, the one or more filters 776 can be configured to pass a selected channel within a 3GPP FDD band. The second-direction can be an uplink direction or a downlink direction.

In another example, after being directed along the second-direction path 771, a second-direction signal of the third frequency range can be amplified and filtered in accordance with the type of amplifiers and filters including along the second-direction path of the third path 771. The second-direction signal can be further directed from 779 to the multiplexer 712. The multiplexer 712 can direct the amplified and/or filtered second-direction signal from 779 to the first port 703. The second-direction signal can be directed from the first port 703 to the first antenna 702.

In another example, information configured for communication on the first-direction signal (e.g., an uplink signal) of the second frequency range can be communicated using a lower-frequency first-direction signal than the second-direction signal (e.g., a downlink signal) of the second frequency range. In one example, the second-direction signal of the second frequency range can be selected from FR2 and the lower-frequency first-direction signal can be selected from FR1.

In another example, one or more second-direction amplification and filtering paths can be configured to be coupled to one first port and one second port. The first port can be configured to be coupled to one first antenna and the second port can be configured to be coupled to one second antenna.

In another example, the first-direction power (e.g., UL power) transmitted from the repeater can be reduced based on the second-direction power (e.g., DL power) received at the repeater for purposes of network protection. When information configured for communication on the first-direction signal of the second frequency range is configured for communication on the first-direction signal of the first frequency range using carrier aggregation or dual-connectivity, then network protection may not be based on the second-direction power of the second frequency range. In this situation, the first-direction power can be reduced based on the second-direction power of the first frequency range and not the second-direction power of the second frequency range.

In another example, a wireless connection between a wireless device and a repeater, as previously discussed in relation to FIG. 3, can be used to communicate carrier aggregation usage between the wireless device and the repeater. Network protection can be adjusted based on the carrier aggregation usage.

In another example, the selected frequency range of the first-direction signal and the selected frequency range of the second-direction signal can be configured for carrier aggregation in CA operating band combinations selected from the 3GPP operating band combinations included in Table 5.5A-2a and Table 5.5A-2b and Table 5.5A-2c from 3GPP TS 36.101 V16.0.0 (2018-12), and depicted in Table 10.

TABLE 10

| 3GPP LTE CA Band | 3GPP LTE Band |
| --- | --- |
| CA_1-3-5 | 1, 3, 5 |
| CA_1-1-3-5 | 1, 3, 5 |
| CA_1-1-3-7 | 1, 3, 7 |
| CA_1-3-7 | 1, 3, 7 |
| CA_1-3-3-7 | 1, 3, 7 |
| CA_1-3-3-7-7 | 1, 3, 7 |
| CA_1-3-7-7 | 1, 3, 7 |
| CA_1-3-8 | 1, 3, 8 |
| CA_1-3-3-8 | 1, 3, 8 |

TABLE 10-continued

| 3GPP LTE CA Band | 3GPP LTE Band |
|---|---|
| CA_1-3-3-43 | 1, 3, 43 |
| CA_1-3-11 | 1, 3, 11 |
| CA_1-3-18 | 1, 3, 18 |
| CA_1-3-19 | 1, 3, 19 |
| CA_1-3-3-19 | 1, 3, 19 |
| CA_1-3-20 | 1, 3, 20 |
| CA_1-3-3-20 | 1, 3, 20 |
| CA_1-3-21 | 1, 3, 21 |
| CA_1-3-3-21 | 1, 3, 21 |
| CA_1-3-26 | 1, 3, 26 |
| CA_1-3-28 | 1, 3, 28 |
| CA_1-3-3-28 | 1, 3, 28 |
| CA_1-1-3-28 | 1, 3, 28 |
| CA_1-3-32 | 1, 3, 32 |
| CA_1-3-38 | 1, 3, 38 |
| CA_1-3-40 | 1, 3, 40 |
| CA_1-3-41 | 1, 3, 41 |
| CA_1-3-42 | 1, 3, 42 |
| CA_1-3-3-42 | 1, 3, 42 |
| CA_1-3-43 | 1, 3, 43 |
| CA_1-3-46 | 1, 3, 46 |
| CA_1-5-7 | 1, 5, 7 |
| CA_1-5-7-7 | 1, 5, 7 |
| CA_1-5-40 | 1, 5, 40 |
| CA_1-5-41 | 1, 5, 41 |
| CA_1-5-46 | 1, 5, 46 |
| CA_1-7-8 | 1, 7, 8 |
| CA_1-7-7-8 | 1, 7, 8 |
| CA_1-7-20 | 1, 7, 20 |
| CA_1-7-26 | 1, 7, 26 |
| CA_1-7-7-26 | 1, 7, 26 |
| CA_1-7-28 | 1, 7, 28 |
| CA_1-7-32 | 1, 7, 32 |
| CA_1-7-40 | 1, 7, 40 |
| CA_1-7-42 | 1, 7, 42 |
| CA_1-7-46 | 1, 7, 46 |
| CA_1-8-11 | 1, 8, 11 |
| CA_1-8-20 | 1, 8, 20 |
| CA_1-8-28 | 1, 8, 28 |
| CA_1-8-38 | 1, 8, 38 |
| CA_1-8-40 | 1, 8, 40 |
| CA_1-11-18 | 1, 11, 18 |
| CA_1-11-28 | 1, 11, 28 |
| CA_1-18-281 | 1, 18, 28 |
| CA_1-18-42 | 1, 18, 42 |
| CA_1-19-21 | 1, 19, 21 |
| CA_1-19-282 | 1, 19, 28 |
| CA_1-19-42 | 1, 19, 42 |
| CA_1-20-281 | 1, 20, 28 |
| CA_1-20-32 | 1, 20, 32 |
| CA_1-20-42 | 1, 20, 42 |
| CA_1-20-43 | 1, 20, 43 |
| CA_1-21-28 | 1, 21, 28 |
| CA_1-21-42 | 1, 21, 42 |
| CA_1-28-40 | 1, 28, 40 |
| CA_1-28-42 | 1, 28, 42 |
| CA_1-32-42 | 1, 32, 42 |
| CA_1-32-43 | 1, 32, 43 |
| CA_1-41-42 | 1, 41, 42 |
| CA_1-42-42 | 1, 42, 42 |
| CA_1-42-43 | 1, 42, 43 |
| CA_2-4-5 | 2, 4, 5 |
| CA_2-2-4-5 | 2, 4, 5 |
| CA_2-4-4-5 | 2, 4, 5 |
| CA_2-4-12-12 | 2, 4, 12 |
| CA_2-5-12-12 | 2, 5, 12 |
| CA_2-2-5-30 | 2, 5, 30 |
| CA_2-5-46 | 2, 5, 46 |
| CA_2-2-5-66 | 2, 5, 66 |
| CA_2-2-7-12 | 2, 7, 12 |
| CA_2-2-7-66 | 2, 7, 66 |
| CA_2-7-66-66 | 2, 7, 66 |
| CA_2-2-12-30 | 2, 12, 30 |
| CA_2-2-12-66 | 2, 12, 66 |
| CA_2-2-12-66-66 | 2, 12, 66 |
| CA_2-2-13-66 | 2, 13, 66 |
| CA_2-2-14-66-66 | 2, 14, 66 |
| CA_2-2-30-66 | 2, 30, 66 |
| CA_2-4-7 | 2, 4, 7 |
| CA_2-4-7-7 | 2, 4, 7 |
| CA_2-4-12 | 2, 4, 12 |
| CA_2-2-4-12 | 2, 4, 12 |
| CA_2-2-5-66-66 | 2, 5, 66 |
| CA_2-4-4-12 | 2, 4, 12 |
| CA_2-4-13 | 2, 4, 13 |
| CA_2-4-28 | 2, 4, 28 |
| CA_2-4-29 | 2, 4, 29 |
| CA_2-4-30 | 2, 4, 30 |
| CA_2-4-71 | 2, 4, 71 |
| CA_2-2-4-71 | 2, 4, 71 |
| CA_2-5-7 | 2, 5, 7 |
| CA_2-5-12 | 2, 5, 12 |
| CA_2-2-5-12 | 2, 5, 12 |
| CA_2-5-13 | 2, 5, 13 |
| CA_2-5-28 | 2, 5, 28 |
| CA_2-5-29 | 2, 5, 29 |
| CA_2-5-30 | 2, 5, 30 |
| CA_2-5-46 | 2, 5, 46 |
| CA_2-5-66 | 2, 5, 66 |
| CA_2-5-66-66 | 2, 5, 66 |
| CA_2-7-12 | 2, 7, 12 |
| CA_2-7-28 | 2, 7, 28 |
| CA_2-7-30 | 2, 7, 30 |
| CA_2-7-46 | 2, 7, 46 |
| CA_2-7-66 | 2, 7, 66 |
| CA_2-7-7-66 | 2, 7, 66 |
| CA_2-12-30 | 2, 12, 30 |
| CA_2-12-66 | 2, 12, 66 |
| CA_2-12-66-66 | 2, 12, 66 |
| CA_2-13-46 | 2, 13, 46 |
| CA_2-13-48 | 2, 13, 48 |
| CA_2-13-48-48 | 2, 13, 48 |
| CA_2-13-66 | 2, 13, 66 |
| CA_2-13-66-66 | 2, 13, 66 |
| CA_2-14-30 | 2, 14, 30 |
| CA_2-2-14-30 | 2, 14, 30 |
| CA_2-14-66 | 2, 14, 66 |
| CA_2-2-14-66 | 2, 14, 66 |
| CA_2-14-66-66 | 2, 14, 66 |
| CA_2-14-66-66-66 | 2, 14, 66 |
| CA_2-2-29-30 | 2, 29, 30 |
| CA_2-29-30 | 2, 29, 30 |
| CA_2-29-66 | 2, 29, 66 |
| CA_2-30-66 | 2, 30, 66 |
| CA_2-30-66-66 | 2, 30, 66 |
| CA_2-46-48 | 2, 46, 48 |
| CA_2-46-66 | 2, 46, 66 |
| CA_2-46-46-66 | 2, 46, 66 |
| CA_2-48-66 | 2, 48, 66 |
| CA_2-48-48-66 | 2, 48, 66 |
| CA_2-66-71 | 2, 66, 71 |
| CA_2-2-66-71 | 2, 66, 71 |
| CA_2-66-66-71 | 2, 66, 71 |
| CA_3-5-7 | 3, 5, 7 |
| CA_3-5-7-7 | 3, 5, 7 |
| CA_3-5-28 | 3, 5, 28 |
| CA_3-5-40 | 3, 5, 40 |
| CA_3-5-40-40 | 3, 5, 40 |
| CA_3-5-41 | 3, 5, 41 |
| CA_3-3-7-8 | 3, 7, 8 |
| CA_3-3-7-7-8 | 3, 7, 8 |
| CA_3-7-7-8 | 3, 7, 8 |
| CA_3-7-8 | 3, 7, 8 |
| CA_3-7-20 | 3, 7, 20 |
| CA_3-3-7-20 | 3, 7, 20 |
| CA_3-7-26 | 3, 7, 26 |
| CA_3-7-7-26 | 3, 7, 26 |
| CA_3-7-28 | 3, 7, 28 |
| CA_3-3-7-28 | 3, 7, 28 |
| CA_3-7-32 | 3, 7, 32 |
| CA_3-7-38 | 3, 7, 38 |
| CA_3-7-40 | 3, 7, 40 |
| CA_3-7-42 | 3, 7, 42 |
| CA_3-7-46 | 3, 7, 46 |
| CA_3-8-11 | 3, 8, 11 |
| CA_3-8-20 | 3, 8, 20 |

TABLE 10-continued

| 3GPP LTE CA Band | 3GPP LTE Band |
|---|---|
| CA_3-8-28 | 3, 8, 28 |
| CA_3-8-32 | 3, 8, 32 |
| CA_3-8-38 | 3, 8, 38 |
| CA_3-8-40 | 3, 8, 40 |
| CA_3-11-18 | 3, 11, 18 |
| CA_3-11-26 | 3, 11, 26 |
| CA_3-11-28 | 3, 11, 28 |
| CA_3-18-42 | 3, 18, 42 |
| CA_3-19-21 | 3, 19, 21 |
| CA_3-3-19-21 | 3, 19, 21 |
| CA_3-19-42 | 3, 19, 42 |
| CA_3-20-281 | 3, 20, 28 |
| CA_3-3-20-281 | 3, 20, 28 |
| CA_3-20-32 | 3, 20, 32 |
| CA_3-20-42 | 3, 20, 42 |
| CA_3-20-43 | 3, 20, 43 |
| CA_3-21-28 | 3, 21, 28 |
| CA_3-21-42 | 3, 21, 42 |
| CA_3-28-38 | 3, 28, 38 |
| CA_3-28-40 | 3, 28, 40 |
| CA_3-28-41 | 3, 28, 41 |
| CA_3-28-42 | 3, 28, 42 |
| CA_3-28-42-42 | 3, 28, 42 |
| CA_3-32-42 | 3, 32, 42 |
| CA_3-32-43 | 3, 32, 43 |
| CA_3-32-46 | 3, 32, 46 |
| CA_3-41-42 | 3, 41, 42 |
| CA_3-41-42-42 | 3, 41, 42 |
| CA_3-42-43 | 3, 42, 43 |
| CA_4-5-12 | 4, 5, 12 |
| CA_4-4-5-12 | 4, 5, 12 |
| CA_4-5-12-12 | 4, 5, 12 |
| CA_4-5-13 | 4, 5, 13 |
| CA_4-5-29 | 4, 5, 29 |
| CA_4-5-30 | 4, 5, 30 |
| CA_4-4-5-30 | 4, 5, 30 |
| CA_4-7-12 | 4, 7, 12 |
| CA_4-7-28 | 4, 7, 28 |
| CA_4-12-30 | 4, 12, 30 |
| CA_4-4-12-30 | 4, 12, 30 |
| CA_4-29-30 | 4, 29, 30 |
| CA_4-4-29-30 | 4, 29, 30 |
| CA_5-7-28 | 5, 7, 28 |
| CA_5-7-46 | 5, 7, 46 |
| CA_5-12-46 | 5, 12, 46 |
| CA_5-12-48 | 5, 12, 48 |
| CA_5-12-66 | 5, 12, 66 |
| CA_5-30-66 | 5, 30, 66 |
| CA_5-30-66-66 | 5, 30, 66 |
| CA_5-40-41 | 5, 40, 41 |
| CA_5-46-66 | 5, 46, 66 |
| CA_7-8-20 | 7, 8, 20 |
| CA_7-8-38 | 7, 8, 38 |
| CA_7-8-40 | 7, 8, 40 |
| CA_7-12-66 | 7, 12, 66 |
| CA_7-20-281 | 7, 20, 28 |
| CA_7-20-32 | 7, 20, 32 |
| CA_7-20-38 | 7, 20, 38 |
| CA_7-20-42 | 7, 20, 42 |
| CA_7-28-38 | 7, 28, 38 |
| CA_7-28-40 | 7, 28, 40 |
| CA_7-30-66 | 7, 30, 66 |
| CA_7-32-46 | 7, 32, 46 |
| CA_7-46-66 | 7, 46, 66 |
| CA_8-11-28 | 8, 11, 28 |
| CA_8-20-281 | 8, 20, 28 |
| CA_8-28-41 | 8, 28, 41 |
| CA_8-39-41 | 8, 39, 41 |
| CA_12-30-66 | 12, 30, 66 |
| CA_12-30-66-66 | 12, 30, 66 |
| CA_13-46-66 | 13, 46, 66 |
| CA_13-48-66 | 13, 48, 66 |
| CA_13-48-48-66 | 13, 48, 66 |
| CA_14-30-66 | 14, 30, 66 |
| CA_14-30-66-66 | 14, 30, 66 |
| CA_19-21-42 | 19, 21, 42 |
| CA_20-32-42 | 20, 32, 42 |
| CA_20-32-43 | 20, 32, 43 |
| CA_20-38-40 | 20, 38, 40 |
| CA_25-26-41 | 25, 26, 41 |
| CA_25-25-26-41 | 25, 26, 41 |
| CA_20-38-40-40 | 20, 38, 40 |
| CA_21-28-42 | 21, 28, 42 |
| CA_29-30-66-66 | 29, 30, 66 |
| CA_20-38-40 | 20, 38, 40 |
| CA_28-41-42 | 28, 41, 42 |
| CA_28-41-42-42 | 28, 41, 42 |
| CA_29-30-66 | 29, 30, 66 |
| CA_29-46-66 | 29, 46, 66 |
| CA_29-66-70 | 29, 66, 70 |
| CA_29-66-66-70 | 29, 66, 70 |
| CA_32-42-43 | 32, 42, 43 |
| CA_46-48-66 | 46, 48, 66 |
| CA_46-48-71 | 46, 48, 71 |
| CA_46-48-48-71 | 46, 48, 71 |
| CA_66-70-71 | 66, 70, 71 |
| CA_1-3-5-7 | 1, 3, 5, 7 |
| CA_1-3-5-7-7 | 1, 3, 5, 7 |
| CA_1-3-5-40 | 1, 3, 5, 40 |
| CA_1-3-5-41 | 1, 3, 5, 41 |
| CA_1-3-7-7-26 | 1, 3, 7, 26 |
| CA_1-3-7-8 | 1, 3, 7, 8 |
| CA_1-3-3-7-8 | 1, 3, 7, 8 |
| CA_1-3-7-7-8 | 1, 3, 7, 8 |
| CA_1-3-3-7-7-8 | 1, 3, 7, 8 |
| CA_1-3-7-20 | 1, 3, 7, 20 |
| CA_1-3-7-26 | 1, 3, 7, 26 |
| CA_1-3-7-28 | 1, 3, 7, 28 |
| CA_1-3-7-7-28 | 1, 3, 7, 28 |
| CA_1-3-7-32 | 1, 3, 7, 32 |
| CA_1-3-7-40 | 1, 3, 7, 40 |
| CA_1-3-7-42 | 1, 3, 7, 42 |
| CA_1-3-8-11 | 1, 3, 8, 11 |
| CA_1-3-8-20 | 1, 3, 8, 20 |
| CA_1-3-8-28 | 1, 3, 8, 28 |
| CA_1-3-8-38 | 1, 3, 8, 38 |
| CA_1-3-11-28 | 1, 3, 11, 28 |
| CA_1-3-8-40 | 1, 3, 8, 40 |
| CA_1-3-18-42 | 1, 3, 18, 42 |
| CA_1-3-19-21 | 1, 3, 19, 21 |
| CA_1-3-19-42 | 1, 3, 19, 42 |
| CA_1-3-20-281 | 1, 3, 20, 28 |
| CA_1-3-3-20-28 | CA_1-3-3-20-28 |
| CA_1-3-20-32 | 1, 3, 20, 32 |
| CA_1-3-20-42 | 1, 3, 20, 42 |
| CA_1-3-20-43 | 1, 3, 20, 43 |
| CA_1-3-21-28 | 1, 3, 21, 28 |
| CA_1-3-21-42 | 1, 3, 21, 42 |
| CA_1-3-28-42 | 1, 3, 28, 42 |
| CA_1-3-32-42 | 1, 3, 32, 42 |
| CA_1-3-32-43 | 1, 3, 32, 43 |
| CA_1-3-41-42 | 1, 3, 41, 42 |
| CA_1-3-42-43 | 1, 3, 42, 43 |
| CA_1-5-7-46 | 1, 5, 7, 46 |
| CA_1-7-8-20 | 1, 7, 8, 20 |
| CA_1-7-8-40 | 1, 7, 8, 40 |
| CA_1-7-20-281 | 1, 7, 20, 28 |
| CA_1-7-20-32 | 1, 7, 20, 32 |
| CA_1-7-20-42 | 1, 7, 20, 42 |
| CA_1-8-11-28 | 1, 8, 11, 28 |
| CA_1-8-20-28 | 1, 8, 20, 28 |
| CA_1-19-21-42 | 1, 19, 21, 42 |
| CA_1-20-32-42 | 1, 20, 32, 42 |
| CA_1-20-32-43 | 1, 20, 32, 43 |
| CA_1-21-28-42 | 1, 21, 28, 42 |
| CA_1-32-42-43 | 1, 32, 42, 43 |
| CA_2-2-5-12-66 | 2, 5, 12, 66 |
| CA_2-2-5-30-66 | 2, 5, 30, 66 |
| CA_2-2-7-12-66 | 2. 7, 12, 66 |
| CA_2-2-12-30-66 | 2, 12, 30, 66 |
| CA_2-2-14-30-66 | 2, 14, 30, 66 |
| CA_2-4-5-12 | 2, 4, 5, 12 |
| CA_2-4-5-29 | 2, 4, 5, 29 |
| CA_2-4-5-30 | 2, 4, 5, 30 |
| CA_2-4-7-12 | 2, 4, 7, 12 |
| CA_2-4-12-30 | 2, 4, 12, 30 |

TABLE 10-continued

| 3GPP LTE CA Band | 3GPP LTE Band |
|---|---|
| CA__2-4-29-30 | 2, 4, 29, 30 |
| CA__2-5-7-28 | 2, 5, 7, 28 |
| CA__2-5-12-66 | 2, 5, 12, 66 |
| CA__2-5-30-66 | 2, 5, 30, 66 |
| CA__2-5-30-66-66 | 2, 5, 30, 66 |
| CA__2-7-12-66 | 2, 7, 12, 66 |
| CA__2-7-46-66 | 2, 7, 46, 66 |
| CA__2-12-30-66 | 2, 12, 30, 66 |
| CA__2-12-30-66-66 | 2, 12, 30, 66 |
| CA__2-13-48-66 | 2, 13, 48, 66 |
| CA__2-14-30-66 | 2, 14, 30, 66 |
| CA__2-14-30-66-66 | 2, 14, 30, 66 |
| CA__2-29-30-66 | 2, 29, 30, 66 |
| CA__2-46-48-66 | 2, 46, 48, 66 |
| CA__3-7-8-20 | 3, 7, 8, 20 |
| CA__3-7-8-38 | 3, 7, 8, 38 |
| CA__3-7-8-40 | 3, 7, 8, 40 |
| CA__3-7-20-281 | 3, 7, 20, 28 |
| CA__3-7-20-32 | 3, 7, 20, 32 |
| CA__3-7-20-42 | 3, 7, 20, 42 |
| CA__3-7-28-38 | 3, 7, 28, 38 |
| CA__3-7-32-46 | 3, 7, 32, 46 |
| CA__3-8-11-28 | 3, 8, 11, 28 |
| CA__3-8-20-28 | 3, 8, 20, 28 |
| CA__3-19-21-42 | 3, 19, 21, 42 |
| CA__3-20-32-42 | 3, 20, 32, 42 |
| CA__3-20-32-43 | 3, 20, 32, 43 |
| CA__3-21-28-42 | 3, 21, 28, 42 |
| CA__3-28-41-42 | 3, 28, 41, 42 |
| CA__3-32-42-43 | 3, 32, 42, 43 |
| CA__1-3-7-8-20 | 1, 3, 7, 8, 20 |
| CA__1-3-7-20-281 | 1, 3, 7, 20, 28 |
| CA__1-3-7-20-32 | 1, 3, 7, 20, 32 |
| CA__1-3-7-20-42 | 1, 3, 7, 20, 42 |
| CA__1-3-8-11-28 | 1, 3, 8, 11, 28 |
| CA__1-3-20-32-42 | 1, 3, 20, 32, 42 |
| CA__1-3-20-32-43 | 1, 3, 20, 32, 43 |
| CA__1-3-32-42-43 | 1, 3, 32, 42, 43 |

In another example, the selected frequency range of the first-direction signal and the selected frequency range of the second-direction signal can be configured for dual-connectivity in operating band combinations selected from the 3GPP operating band combinations included in Table 5.5C-2 from 3GPP TS 36.101 V16.0.0 (2018-12), and depicted in Table 11.

TABLE 11

| 3GPP LTE Dual-Connectivity Band | 3GPP LTE Band |
|---|---|
| DC__1-3-19 | 1, 3, 19 |
| DC__1-19-21 | 1, 19, 21 |

Figure 7B:
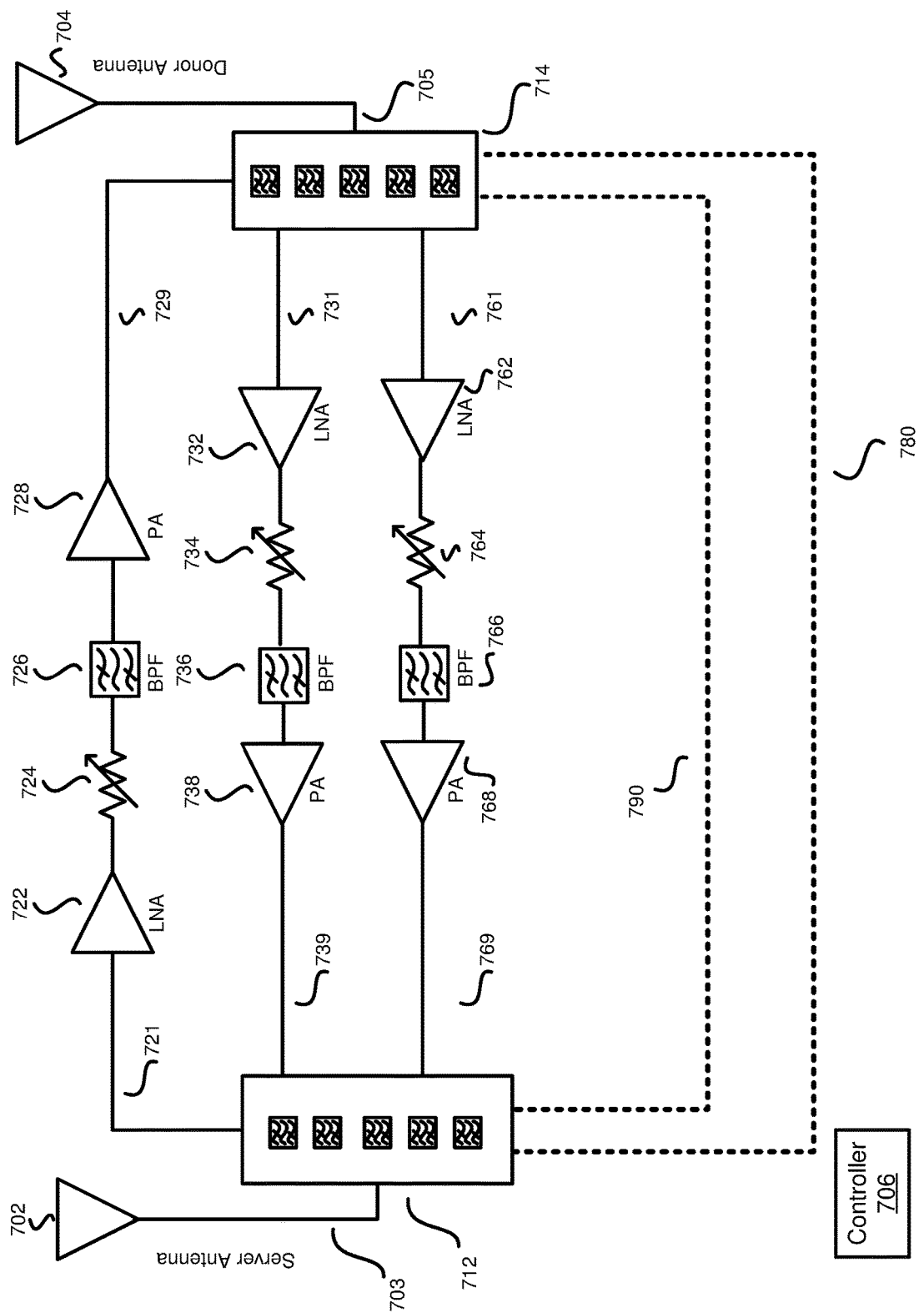
FIG. 7b illustrates a carrier-aggregation (CA) repeater in accordance with an example.

In another example, as illustrated in FIG. 7b, a repeater can comprise m additional first-direction filtering and amplification paths 790 configured to be coupled between the first port 703 and the second port 705, wherein each of the m additional first-direction filtering and amplification paths can be configured to filter a first-direction signal of a selected frequency range. The selected frequency range can include 3GPP LTE FDD frequency bands 2, 4, 5, 12, 13, 17, 25, 26, or 71, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster).

In another example, a repeater can comprise n additional second-direction filtering and amplification paths 780 configured to be coupled between the first port 703 and the second port 705, wherein each of the n additional second-direction filtering and amplification paths can be configured to filter a second-direction signal of a selected frequency range. The selected frequency range can include 3GPP LTE FDD frequency bands 2, 4, 5, 12, 13, 17, 25, 26, or 71, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster).

In another example, the selected frequency range of the first-direction signal and the selected frequency range of the second-direction signal can be configured for dual-connectivity in operating band combinations selected from the 3GPP operating band combinations included in Table 5.2B.4.2-1 from 3GPP TS 38.101-3 V15.5.0 (2019-03), depicted in Table 12, Table 5.2B.4.3-1 from 3GPP TS 38.101-3 V15.5.0 (2019-03), depicted in Table 13, Table 5.2B.4.4-1 from 3GPP TS 38.101-3 V15.5.0 (2019-03), depicted in Table 14, Table 5.2B.4.5-1 from 3GPP TS 38.101-3 V15.5.0 (2019-03), depicted in Table 15, Table 5.2B.5.2-1 from 3GPP TS 38.101-3 V15.5.0 (2019-03), depicted in Table 16, Table 5.2B.5.3-1 from 3GPP TS 38.101-3 V15.5.0 (2019-03), depicted in Table 17, Table 5.2B.5.4-1 from 3GPP TS 38.101-3 V15.5.0 (2019-03), depicted in Table 18, Table 5.2B.6.2-1 from 3GPP TS 38.101-3 V15.5.0 (2019-03), depicted in Table 19, Table 5.2B.6.3-1 from 3GPP TS 38.101-3 V15.5.0 (2019-03), depicted in Table 20, Table 5.2B.6.4-1 from 3GPP TS 38.101-3 V15.5.0 (2019-03), depicted in Table 21, and Table 5.2B.6.5-1 from 3GPP TS 38.101-3 V15.5.0 (2019-03), depicted in Table 22:

TABLE 12

| EN-DC Band | LTE Band | NR Band |
|---|---|---|
| DC__1-3_n28 | CA__1-3 | n28 |
| DC__1-3_n77[2] | CA__1-3 | n77 |
| DC__1-3_n78[2] | CA__1-3 | n78 |
| DC__1-3_n79[2] | CA__1-3 | n79 |
| DC__1-5_n78[2] | CA__1-5 | n78 |
| DC__1-7_n28[2] | CA__1-7 | n28 |
| DC__1-7_n78[2] | CA__1-7 | n78 |
| DC__1-7-7_n78[2] | CA__1-7-7 | n78 |
| DC__1-8_n78[2] | CA__1-8 | n78 |
| DC__1-18_n77[2] | CA__1-18 | n77 |
| DC__1-18_n78[2] | CA__1-18 | n78 |
| DC__1-18_n79 | CA__1-18 | n79 |
| DC__1-19_n77[2] | CA__1-19 | n77 |
| DC__1-19_n78[2] | CA__1-19 | n78 |
| DC__1-19_n79[2] | CA__1-19 | n79 |

TABLE 12-continued

| EN-DC Band | LTE Band | NR Band |
|---|---|---|
| DC_1-20_n28[3] | CA_1-20 | n28 |
| DC_1-20_n78[2] | CA_1-20 | n78 |
| DC_1-21_n77[2] | CA_1-21 | n77 |
| DC_1-21_n78[2] | CA_1-21 | n78 |
| DC_1-21_n79[2] | CA_1-21 | n79 |
| DC_1-28_n77[2] | CA_1-28 | n77 |
| DC_1-28_n78[2] | CA_1-28 | n78 |
| DC_1-28_n79 | CA_1-28 | n79 |
| DC_1_n28-n78[2] | 1 | CA_n28-n78 |
| DC_1_n77-n79 | 1 | CA_n77-n79 |
| DC_1_n78-n79 | 1 | CA_n78-n79 |
| DC_1-41_n77 | CA_1-41 | n77 |
| DC_1-41_n78 | CA_1-41 | n78 |
| DC_1-41_n79 | CA_1-41 | n79 |
| DC_1-42_n77 | CA_1-42 | n77 |
| DC_1-42_n78 | CA_1-42 | n78 |
| DC_1-42_n79 | CA_1-42 | n79 |
| DC_1_SUL_n78-n84[2] | 1 | SUL_n78-n84 |
| DC_2-5_n66 | CA_2-5 | n66 |
| DC_2-12_n66 | CA_2-12 | n66 |
| DC_2-30_n66 | CA_2-30 | n66 |
| DC_2-(n)71 | CA_2-71 | n71 |
| DC_2-66_n71 | CA_2-66 | n71 |
| DC_3_n3-n77 | 3 | CA_n3-n77 |
| DC_3_n3-n78 | 3 | CA_n3-n78 |
| DC_3-5_n78[2] | CA_3-5 | n78 |
| DC_3-7_n28 | CA_3-7 | n28 |
| DC_3-7_n78[2] | CA_3-7 | n78 |
| DC_3-7-7_n78[2] | CA_3-7-7 | n78 |
| DC_3-8_n78 | CA_3-8 | n78 |
| DC_3-19_n77[2] | CA_3-19 | n77 |
| DC_3-19_n78[2] | CA_3-19 | n78 |
| DC_3-19_n79[2] | CA_3-19 | n79 |
| DC_3-20_n28[2,3] | CA_3-20 | n28 |
| DC_3-20_n78[2] | CA_3-20 | n78 |
| DC_3-21_n77[2] | CA_3-21 | n77 |
| DC_3-21_n78[2] | CA_3-21 | n78 |
| DC_3-21_n79[2] | CA_3-21 | n79 |
| DC_3-28_n78[2] | CA_3-28 | n78 |
| DC_3_n28-n78[2] | 3 | CA_n28-n78 |
| DC_3-28_n79 | 3 | CA_n28-n79 |
| DC_3-38_n78 | CA_3-38 | n78 |
| DC_3-41_n78 | CA_3-41 | n78 |
| DC_3-42_n77 | CA_3-42 | n77 |
| DC_3-42_n78 | CA_3-42 | n78 |
| DC_3-42_n79 | CA_3-42 | n79 |
| DC_3_n77-n79 | 3 | CA_n77-n79 |
| DC_3_n78-n79 | 3 | CA_n78-n79 |
| DC_3_SUL_n78-n80[2] | 3 | SUL_n78-n80 |
| DC_3_SUL_n78-n82[2] | 3 | SUL_n78-n82[1] |
| DC_3_SUL_n79-n80[2] | 3 | SUL_n79-n80 |
| DC_5-7-7_n78 | CA_5-7-7 | n78 |
| DC_5-7_n78 | CA_5-7 | n78 |
| DC_5-30_n66 | CA_5-30 | n66 |
| DC_7-20_n28[3] | CA_7-20 | n28 |
| DC_7-20_n78[2] | CA_7-20 | n78 |
| DC_7-28_n78[2] | CA_7-28 | n78 |
| DC_7_n28-n78[2] | 7 | CA_n28-n78 |
| DC_7-46_n78 | CA_7-46 | n78 |
| DC_8_SUL_n78-n81[2] | 8 | SUL_n78-n81 |
| DC_8_SUL_n79-n81[2] | 8 | SUL_n79-n81 |
| DC_12-30_n66 | CA_12-30 | n66 |
| DC_18-28_n77[2] | CA_18-28 | n77 |
| DC_18-28_n78[2] | CA_18-28 | n78 |
| DC_18-28_n79[2] | CA_18-28 | n79 |
| DC_19-21_n77[2] | CA_19-21 | n77 |
| DC_19-21_n78[2] | CA_19-21 | n78 |
| DC_19-21_n79[2] | CA_19-21 | n79 |
| DC_19-42_n77 | CA_19-42 | n77 |
| DC_19-42_n78 | CA_19-42 | n78 |
| DC_19-42_n79 | CA_19-42 | n79 |
| DC_19_n77-n79 | 19 | CA_n77-n79 |
| DC_19_n78-n79 | 19 | CA_n78-n79 |
| DC_20_n8-n75 | 20 | CA_n8-n75 |
| DC_20_n28-n75[3] | 20 | CA_n28-n75 |
| DC_20_n28-n78[2,3] | 20 | CA_n28-n78 |
| DC_20_n75-n78[2] | 20 | CA_n75-n78 |
| DC_20_n76-n78[2] | 20 | CA_n76-n78 |
| DC_20_SUL_n78-n82[2] | 20 | SUL_n78-n82 |
| DC_20_SUL_n78-n83[2] | 20 | SUL_n78-n83[1] |
| DC_21-42_n77 | CA_21-42 | n77 |
| DC_21-42_n78 | CA_21-42 | n78 |
| DC_21-42_n79 | CA_21-42 | n79 |
| DC_21_n77-n79 | 21 | CA_n77-n79 |
| DC_21_n78-n79 | 21 | CA_n78-n79 |
| DC_28-42_n77 | CA_28-42 | n77 |
| DC_28-42_n78 | CA_28-42 | n78 |
| DC_28-42_n79 | CA_28-42 | n79 |
| DC_41-42_n77 | CA_41-42 | n77 |
| DC_41-42_n78 | CA_41-42 | n78 |
| DC_41-42_n79 | CA_41-42 | n79 |
| DC_28_SUL_n78-n83[2] | 28 | SUL_n78-n83 |
| DC_66_(n)71 | CA_66-71 | n71 |
| DC_66_SUL_n78-n86[2] | 66 | SUL_n78-n86 |

NOTE 1:
If a UE is configured with both NR UL and NR SUL carriers in a cell, the switching time between NR UL carrier and NR SUL carrier can be up to 140 us and placed in SUL resources.
NOTE 2:
Applicable for UE supporting inter-band EN-DC with mandatory simultaneous Rx/Tx capability
NOTE 3:
The frequency range in band n28 is restricted for this band combination to 703-733 MHz for the UL and 758-788 MHz for the DL.

TABLE 13

| EN-DC Band | LTE Band | NR Band |
|---|---|---|
| DC_1-3-5_n78[1] | CA_1-3-5 | n78 |
| DC_1-3-7_n28 | CA_1-3-7 | n28 |
| DC_1-3-7-7_n78[1] | CA_1-3-7-7 | n78 |
| DC_1-3-7_n78[1] | CA_1-3-7 | n78 |
| DC_1-3-8_n78[1] | CA_1-3-8 | n78 |
| DC_1-3-28_n77[1] | CA_1-3-28 | n77 |
| DC_1-3-28_n78[1] | CA_1-3-28 | n78 |
| DC_1-3_n28-n78[1] | CA_1-3 | CA_n28-n78 |
| DC_1-3-28_n79[1] | CA_1-3-28 | n79 |
| DC_1-3-19_n77[1] | CA_1-3-19 | n77 |
| DC_1-3-19_n78[1] | CA_1-3-19 | n78 |
| DC_1-3-19_n79[1] | CA_1-3-19 | n79 |
| DC_1-3-20_n28[2] | CA_1-3-20 | n28 |
| DC_1-3-20_n78[1] | CA_1-3-20 | n78 |
| DC_1-3-21_n77[1] | CA_1-3-21 | n77 |
| DC_1-3-21_n78[1] | CA_1-3-21 | n78 |
| DC_1-3-21_n79[1] | CA_1-3-21 | n79 |
| DC_1-3-42_n77 | CA_1-3-42 | n77 |
| DC_1-3-42_n78 | CA_1-3-42 | n78 |
| DC_1-3-42_n79 | CA_1-3-42 | n79 |
| DC_1-5-7_n78 | CA_1-5-7 | n78 |
| DC_1-5-7-7_n78 | CA_1-5-7-7 | n78 |
| DC_1-7-20_n28[2] | CA_1-7-20 | n28 |
| DC_1-7-20_n78[1] | CA_1-7-20 | n78 |
| DC_1-7_n28-n78[1] | CA_1-7 | CA_n28-n78 |
| DC_1-18-28_n77 | CA_1-18-28 | n77 |
| DC_1-18-28_n78 | CA_1-18-28 | n78 |
| DC_1-18-28_n79[1] | CA_1-18-28 | n79 |
| DC_1-19-21_n77 | CA_1-19-21 | n77 |
| DC_1-19-21_n78 | CA_1-19-21 | n78 |
| DC_1-19-21_n79 | CA_1-19-21 | n79 |
| DC_1-19-42_n77 | CA_1-19-42 | n77 |
| DC_1-19-42_n78 | CA_1-19-42 | n78 |
| DC_1-19-42_n79 | CA_1-19-42 | n79 |
| DC_1-20_n28-n78[1,2] | CA_1-20 | CA_n28-n78 |
| DC_1-21-28_n77[1] | CA_1-21-28 | n77 |
| DC_1-21-28_n78[1] | CA_1-21-28 | n78 |
| DC_1-21-28_n79[1] | CA_1-21-28 | n79 |
| DC_1-21-42_n77 | CA_1-21-42 | n77 |
| DC_1-21-42_n78 | CA_1-21-42 | n78 |
| DC_1-21-42_n79 | CA_1-21-42 | n79 |
| DC_1-28-42_n77 | CA_1-28-42 | n77 |
| DC_1-28-42_n78 | CA_1-28-42 | n78 |
| DC_1-28-42_n79 | CA_1-28-42 | n79 |
| DC_1-41-42_n77 | CA_1-41-42 | n77 |
| DC_1-41-42_n78 | CA_1-41-42 | n78 |

TABLE 13-continued

| EN-DC Band | LTE Band | NR Band |
| --- | --- | --- |
| DC_1-41-42_n79 | CA_1-41-42 | n79 |
| DC_2-66-(n)71 | CA_2-66-71 | n71 |
| DC_3-5-7_n78 | CA_3-5-7 | n78 |
| DC_3-5-7-7_n78 | CA_3-5-7-7 | n78 |
| DC_3-7-20_n28[2] | CA_3-7-20 | n28 |
| DC_3-7-20_n78[1] | CA_3-7-20 | n78 |
| DC_3-7-28_n78[1] | CA_3-7-28 | n78 |
| DC_3-7_n28-n78[1] | CA_3-7 | CA_n28-n78 |
| DC_3-19-21_n77[1] | CA_3-19-21 | n77 |
| DC_3-19-21_n78[1] | CA_3-19-21 | n78 |
| DC_3-19-21_n79[1] | CA_3-19-21 | n79 |
| DC_3-19-42_n77 | CA_3-19-42 | n77 |
| DC_3-19-42_n78 | CA_3-19-42 | n78 |
| DC_3-19-42_n79[1] | CA_3-19-42 | n79 |
| DC_3-20_n28-n78[1,2] | CA_3-20 | CA_n28-n78 |
| DC_3-21-42_n77 | CA_3-21-42 | n77 |
| DC_3-21-42_n78 | CA_3-21-42 | n78 |
| DC_3-21-42_n79 | CA_3-21-42 | n79 |
| DC_3-28-42_n77 | CA_3-28-42 | n77 |
| DC_3-28-42_n78 | CA_3-28-42 | n78 |
| DC_3-28-42_n79 | CA_3-28-42 | n79 |
| DC_7-20_n28-n78[1,2] | CA_7-20 | CA_n28-n78 |
| DC_19-21-42_n77 | CA_19-21-42 | n77 |
| DC_19-21-42_n78 | CA_19-21-42 | n78 |
| DC_19-21-42_n79 | CA_19-21-42 | n79 |
| DC_21-28-42_n77 | CA_21-28-42 | n77 |
| DC_21-28-42_n78 | CA_21-28-42 | n78 |
| DC_21-28-42_n79 | CA_21-28-42 | n79 |

NOTE 1:
Applicable for UE supporting inter-band EN-DC with mandatory simultaneous Rx/Tx capability
NOTE 2:
The frequency range in band n28 is restricted for this band combination to 703-733 MHz for the UL and 758-788 MHz for the DL.

TABLE 14

| EN-DC Band | LTE Band | NR Band |
| --- | --- | --- |
| DC_1-3-5-7_n78 | CA_1-3-5-7 | n78 |
| DC_1-3-5-7-7_n78 | CA_1-3-5-7-7 | n78 |
| DC_1-3-7-20_n28[2] | CA_1-3-7-20 | n28 |
| DC_1-3-7-20_n78[1] | CA_1-3-7-20 | n78 |
| DC_1-3-7_n28-n78[1] | CA_1-3-7 | CA_n28-n78 |
| DC_1-3-19-21_n77[1] | CA_1-3-19-21 | n77 |
| DC_1-3-19-21_n78[1] | CA_1-3-19-21 | n78 |
| DC_1-3-19-21_n79[1] | CA_1-3-19-21 | n79 |
| DC_1-3-19-42_n77 | CA_1-3-19-42 | n77 |
| DC_1-3-19-42_n78 | CA_1-3-19-42 | n78 |
| DC_1-3-19-42_n79 | CA_1-3-19-42 | n79 |
| DC_1-3-20_n28-n78[1,2] | CA_1-3-20 | CA_n28-n78 |
| DC_1-3-21-42_n77 | CA_1-3-21-42 | n77 |
| DC_1-3-21-42_n78 | CA_1-3-21-42 | n78 |
| DC_1-3-21-42_n79 | CA_1-3-21-42 | n79 |
| DC_1-7-20_n28-n78[1,2] | CA_1-7-20 | CA_n28-n78 |
| DC_1-19-21-42_n77 | DC_1-19-21-42 | n77 |
| DC_1-19-21-42_n78 | DC_1-19-21-42 | n78 |
| DC_1-19-21-42_n79 | DC_1-19-21-42 | n79 |
| DC_1-3-5-7_n78 | CA_1-3-5-7 | n78 |
| DC_1-3-28-42_n77 | CA_1-3-28-42 | n77 |
| DC_1-3-28-42_n78 | CA_1-3-28-42 | n78 |
| DC_1-3-28-42_n79 | CA_1-3-28-42 | n79 |
| DC_1-21-28-42_n77 | CA_1-21-28-42 | n77 |
| DC_1-21-28-42_n78 | CA_1-21-28-42 | n78 |
| DC_1-21-28-42_n79 | CA_1-21-28-42 | n79 |
| DC_3-7-20_n28-n78[1,2] | CA_3-7-20 | CA_n28-n78 |

NOTE 1:
Applicable for UE supporting inter-band EN-DC with mandatory simultaneous Rx/Tx capability
NOTE 2:
The frequency range in band n28 is restricted for this band combination to 703-733 MHz for the UL and 758-788 MHz for the DL

TABLE 15

| EN-DC Band | LTE Band | NR Band |
| --- | --- | --- |
| DC_1-3-7-20_n28-n78[1,2] | CA_1-3-7-20 | CA_n28-n78 |

NOTE 1:
Applicable for UE supporting inter-band EN-DC with mandatory simultaneous Rx/Tx capability
NOTE 2:
The frequency range in band n28 is restricted for this band combination to 703-733 MHz for the UL and 758-788 MHz for the DL

TABLE 16

| EN-DC Band | LTE Band | NR Band |
| --- | --- | --- |
| DC_1-3_n257[1] | CA_1-3 | n257 |
| DC_1-5_n257[1] | CA_1-5 | n257 |
| DC_1-7_n257[1] | CA_1-7 | n257 |
| DC_1-7-7_n257[1] | CA_1-7-7 | n257 |
| DC_1-8_n257 | CA_1-8 | n257 |
| DC_1-18_n257[1] | CA_1-18 | n257 |
| DC_1-19_n257[1] | CA_1-19 | n257 |
| DC_1-21_n257[1] | CA_1-21 | n257 |
| DC_1-28_n257[1] | CA_1-28 | n257 |
| DC_1-41_n257 | CA_1-41 | n257 |
| DC_1-42_n257 | CA_1-42 | n257 |
| DC_2-5_n257[1] | CA_2-5 | n257 |
| DC_2-5_n260 | CA_2-5 | n260 |
| DC_2-12_n260 | CA_2-12 | n260 |
| DC_2-13_n257[1] | CA_2-13 | n257 |
| DC_2-13_n260[1] | CA_2-13 | n260 |
| DC_2-30_n260 | CA_2-30 | n260 |
| DC_2-66_n257[1] | CA_2-66 | n257 |
| DC_2-66_n260 | CA_2-66 | n260 |
| DC_3-5_n257[1] | CA_3-5 | n257 |
| DC_3-7_n257[1] | CA_3-7 | n257 |
| DC_3-7-7_n257[1] | CA_3-7-7 | n257 |
| DC_3-19_n257[1] | CA_3-19 | n257 |
| DC_3-21_n257[1] | CA_3-21 | n257 |
| DC_3-28_n257[1] | CA_3-28 | n257 |
| DC_3-41_n257 | CA_3-41 | n257 |
| DC_3-42_n257 | CA_3-42 | n257 |
| DC_5-7-7_n257[1] | CA_5-7-7 | n257 |
| DC_5-7_n257[1] | CA_5-7 | n257 |
| DC_5-30_n260 | CA_5-30 | n260 |
| DC_5-66_n260 | CA_5-66 | n260 |
| DC_12-30_n260 | CA_12-30 | n260 |
| DC_12-66_n260 | CA_12-66 | n260 |
| DC_13-66_n257[1] | CA_13-66 | n257 |
| DC_13-66_n260[1] | CA_13-66 | n260 |
| DC_18-28_n257[1] | CA_18-28 | n257 |
| DC_19-21_n257[1] | CA_19-21 | n257 |
| DC_19-42_n257[1] | CA_19-42 | n257 |
| DC_21-42_n257[1] | CA_21-42 | n257 |
| DC_21-28_n257[1] | CA_21-28 | n257 |
| DC_28-42_n257[1] | CA_28-42 | n257 |
| DC_30-66_n260 | CA_30-66 | n260 |
| DC_41-42_n257 | CA_41-42 | n257 |

NOTE 1:
Applicable for UE supporting inter-band EN-DC with mandatory simultaneous Rx/Tx capability

TABLE 17

| EN-DC Band | LTE Band | NR Band |
| --- | --- | --- |
| DC_1-3-5_n257[1] | CA_1-3-5 | n257 |
| DC_1-3-7_n257[1] | CA_1-3-7 | n257 |
| DC_1-3-7-7_n257 | CA_1-3-7-7 | n257 |
| DC_1-3-19_n257[1] | CA_1-3-19 | n257 |
| DC_1-3-21_n257[1] | CA_1-3-21 | n257 |
| DC_1-3-28_n257[1] | CA_1-3-28 | n257 |
| DC_1-3-42_n257 | CA_1-3-42 | n257 |
| DC_1-5-7_n257[1] | CA_1-5-7 | n257 |
| DC_1-5-7-7_n257 | CA_1-5-7-7 | n257 |
| DC_1-18-28_n257[1] | CA_1-18-28 | n257 |
| DC_1-19-21_n257 | CA_1-19-21 | n257 |
| DC_1-19-42_n257 | CA_1-19-42 | n257 |

TABLE 17-continued

| EN-DC Band | LTE Band | NR Band |
|---|---|---|
| DC_1-21-28_n257[1] | CA_1-21-28 | n257 |
| DC_1-21-42_n257 | CA_1-21-42 | n257 |
| DC_1-28-42_n257 | CA_1-28-42 | n257 |
| DC_1-41-42_n257 | CA_1-41-42 | n257 |
| DC_3-5-7-7_n257 | CA_3-5-7-7 | n257 |
| DC_3-5-7_n257[1] | CA_3-5-7 | n257 |
| DC_3-19-21_n257[1] | CA_3-19-21 | n257 |
| DC_3-19-42_n257 | CA_3-19-42 | n257 |
| DC_3-21-42_n257 | CA_3-21-42 | n257 |
| DC_3-28-42_n257 | CA_3-28-42 | n257 |
| DC_19-21-42_n257[1] | CA_19-21-42 | n257 |
| DC_21-28-42_n257[1] | CA_21-28-42 | n257 |

NOTE 1:
Applicable for UE supporting inter-band EN-DC with mandatory simultaneous Rx/Tx capability

TABLE 18

| EN-DC Band | LTE Band | NR Band |
|---|---|---|
| DC_1-3-5-7_n257[1] | CA_1-3-5-7 | n257 |
| DC_1-3-5-7-7_n257[1] | CA_1-3-5-7-7 | n257 |
| DC_1-3-19-21_n257[1] | CA_1-3-19-21 | n257 |
| DC_1-3-19-42_n257 | CA_1-3-19-42 | n257 |
| DC_1-3-21-42_n257 | CA_1-3-21-42 | n257 |
| DC_1-3-28-42_n257 | CA_1-3-28-42 | n257 |
| DC_1-19-21-42_n257 | DC_1-19-21-42 | n257 |
| DC_1-21-28-42_n257 | DC_1-21-28-42 | n257 |

NOTE 1:
Applicable for UE supporting inter-band EN-DC with mandatory simultaneous Rx/Tx capability

TABLE 19

| EN-DC Band | E-UTRA Band | NR Band |
|---|---|---|
| DC_1_n77-n257 | 1 | CA_n77-n257 |
| DC_1_n78-n257 | 1 | CA_n78-n257 |
| DC_1_n79-n257 | 1 | CA_n79-n257 |
| DC_3_n77-n257 | 3 | CA_n77-n257 |
| DC_3_n78-n257 | 3 | CA_n78-n257 |
| DC_3_n79-n257 | 3 | CA_n79-n257 |
| DC_5_n78-n257[1] | 5 | CA_n78-n257 |
| DC_7-7_n78-n257 | CA_7-7 | CA_n78-n257 |
| DC_7_n78-n257 | 7 | CA_n78-n257 |
| DC_19_n77-n257 | 19 | CA_n77-n257 |
| DC_19_n78-n257 | 19 | CA_n78-n257 |
| DC_19_n79-n257 | 19 | CA_n79-n257 |
| DC_21_n77-n257 | 21 | CA_n77-n257 |
| DC_21_n78-n257 | 21 | CA_n78-n257 |
| DC_21_n79-n257 | 21 | CA_n79-n257 |

NOTE 1:
Applicable for UE supporting inter-band EN-DC with mandatory simultaneous Rx/Tx capability

TABLE 20

| EN-DC Band | E-UTRA Band | NR Band |
|---|---|---|
| DC_1-3_n78-n257 | CA_1-3 | CA_n78-n257 |
| DC_1-5_n78-n257 | CA_1-5 | CA_n78-n257 |
| DC_1-7-7_n78-n257 | CA_1-7-7 | CA_n78-n257 |
| DC_1-7_n78-n257 | CA_1-7 | CA_n78-n257 |
| DC_3-5_n78-n257 | CA_3-5 | CA_n78-n257 |
| DC_3-7-7_n78-n257 | CA_3-7-7 | CA_n78-n257 |
| DC_3-7_n78-n257 | CA_3-7 | CA_n78-n257 |
| DC_5-7-7_n78-n257 | CA_5-7-7 | CA_n78-n257 |
| DC_5-7_n78-n257 | CA_5-7 | CA_n78-n257 |

TABLE 21

| EN-DC Band | E-UTRA Band | NR Band |
|---|---|---|
| DC_1-3-5_n78-n257 | CA_1-3-5 | CA_n78-n257 |
| DC_1-3-7-7_n78-n257 | CA_1-3-7-7 | CA_n78-n257 |
| DC_1-3-7_n78-n257 | CA_1-3-7 | CA_n78-n257 |
| DC_1-5-7-7_n78-n257 | CA_1-5-7-7 | CA_n78-n257 |
| DC_1-5-7_n78-n257 | CA_1-5-7 | CA_n78-n257 |
| DC_3-5-7-7_n78-n257 | CA_3-5-7-7 | CA_n78-n257 |
| DC_3-5-7_n78-n257 | CA_3-5-7 | CA_n78-n257 |

TABLE 22

| EN-DC Band | E-UTRA Band | NR Band |
|---|---|---|
| DC_1-3-5-7_n78-n257 | CA_1-3-5-7 | CA_n78-n257 |

Figure 8:
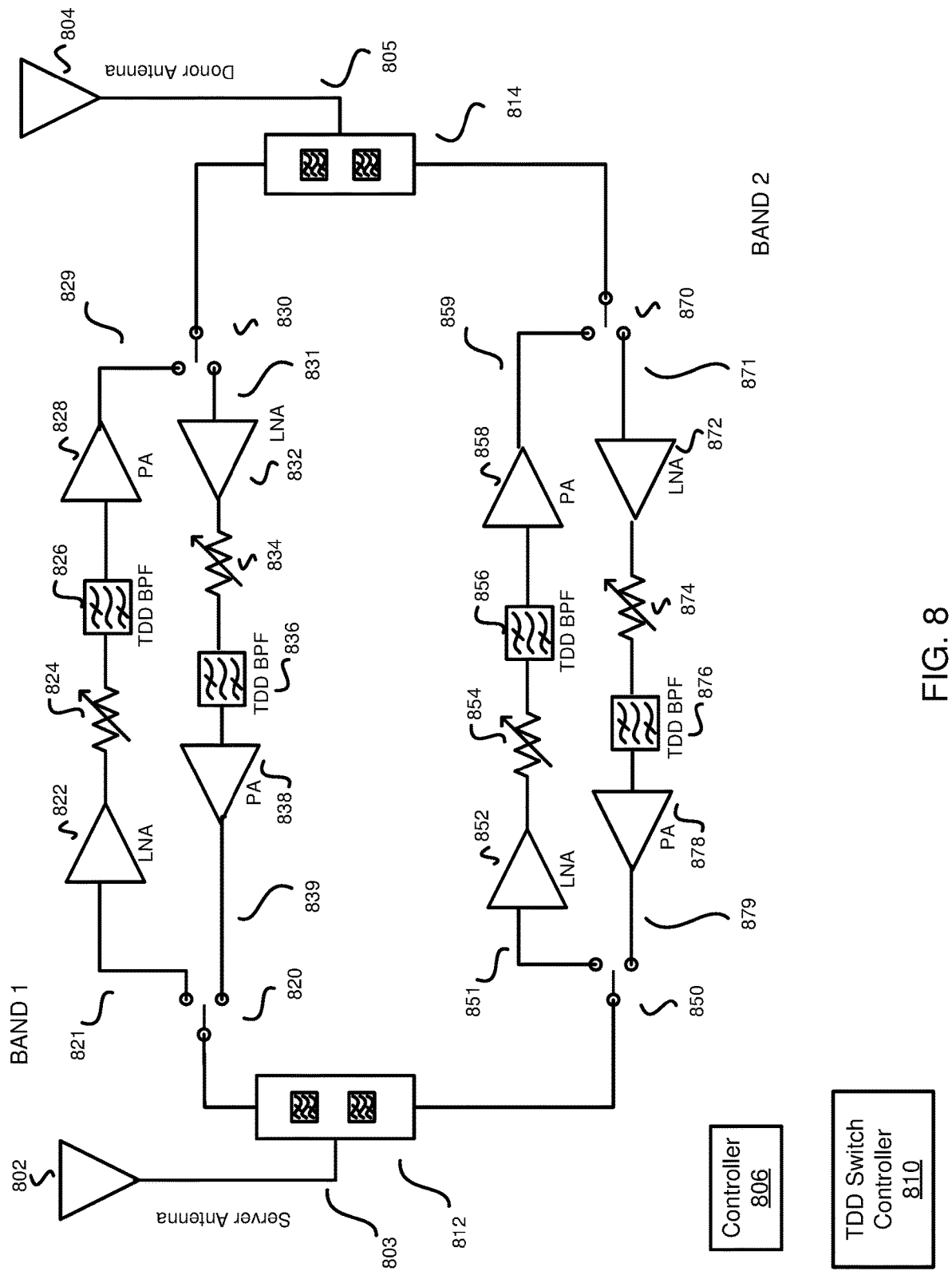
FIG. 8 illustrates a carrier-aggregation (CA) repeater in accordance with an example.

NOTE 1:
Applicable for UE supporting inter-band EN-DC with mandatory simultaneous Rx/Tx capability In another example, as illustrated in FIG. 8, a multi-band TDD repeater is illustrated. The multi-band TDD repeater can be configured to receive, filter, amplify, and transmit TDD UL and DL signals. The repeater illustrated in FIG. 8 can be configured to amplify and filter one or more TDD DL signals without a corresponding TDD UL signal. A TDD UL signal and TDD DL signal typically occupy the same bandwidth. The UCI information for the unpaired DL channel can be sent on a primary component carrier to a primary cell in a carrier aggregation scheme. Alternatively, the UCI information for the unpaired DL channel can be sent on a different channel or frequency band to a secondary eNB in a dual connectivity scheme. For example, the UCI information for a Band 2 DL signal can be sent can be amplified on a first direction path of a Band 1 UL signal and sent to the second port 805 for communication to a donor antenna 804 for transmission to a base station. The signal containing the UCI information can be amplified on a first direction path (i.e. 821 or 851) of the repeater and sent to the second port 805 for communication to a donor antenna 804 for transmission to a base station associated with the primary cell or the secondary eNB. The TDD DL signals can also be amplified and transmitted from the repeater. This will be discussed more fully below.

The multi-band TDD repeater illustrated in FIG. 8 can comprise a first port 803 (e.g., a server port, a device port, or an inside port) and a second port 805 (e.g., a donor port, a node port, or an outside port). The first port 803 can be configured to be coupled to a first antenna 802 (a server antenna, a device antenna, or an inside antenna). The first antenna 802 can be configured to receive a first-direction signal (e.g., an uplink signal) from a wireless device and transmit a second-direction signal (e.g., a downlink signal) to a wireless device. The second port 805 can be configured to be coupled to a second antenna 804 (a donor antenna, a node antenna, or an outside antenna). The second antenna 804 can be configured to transmit a first-direction signal (e.g., an uplink signal) to a base station (e.g., an evolved node B (eNB), a new radio (NR) node B (gNB), or an NR base station (NR BS)) and receive a second-direction signal (e.g., a downlink signal) from a base station. The repeater can also comprise a controller 806. In one example, the controller 806 can include one or more processors and memory.

In another example, the repeater can comprise one or more TDD switch controllers 810. The one or more TDD switch controller 810 can comprise one or more of a modem, a field-programmable gate array (FPGA), or an application-specific integrated circuit (ASIC) that is configured to receive UL/DL configuration information from a base station or a UE and send a signal to one or more switches on a first path or a second path. The one or more TDD switch controllers 810 can be configured to switch between a DL configuration and an UL configuration in a 1 millisecond (ms) subframe basis for 3GPP LTE. The TDD switch controller 810 can be configured to switch between a DL configuration and an UL configuration on a symbol basis for 3GPP 5G, wherein the duration of a symbol can vary based on numerology.

In another example, the first port 803 can be configured to be coupled to a multiplexer 812 (or a diplexer, a duplexer, a circulator, or a splitter). The multiplexer 812 can be configured to be coupled to a first switch 820 and a third switch 850. The first switch 820 can be configured to be coupled to a first-direction path (e.g., an uplink path) 821, and a second-direction path (e.g., a downlink path) 839. The third switch 850 can be configured to be coupled to a first-direction path (e.g., a uplink path) 851, and a second-direction path (e.g., a downlink path) 879. A first-direction signal received at the first port 803 can be directed to the multiplexer 812. The multiplexer 812 can direct the first-direction signal, based on its frequency, to the first switch 820 or the third switch 850.

In another example, the second port 805 can be configured to be coupled to a multiplexer 814 (or a diplexer, a duplexer, a circulator, or a splitter). The multiplexer 814 can be configured to be coupled to a second switch 830 and a fourth switch 870. The third switch 830 can be configured to be coupled to the first-direction path (e.g., an uplink path) 829 and the second-direction path (e.g., a downlink path) 831. The fourth switch 870 can be configured to be coupled to the first-direction path (e.g., a uplink path) 859 and the second-direction path (e.g., a downlink path) 871. A second-direction signal received at the second port 805 can be directed to the multiplexer 814. The multiplexer 814 can direct the second-direction signal, based on its frequency, to the second switch 830 or the fourth switch 870. One or more of the first switch 820, the second switch 830, the third switch 850, or the fourth switch 870 can comprise one or more single-pole double-throw switches.

In another example, a first-direction signal can be directed from the first switch 820. The first switch 820 can be configured to direct the first-direction signal to a first-direction path of the first path 821. The first-direction path of the first path 821 can comprise one or more of: one or more low noise amplifiers (LNAs) 822, one or more variable attenuators 824, one or more filters 826, or one or more power amplifiers (PAs) 828. The one or more PAs 828 can comprise: a variable gain amplifier, a fixed-gain power amplifier, or a gain block. The one or more filters 826 can be configured to pass one or more of a first-direction (e.g., an uplink direction) of a first frequency range (e.g., 3GPP LTE TDD frequency bands 41, 48, or 49). In another example, the one or more filters 826 can be configured to pass one or more of a first-direction (e.g., an uplink direction) of 3GPP LTE TDD frequency bands 33-53, or 3GPP NR TDD frequency bands n34, n38-n41, n50, n51, n77-n79, n257, n258, n260, or n261. In another example, the one or more filters 826 can be configured to pass a selected channel within a 3GPP TDD band. The first direction can be an uplink direction.

In another example, after being directed along the first-direction path of the first path, a first-direction signal of the first frequency range can be amplified and filtered in accordance with the type of amplifiers and filters including along the first-direction path of the first path. The first-direction signal can be further directed from the first path 829 to the second switch 830. The second switch 830 can be configured to direct the first-direction signal to the multiplexer 814. The first-direction signal can be directed from the multiplexer 814 to the second port 805. The first-direction signal can be directed from the second port 805 to the second antenna 804.

In another example, a second-direction signal can be directed from the second switch 830. The second switch 830 can be configured to direct the second-direction signal to the second-direction path of the first path 831. The second-direction path of the first path 831 can comprise one or more of: one or more low noise amplifiers (LNAs) 832, one or more variable attenuators 834, one or more filters 836, or one or more power amplifiers (PAs) 838. The one or more PAs 838 can comprise: a variable gain amplifier, a fixed-gain power amplifier, or a gain block. The one or more filters 836 can be configured to pass one or more of a second-direction (e.g., a downlink direction) of a first frequency range (e.g., 3GPP LTE TDD frequency bands 41, 48, or 49). In another example, the one or more filters 836 can be configured to pass one or more of a second-direction (e.g., a downlink direction) of 3GPP LTE TDD frequency bands 33-53, or 3GPP NR TDD frequency bands n34, n38-n41, n50, n51, n77-n79, n257, n258, n260, or n261. In another example, the one or more filters 836 can be configured to pass a selected channel within a 3GPP TDD band. The second-direction can be a downlink direction.

In another example, after being directed along the second-direction path of the first path, a second-direction signal of the first frequency range can be amplified and filtered in accordance with the type of amplifiers and filters including along the second-direction path of the first path. The second-direction signal can be further directed from the first path 839 to the first switch 820. The first switch 820 can be configured to direct the second-direction signal to the multiplexer 812. The second-direction signal can be directed from the multiplexer 812 to the first port 803. The second-direction signal can be directed from the first port 803 to the first antenna 802.

In another example, a second-direction signal can be directed from the fourth switch 870. The fourth switch 870 can be configured to direct the second-direction signal to the second-direction path of the second path 871. The second-direction path of the second path 871 can comprise one or more of: one or more low noise amplifiers (LNAs) 872, one or more variable attenuators 874, one or more filters 876, or one or more power amplifiers (PAs) 878. The one or more PAs 878 can comprise: a variable gain amplifier, a fixed-gain power amplifier, or a gain block. The one or more filters 876 can be configured to pass one or more of a second-direction (e.g., a downlink direction) of a second frequency range (e.g., 3GPP LTE TDD frequency bands 41, 48, or 49). In another example, the one or more filters 876 can be configured to pass one or more of a second-direction (e.g., a downlink direction) of 3GPP LTE TDD frequency bands 33-53, or 3GPP NR TDD frequency bands n34, n38-n41, n50, n51, n77-n79, n257, n258, n260, or n261. In another example, the one or more filters 876 can be configured to pass a selected channel within a 3GPP TDD band. The second-direction can be a downlink direction.

In another example, after being directed along the second-direction path of the second path, a second-direction signal of the second frequency range can be amplified and filtered in accordance with the type of amplifiers and filters including along the second-direction path of the second path. The second-direction signal can be further directed from the second path 879 to the third switch 850. The third switch 850 can be configured to direct the second-direction signal to the multiplexer 812. The second-direction signal can be directed from the multiplexer 812 to the first port 803. The second-direction signal can be directed from the first port 803 to the first antenna 802.

In another example, a first-direction signal can be directed from the third switch 850. The third switch 850 can be configured to direct the first-direction signal to a first-direction path of the second path 851. The first-direction path of the second path 851 can comprise one or more of: one or more low noise amplifiers (LNAs) 852, one or more variable attenuators 854, one or more filters 856, or one or more power amplifiers (PAs) 858. The one or more PAs 858 can comprise: a variable gain amplifier, a fixed-gain power amplifier, or a gain block. The one or more filters 856 can be configured to pass one or more of a first-direction (e.g., an uplink direction) of a second frequency range (e.g., 3GPP LTE TDD frequency bands 41, 48, or 49). In another example, the one or more filters 856 can be configured to pass one or more of a first-direction (e.g., an uplink direction) of 3GPP LTE TDD frequency bands 33-53, or 3GPP NR TDD frequency bands n34, n38-n41, n50, n51, n77-n79, n257, n258, n260, or n261. In another example, the one or more filters 856 can be configured to pass a selected channel within a 3GPP TDD band. The first direction can be an uplink direction.

In another example, after being directed along the first-direction path of the second path, a first-direction signal of the second frequency range can be amplified and filtered in accordance with the type of amplifiers and filters including along the first-direction path of the second path. The first-direction signal can be further directed from the second path 859 to the fourth switch 870. The fourth switch 870 can be configured to direct the first-direction signal to the multiplexer 814. The first-direction signal can be directed from the multiplexer 814 to the second port 805. The first-direction signal can be directed from the second port 805 to the second antenna 804.

In another example, one or more amplifiers of the first-direction filtering and amplification path for the second path can be turned off, a variable attenuator can be increased, and/or a switch can be opened to reduce or turn off an output of the first-direction filtering and amplification so that the repeater meets the requirements of the regulatory body for transmission of a first-direction signal on the frequency range (i.e. band, bands, channel, or channels).

In another example, one or more amplifiers of the second-direction filtering and amplification path for the second path can be turned off, a variable attenuator can be increased, and/or a switch can be opened to reduce or turn off an output of the second-direction filtering and amplification so that the repeater meets the requirements of the regulatory body for transmission of a second-direction signal on the frequency range (i.e. band, bands, channel, or channels).

One or more TDD switch controllers 810 can be configured to switch the first switch 820 and the second switch 830 between a DL configuration and an UL configuration in a 1 millisecond (ms) subframe basis for 3GPP LTE. The one or more TDD switch controllers 810 can be configured to switch the first switch 820 and the second switch 830 between a DL configuration and an UL configuration on a symbol basis for 3GPP 5G, wherein the duration of a symbol can vary based on numerology.

One or more TDD switch controllers 810 can be configured to switch the third switch 850 and the fourth switch 870 between a DL configuration and an UL configuration in a 1 millisecond (ms) subframe basis for 3GPP LTE. The one or more TDD switch controllers 810 can be configured to switch the third switch 850 and the fourth switch 870 between a DL configuration and an UL configuration on a symbol basis for 3GPP 5G, wherein the duration of a symbol can vary based on numerology.

In another example, a first-direction TDD frequency band (e.g., TDD band 41 UL) can be configured for carrier aggregation with a first-direction TDD band or frequency range (e.g., one or more of 3GPP LTE TDD frequency bands 33-53 or 3GPP 5G TDD frequency bands n34, n38-n41, n50, n51, n77-n79, n257, n258, n260, or n261), or a second-direction TDD frequency band (e.g., TDD band 41 UL) can be configured for carrier aggregation with a second-direction TDD band or frequency range (e.g., one or more of 3GPP LTE TDD frequency bands 33-53 or 3GPP 5G TDD frequency bands n34, n38-n41, n50, n51, n77-n79, n257, n258, n260, or n261). In another example, a first-direction TDD frequency band or a second-direction TDD frequency band can be configured for carrier aggregation or dual-connectivity to enable information configured for communication on the first-direction signal of the second frequency range or the second-direction signal of the second frequency range to only be communicated on the first-direction signal of the first-frequency range or the second-direction signal of the first-frequency range.

In another example, a downlink output power from an output of the second second-direction filtering and amplification path can be less than a threshold in accordance with FCC regulations. In one example, the threshold can be 50 milliwatts (mW) (or 17 decibel-milliwatts (dBm)) conducted and equivalent isotropic radiated power (EIRP) for each band of operation.

In another example, the first-direction signal (e.g., an uplink signal) of the second frequency range (e.g., 3GPP LTE TDD operating bands or 3GPP 5G TDD operating bands) can be prohibited by a regulatory body (e.g., the FCC) from amplification using a repeater. In another example, the repeater can be an FCC-compliant consumer signal booster.

In another example, the first-direction signal (e.g., an uplink signal) of the second frequency range (e.g., 3GPP LTE TDD operating bands or 3GPP 5G TDD operating bands) can be prohibited by a regulatory body (e.g., the FCC) from amplification using a repeater (e.g., a consumer signal booster) due to adjacent signal interference with the first-direction signal of the second frequency range. Regulatory bodies may prohibit the repeater from amplification on the first-direction signal of the second frequency range because of potential in-band interference to incumbent or shared users on the same frequency band or interference to adjacent frequency bands.

In another example, a repeater can comprise m additional first-direction filtering and amplification paths configured to be coupled between the first port 803 and the second port 805, wherein each of the m additional first-direction filtering and amplification paths can be configured to filter a first-direction signal of a selected frequency range. The selected frequency range can include 3GPP LTE TDD frequency bands 33-53, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster).

In another example, a repeater can comprise n additional second-direction filtering and amplification paths configured to be coupled between the first port 803 and the second port 805, wherein each of the n additional second-direction filtering and amplification paths can be configured to filter a second-direction signal of a selected frequency range. The selected frequency range can include 3GPP LTE TDD frequency bands 33-53, wherein the selected frequency range may not include a frequency range that has been prohibited by a regulatory body (e.g., the FCC) from amplification using a repeater (e.g., a consumer signal booster). In another example, the selected frequency range can include 3GPP LTE FDD frequency bands 1-28, 30, 31, 65, 66, 68, 70-74, or 85, 3GPP LTE TDD frequency bands 33-53, 3GPP NR FDD frequency bands n1-n3, n5, n7, n8, n12, n20, n25, n28, n65, n66, n70, n71, or n74, or 3GPP NR TDD frequency bands n34, n38-n41, n50, n51, n77-n79, n257, n258, n260, or n261, wherein the selected frequency range may not include a frequency range that has been prohibited by a regulatory body (e.g., the FCC) from amplification using a repeater (e.g., a consumer signal booster). The multi-band TDD repeater can also be combined with to filter and amplify one or more FDD bands, as illustrated in FIG. 5d.

Figure 9A:
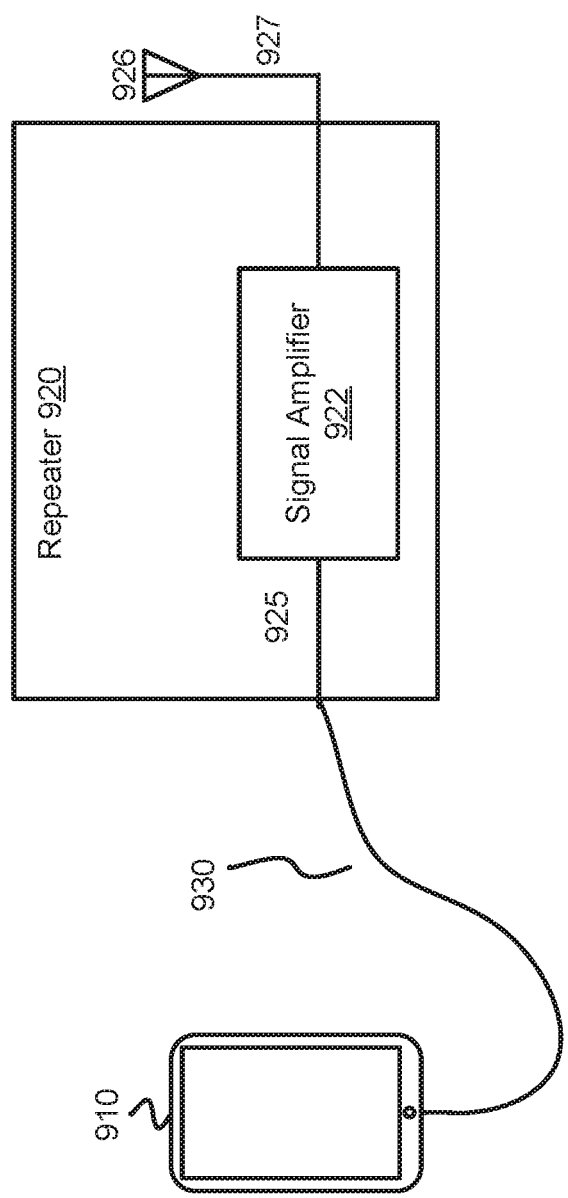
FIG. 9a illustrates a direct connect repeater in accordance with an example.

In another example, as illustrated in FIG. 9a, a repeater 920 can comprise a direct-connect repeater with a coaxial cable 930 configured to be coupled between a wireless device 910 and a server port 925 of a repeater 920. The repeater 920 can comprise a signal amplifier 922 with one or more downlink amplification paths and one or more uplink amplification paths. The repeater 920 can comprise a donor port 927 configured to be coupled to a donor antenna 926. The donor antenna can be configured to receive downlink signals from a base station or transmit uplink signals to a base station. The coaxial cable 930 can be configured to direct downlink signals to the wireless device 910 from the server port 925 or direct uplink signals from the wireless device 910 to the server port 925 of the signal amplifier 922.

In one example, a direct-connect repeater can be configured to receive one or more downlink frequency bands or ranges from a base station and transmit one or more downlink frequency bands or ranges to a wireless device via the coaxial cable 930 without receiving the corresponding one or more uplink frequency bands or ranges from the wireless device via the coaxial cable or transmitting the one or more uplink frequency bands or ranges to the base station. In one example, the one or more downlink frequency bands or ranges can be prohibited by a regulatory body (e.g., the FCC) from wireless transmission using a repeater or consumer signal booster. Alternatively, the UL bands associated with the one or more downlink frequency bands may be prohibited by the regulatory body. In another alternative, both the UL bands and DL bands may be prohibited by the regulatory body. The one or more corresponding uplink frequency bands or ranges may not be re-transmitted wirelessly at the repeater 920 for transmission to a base station. In one example, a direct-connect repeater can be configured to filter and amplify: one or more downlink-limited frequency bands or ranges for frequency bands or ranges that may be prohibited by a regulatory body (e.g., the FCC) from wireless re-transmission by a repeater. The one or more downlink-limited frequency bands can be transmitted with a gain from the signal amplifier that is less than a selected threshold. In one example, the threshold gain from the amplifier for a downlink signal to a direct connect device is 15 dB, as measured at the server port relative to the donor port.

In another example, as illustrated in FIG. 9b, a repeater can include a cradle 955 that can have an interface port 980 capable of carrying a wireless device 910. The cradle 955 can include a donor antenna 975 and a server antenna 970. In one example, the maximum gain of the cradle 955 can be 23 decibels (dB) at the server antenna 970 of the cradle. In one example, the maximum range of the cradle 955 can be 8 inches or 20 centimeters (cm).

In one example, a cradle-coupled repeater can be configured to receive one or more downlink frequency bands or ranges from a base station and transmit one or more downlink frequency bands or ranges to a wireless device via a cradle 955 without receiving the corresponding one or more uplink frequency bands or ranges from the wireless device or transmitting the one or more uplink frequency bands or ranges to the base station. In one example, the one or more downlink frequency bands or ranges can be prohibited by a regulatory body (e.g., the FCC) from downlink wireless transmission above a power threshold or a gain threshold using a repeater or consumer signal booster. The one or more corresponding uplink frequency bands or ranges may not be re-transmitted wirelessly at the repeater 920 for transmission to a base station. In one example, a cradle-coupled repeater can be configured to include: one or more downlink-limited frequency bands or ranges for frequency bands or ranges that may be prohibited by a regulatory body (e.g., the FCC) from wireless re-transmission by a repeater above the power threshold or the gain threshold. The power threshold for a downlink transmission from a repeater can be 0 dBm or 17 dBm, and the gain threshold can be 23 dB at the server port of the cradle relative to the donor port of the cradle.

Figure 10:
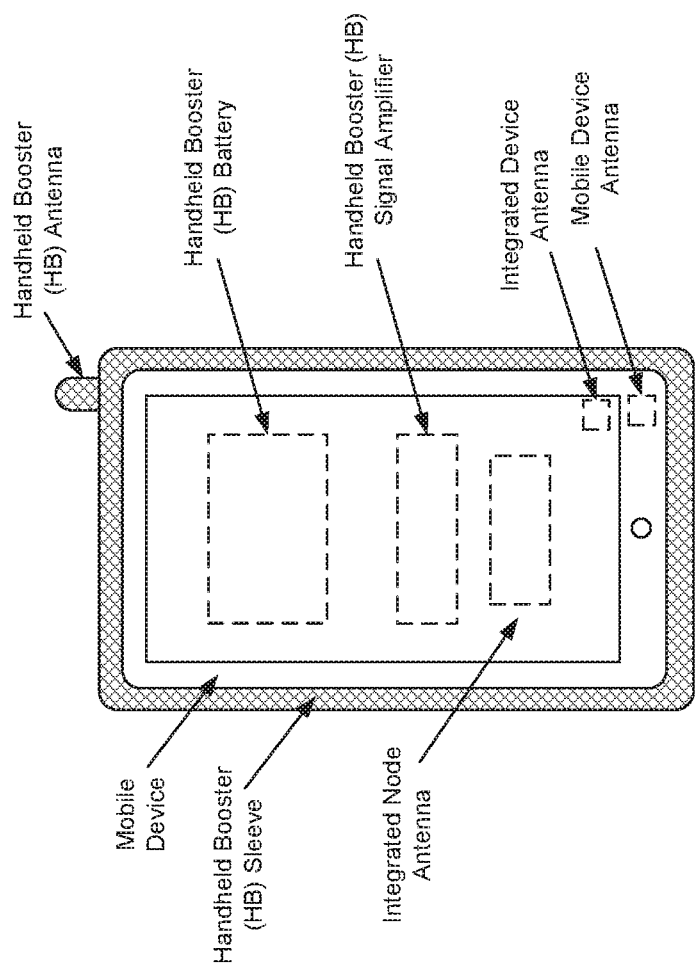
FIG. 10 illustrates a handheld booster in communication with a wireless device in accordance with an example.

While various embodiments described herein, and illustrated in FIGS. 1-9b, have been described with respect to a cellular signal amplifier with a donor antenna and a server antenna, this is not intended to be limiting. A repeater can also be accomplished using a handheld booster, as illustrated in FIG. 10. The handheld booster can include an integrated device antenna and an integrated node antenna that are typically used in place of the server antenna and the donor antenna, respectively.

Figure 11:
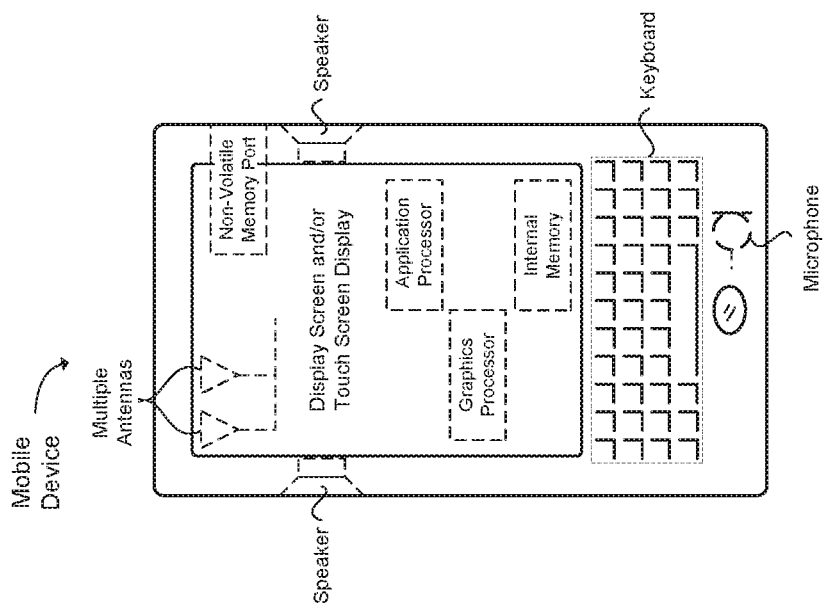
FIG. 11 illustrates a user equipment (UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 12:
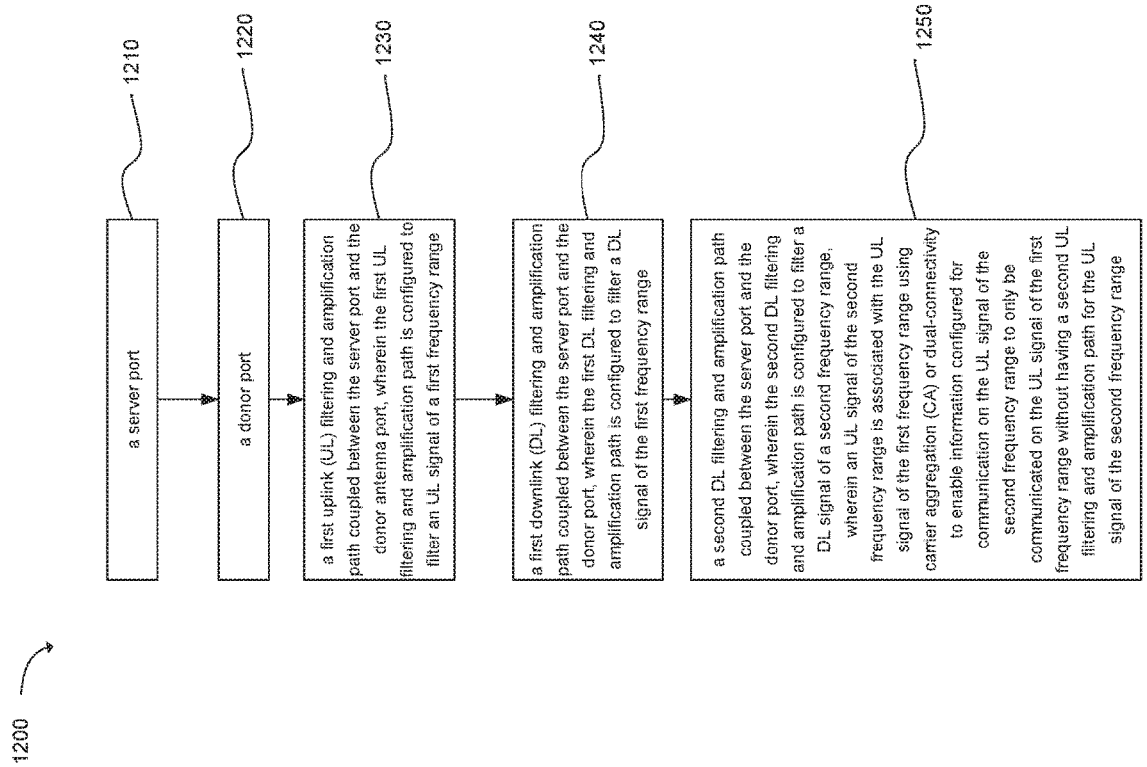
FIG. 12 depicts a repeater in accordance with an example.

Another example provides a repeater 1200, as shown in the flow chart in FIG. 12. The repeater can comprise: a server port, as shown in block 1210. The repeater can comprise: a donor port, as shown in block 1220. The repeater can comprise a first uplink (UL) filtering and amplification path coupled between the server port and the donor port, wherein the first UL filtering and amplification path is configured to filter an UL signal of a first frequency range, as shown in block 1230. The repeater can comprise a first downlink (DL) filtering and amplification path coupled between the server port and the donor port, wherein the first DL filtering and amplification path is configured to filter a DL signal of the first frequency range, as shown in block 1240. The repeater can comprise a second DL filtering and amplification path coupled between the server port and the donor port, wherein the second DL filtering and amplification path is configured to filter a DL signal of a second frequency range, wherein an UL signal of the second frequency range is associated with the UL signal of the first frequency range using carrier aggregation (CA) or dual-connectivity to enable information configured for communication on the UL signal of the second frequency range to only be communicated on the UL signal of the first frequency range without having a second UL filtering and amplification path for the UL signal of the second frequency range, as shown in block 1250.

Another example provides a repeater 1300, as shown in the flow chart in FIG. 13. The repeater can comprise a first port, as shown in block 1310. The repeater can comprise a second port, as shown in block 1320. The repeater can comprise a first first-direction filtering and amplification path coupled between the first port and the second port, wherein the first first-direction filtering and amplification path is configured to filter a first-direction signal of a first frequency range, as shown in block 1330. The repeater can comprise a first second-direction filtering and amplification path coupled between the first port and the second port, wherein the first second-direction filtering and amplification path is configured to filter a second-direction signal of the first frequency range, as shown in block 1340. The repeater can comprise a second second-direction filtering and amplification path coupled between the first port and the second port, wherein the second second-direction filtering and amplification path is configured to filter a second-direction signal of a second frequency range, wherein a first-direction signal of the second frequency range is associated with the first-direction signal of the first frequency range using carrier aggregation (CA) or dual-connectivity to enable information configured for communication on the first-direction signal of the second frequency range to only be communicated on the first-direction signal of the first frequency range without having a second first-direction filtering and amplification path for the first-direction signal of the second frequency range, as shown in block 1350.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater comprising:
   a server port;
   a donor port;
   a first uplink (UL) filtering and amplification path coupled between the server port and the donor port, wherein the first UL filtering and amplification path is configured to filter an UL signal of a first frequency range;
   a first downlink (DL) filtering and amplification path coupled between the server port and the donor port, wherein the first DL filtering and amplification path is configured to filter a DL signal of the first frequency range; and
   a second DL filtering and amplification path coupled between the server port and the donor port, wherein the second DL filtering and amplification path is configured to filter a DL signal of a second frequency range,
   wherein an UL signal of the second frequency range is associated with the UL signal of the first frequency range using carrier aggregation (CA) or dual-connectivity to enable information configured for communication on the UL signal of the second frequency range to only be communicated on the UL signal of the first frequency range without having a second UL filtering and amplification path for the UL signal of the second frequency range.

2. The repeater of claim 1, wherein a DL output power from an output of the second DL filtering and amplification path is less than a threshold.

3. The repeater of claim 2, wherein the threshold is one of:
   17 decibel-milliwatts (dBm); or
   0 dBm.

4. The repeater of claim 3, wherein the repeater is coupled to a cradle.

5. The repeater of claim 1, wherein the server port is configured to be coupled to a user equipment (UE) via a wired connection.

6. The repeater of claim 1, wherein the UL signal of the second frequency range is prohibited by a regulatory body from amplification using:
   the repeater; or
   a consumer signal booster;
   wherein the second frequency range is prohibited due to adjacent signal interference with the UL signal of the second frequency range or due to in-band interference to incumbents or shared users.

7. The repeater of claim 1, wherein the first frequency range and the second frequency range are configured for CA in CA operating band combinations selected from Third Generation Partnership Project (3GPP) operating band combinations:

| 3GPP LTE CA Band | 3GPP LTE Band |
|---|---|
| CA_1-3 | 1, 3 |
| CA_1-1-3 | 1, 3 |
| CA_1-1-5 | 1, 5 |

-continued

| 3GPP LTE CA Band | 3GPP LTE Band |
|---|---|
| CA_1-1-7 | 1, 7 |
| CA_1-1-28 | 1, 28 |
| CA_1-3-3 | 1, 3 |
| CA_1-5 | 1, 5 |
| CA_1-7 | 1, 7 |
| CA_1-7-7 | 1, 7 |
| CA_1-8 | 1, 8 |
| CA_1-11 | 1, 11 |
| CA_1-18 | 1, 18 |
| CA_1-19 | 1, 19 |
| CA_1-20 | 1, 20 |
| CA_1-21 | 1, 21 |
| CA_1-26 | 1, 26 |
| CA_1-28 | 1, 28 |
| CA_1-32 | 1, 32 |
| CA_1-38 | 1, 38 |
| CA_1-40 | 1, 40 |
| CA_1-41 | 1, 41 |
| CA_1-42 | 1, 42 |
| CA_1-42-42 | 1, 42 |
| CA_1-43 | 1, 43 |
| CA_1-46 | 1, 46 |
| CA_2-4 | 2, 4 |
| CA_2-2-4 | 2, 4 |
| CA_2-2-4-4 | 2, 4 |
| CA_2-4-4 | 2, 4 |
| CA_2-5 | 2, 5 |
| CA_2-2-5 | 2, 5 |
| CA_2-2-7 | 2, 7 |
| CA_2-7 | 2, 7 |
| CA_2-7-7 | 2, 7 |
| CA_2-12 | 2, 12 |
| CA_2-2-12 | 2, 12 |
| CA_2-2-12-12 | 2, 12 |
| CA_2-2-29 | 2, 29 |
| CA_2-7-46 | 2, 7, 46 |
| CA_2-12-12 | 2, 12 |
| CA_2-13 | 2, 13 |
| CA_2-2-13 | 2, 13 |
| CA_2-14 | 2, 14 |
| CA_2-2-14 | 2, 14 |
| CA_2-17 | 2, 17 |
| CA_2-28 | 2, 28 |
| CA_2-29 | 2, 29 |
| CA_2-30 | 2, 30 |
| CA_2-2-30 | 2, 30 |
| CA_2-46 | 2, 46 |
| CA_2-2-46 | 2, 46 |
| CA_2-46-46 | 2, 46 |
| CA_2-48-48 | 2, 48 |
| CA_2-49 | 2, 49 |
| CA_2-66 | 2, 66 |
| CA_2-48 | 2, 48 |
| CA_2-2-66 | 2, 66 |
| CA_2-2-66-66 | 2, 66 |
| CA_2-66-66 | 2, 66 |
| CA_2-66-66-66 | 2, 66 |
| CA_2-71 | 2, 71 |
| CA_2-2-71 | 2, 71 |
| CA_3-5 | 3, 5 |
| CA_3-7 | 3, 7 |
| CA_3-3-7 | 3, 7 |
| CA_3-3-7-7 | 3, 7 |
| CA_3-7-7 | 3, 7 |
| CA_3-8 | 3, 8 |
| CA_3-3-8 | 3, 8 |
| CA_3-11 | 3, 11 |
| CA_3-18 | 3, 18 |
| CA_3-19 | 3, 19 |
| CA_3-3-19 | 3, 19 |
| CA_3-20 | 3, 20 |
| CA_3-3-20 | 3, 20 |
| CA_3-3-21 | 3, 21 |
| CA_3-3-28 | 3, 28 |
| CA_3-3-41 | 3, 41 |
| CA_3-3-42 | 3, 42 |
| CA_3-21 | 3, 21 |
| CA_3-26 | 3, 26 |
| CA_3-27 | 3, 27 |
| CA_3-28 | 3, 28 |
| CA_3-31 | 3, 31 |
| CA_3-32 | 3, 32 |
| CA_3-38 | 3, 38 |
| CA_3-40 | 3, 40 |
| CA_3-40-40 | 3, 40 |
| CA_3-41 | 3, 41 |
| CA_3-42 | 3, 42 |
| CA_3-42-42 | 3, 42 |
| CA_3-43 | 3, 43 |
| CA_3-46 | 3, 46 |
| CA_3-3-46 | 3, 46 |
| CA_3-69 | 3, 69 |
| CA_4-5 | 4, 5 |
| CA_4-4-5 | 4, 5 |
| CA_4-7 | 4, 7 |
| CA_4-4-7 | 4, 7 |
| CA_4-7-7 | 4, 7 |
| CA_4-12 | 4, 12 |
| CA_4-4-12 | 4, 12 |
| CA_4-4-12-12 | 4, 12 |
| CA_4-12-12 | 4, 12 |
| CA_4-13 | 4, 13 |
| CA_4-4-13 | 4, 13 |
| CA_4-17 | 4, 17 |
| CA_4-27 | 4, 27 |
| CA_4-28 | 4, 28 |
| CA_4-29 | 4, 29 |
| CA_4-4-29 | 4, 29 |
| CA_4-30 | 4, 30 |
| CA_4-4-30 | 4, 30 |
| CA_4-46 | 4, 46 |
| CA_4-46-46 | 4, 46 |
| CA_4-48 | 4, 48 |
| CA_4-71 | 4, 71 |
| CA_4-4-71 | 4, 71 |
| CA_5-5-40 | 5, 40 |
| CA_5-7 | 5, 7 |
| CA_5-7-7 | 5, 7 |
| CA_5-12 | 5, 12 |
| CA_5-12-12 | 5, 12 |
| CA_5-13 | 5, 13 |
| CA_5-17 | 5, 17 |
| CA_5-25 | 5, 25 |
| CA_5-28 | 5, 28 |
| CA_5-29 | 5, 29 |
| CA_5-30 | 5, 30 |
| CA_5-38 | 5, 38 |
| CA_5-40 | 5, 40 |
| CA_5-40-40 | 5, 40 |
| CA_5-41 | 5, 41 |
| CA_5-46 | 5, 46 |
| CA_5-48 | 5, 48 |
| CA_5-66 | 5, 66 |
| CA_5-5-66 | 5, 66 |
| CA_5-66-66 | 5, 66 |
| CA_5-5-66-66 | 5, 66 |
| CA_7-8 | 7, 8 |
| CA_7-7-8 | 7, 8 |
| CA_7-12 | 7, 12 |
| CA_7-20 | 7, 20 |
| CA_7-22 | 7, 22 |
| CA_7-26 | 7, 26 |
| CA_7-7-26 | 7, 26 |
| CA_7-28 | 7, 28 |
| CA_7-7-28 | 7, 28 |
| CA_7-30 | 7, 30 |
| CA_7-32 | 7, 32 |
| CA_7-40 | 7, 40 |
| CA_7-42 | 7, 42 |
| CA_7-42-42 | 7, 42 |
| CA_7-46 | 7, 46 |
| CA_7-7-46 | 7, 46 |
| CA_7-7-66 | 7, 66 |
| CA_7-66 | 7, 66 |

-continued

| 3GPP LTE CA Band | 3GPP LTE Band |
|---|---|
| CA_7-66-66 | 7, 66 |
| CA_7-7-66-66 | 7, 66 |
| CA_8-11 | 8, 11 |
| CA_8-20 | 8, 20 |
| CA_8-27 | 8, 27 |
| CA_8-28 | 8, 28 |
| CA_8-32 | 8, 32 |
| CA_8-38 | 8, 38 |
| CA_8-39 | 8, 39 |
| CA_8-40 | 8, 40 |
| CA_8-41 | 8, 41 |
| CA_8-42 | 8, 42 |
| CA_8-46 | 8, 46 |
| CA_11-18 | 11, 18 |
| CA_11-26 | 11, 26 |
| CA_11-28 | 11, 28 |
| CA_11-41 | 11, 41 |
| CA_11-42 | 11, 42 |
| CA_11-46 | 11, 46 |
| CA_12-25 | 12, 25 |
| CA_12-30 | 12, 30 |
| CA_12-46 | 12, 46 |
| CA_12-48 | 12, 48 |
| CA_12-48 | 12, 48 |
| CA_12-66 | 12, 66 |
| CA_12-66-66 | 12, 66 |
| CA_13-46 | 13, 46 |
| CA_13-48 | 13, 48 |
| CA_13-48-48 | 13, 48 |
| CA_13-66 | 13, 66 |
| CA_13-66-66 | 13, 66 |
| CA_14-66 | 14, 66 |
| CA_14-66-66 | 14, 66 |
| CA_14-66-66-66 | 14, 66 |
| CA_14-30 | 14, 30 |
| CA_18-281 | 18, 28 |
| CA_18-42 | 18, 42 |
| CA_19-21 | 19, 21 |
| CA_19-282 | 19, 28 |
| CA_19-42 | 19, 42 |
| CA_19-46 | 19, 46 |
| CA_20-281 | 20, 28 |
| CA_20-31 | 20, 31 |
| CA_20-32 | 20, 32 |
| CA_20-38 | 20, 38 |
| CA_20-40 | 20, 40 |
| CA_20-40-40 | 20, 40 |
| CA_20-42 | 20, 42 |
| CA_20-42-42 | 20, 42 |
| CA_20-43 | 20, 43 |
| CA_20-67 | 20, 67 |
| CA_20-75 | 20, 75 |
| CA_20-76 | 20, 76 |
| CA_21-28 | 21, 28 |
| CA_21-42 | 21, 42 |
| CA_21-46 | 21, 46 |
| CA_23-29 | 23, 29 |
| CA_25-26 | 25, 26 |
| CA_25-25-26 | 25, 26 |
| CA_25-41 | 25, 41 |
| CA_25-25-41 | 25, 41 |
| CA_25-46 | 25, 46 |
| CA_26-41 | 26, 41 |
| CA_26-46 | 26, 46 |
| CA_26-48 | 26, 48 |
| CA_26-48-48 | 26, 48 |
| CA_28-32 | 28, 32 |
| CA_28-38 | 28, 38 |
| CA_28-40 | 28, 40 |
| CA_28-41 | 28, 41 |
| CA_28-42 | 28, 42 |
| CA_28-42-42 | 28, 42 |
| CA_28-46 | 28, 46 |
| CA_29-30 | 29, 30 |
| CA_29-66 | 29, 66 |
| CA_29-66-66 | 29, 66 |
| CA_29-70 | 29, 70 |

-continued

| 3GPP LTE CA Band | 3GPP LTE Band |
|---|---|
| CA_30-66 | 30, 66 |
| CA_30-66-66 | 30, 66 |
| CA_32-42 | 32, 42 |
| CA_32-43 | 32, 43 |
| CA_34-39 | 34, 39 |
| CA_34-41 | 34, 41 |
| CA_38-40 | 38, 40 |
| CA_38-40-40 | 38, 40 |
| CA_39-41 | 39, 41 |
| CA_39-40 | 39, 40 |
| CA_39-42 | 39, 42 |
| CA_39-46 | 39, 46 |
| CA_40-41 | 40, 41 |
| CA_40-42 | 40, 42 |
| CA_40-43 | 40, 43 |
| CA_40-46 | 40, 46 |
| CA_41-42 | 41, 42 |
| CA_41-42-42 | 41, 42 |
| CA_41-46 | 41, 46 |
| CA_41-48 | 41, 48 |
| CA_42-43 | 42, 43 |
| CA_42-46 | 42, 46 |
| CA_46-48 | 46, 48 |
| CA_46-48-48 | 46, 48 |
| CA_46-66 | 46, 66 |
| CA_46-46-66 | 46, 66 |
| CA_46-66-66 | 46, 66 |
| CA_46-70 | 46, 70 |
| CA_46-71 | 46, 71 |
| CA_48-66 | 48, 66 |
| CA_48-66-66 | 48, 66 |
| CA_48-66-66-66 | 48, 66 |
| CA_48-48-66 | 48, 66 |
| CA_48-71 | 48, 71 |
| CA_48-48-71 | 48, 71 |
| CA_66-70 | 66, 70 |
| CA_66-66-70 | 66, 70 |
| CA_66-71 | 66, 71 |
| CA_66-66-71 | 66, 71 |
| CA_70-71 | 70, 71. |

8. The repeater of claim 1, wherein the first frequency range and the second frequency range are configured for CA in CA operating band combinations selected from Third Generation Partnership Project (3GPP) operating band combinations:

| 3GPP NR CA Band | 3GPP NR Band |
|---|---|
| CA_n3-n77 | n3, n77 |
| CA_n3-n78 | n3, n78 |
| CA_n3-n79 | n3, n79 |
| CA_n8-n75 | n8, n75 |
| CA_n8-n78 | n8, n78 |
| CA_n8-n79 | n8, n79 |
| CA_n28-n75 | n28, n75 |
| CA_n28_n78 | n28, n78 |
| CA_n41-n78 | n41, n78 |
| CA_n75-n78 | n75, n78 |
| CA_n77-n79 | n77, n79 |
| CA_n78-n79 | n78, n79 |
| CA_nX-nY | nX, nY |
| CA_n8-n258 | n8, n258 |
| CA_n71-n257 | n71, n257 |
| CA_n77-n257 | n77, n257 |
| CA_n78-n257 | n78, n257 |
| CA_n79-n257 | n79, n257. |

9. The repeater of claim 1, wherein the first frequency range and the second frequency range are configured for dual-connectivity in operating band combinations selected from Third Generation Partnership Project (3GPP) operating band combinations:

| 3GPP LTE Dual-Connectivity Band | 3GPP LTE Band |
|---|---|
| DC_1-3 | 1, 3 |
| DC_1-5 | 1, 5 |
| DC_1-7 | 1, 7 |
| DC_1-8 | 1, 8 |
| DC_1-11 | 1, 11 |
| DC_1-19 | 1, 19 |
| DC_1-20 | 1, 20 |
| DC_1-21 | 1, 21 |
| DC_1-42 | 1, 42 |
| DC_2-4 | 2, 4 |
| DC_2-5 | 2, 5 |
| DC_2-7 | 2, 7 |
| DC_2-12 | 2, 12 |
| DC_2-13 | 2, 13 |
| DC_2-30 | 2, 30 |
| DC_2-66 | 2, 66 |
| DC_3-5 | 3, 5 |
| DC_3-7 | 3, 7 |
| DC_3-8 | 3, 8 |
| DC_3-11 | 3, 11 |
| DC_3-18 | 3, 18 |
| DC_3-19 | 3, 19 |
| DC_3-20 | 3, 20 |
| DC_3-21 | 3, 21 |
| DC_3-26 | 3, 26 |
| DC_3-28 | 3, 28 |
| DC_3-40 | 3, 40 |
| DC_3-42 | 3, 42 |
| DC_4-5 | 4, 5 |
| DC_4-7 | 4, 7 |
| DC_4-12 | 4, 12 |
| DC_4-13 | 4, 13 |
| DC_4-17 | 4, 17 |
| DC_5-7 | 5, 7 |
| DC_5-12 | 5, 12 |
| DC_5-17 | 5, 17 |
| DC_5-30 | 5, 30 |
| DC_5-40 | 5, 40 |
| DC_5-66 | 5, 66 |
| DC_7-8 | 7, 8 |
| DC_7-20 | 7, 20 |
| DC_7-26 | 7, 26 |
| DC_7-28 | 7, 28 |
| DC_8-39 | 8, 39 |
| DC_8-41 | 8, 41 |
| DC_11-18 | 11, 18 |
| DC_11-26 | 11, 26 |
| DC_12-30 | 12, 30 |
| DC_12-66 | 12, 66 |
| DC_19-21 | 19, 21 |
| DC_19-42 | 19, 42 |
| DC_21-42 | 21, 42 |
| DC_21-28 | 21, 28 |
| DC_26-46 | 26, 46 |
| DC_26-48 | 26, 48 |
| DC_28-41 | 28, 41 |
| DC_28-42 | 28, 42 |
| DC_30-66 | 30, 66 |
| DC_39-41 | 39, 41 |
| DC_40-42 | 40, 42 |
| DC_41-42 | 41, 42. |

10. The repeater of claim 1, wherein the first frequency range and the second frequency range are configured for dual-connectivity in operating band combinations selected from Third Generation Partnership Project (3GPP) operating band combinations:

| 3GPP Dual-Connectivity Band | 3GPP LTE Band | 3GPP NR Band |
|---|---|---|
| DC_1_n28 | 1 | n28 |
| DC_1_n40 | 1 | n40 |
| DC_1_n51 | 1 | n51 |
| DC_1_n77 | 1 | n77 |
| DC_1_n78 | 1 | n78 |
| DC_1_n79 | 1 | n79 |
| DC_2_n5 | 2 | n5 |
| DC_2_n66 | 2 | n66 |
| DC_2_n71 | 2 | n71 |
| DC_2_n78 | 2 | n78 |
| DC_3_n7 | 3 | n7 |
| DC_3_n28 | 3 | n28 |
| DC_3_n40 | 3 | n40 |
| DC_3_n51 | 3 | n51 |
| DC_3_n77 | 3 | n77 |
| DC_3_n78 | 3 | n78 |
| DC_3_n79 | 3 | n79 |
| DC_5_n40 | 5 | n40 |
| DC_5_n66 | 5 | n66 |
| DC_5_n78 | 5 | n78 |
| DC_7_n28 | 7 | n28 |
| DC_7_n51 | 7 | n51 |
| DC_7_n78 | 7 | n78 |
| DC_7-7_n78 | CA_7-7 | n78 |
| DC_8_n40 | 8 | n40 |
| DC_8_n77 | 8 | n77 |
| DC_8_n78 | 8 | n78 |
| DC_8_n79 | 8 | n79 |
| DC_11_n77 | 11 | n77 |
| DC_11_n78 | 11 | n78 |
| DC_11_n79 | 11 | n79 |
| DC_12_n5 | 12 | n5 |
| DC_12_n66 | 12 | n66 |
| DC_18_n77 | 18 | n77 |
| DC_18_n78 | 18 | n78 |
| DC_18_n79 | 18 | n79 |
| DC_19_n77 | 19 | n77 |
| DC_19_n78 | 19 | n78 |
| DC_19_n79 | 19 | n79 |
| DC_20_n8 | 20 | n8 |
| DC_20_n28 | 20 | n28 |
| DC_20_n51 | 20 | n51 |
| DC_20_n77 | 20 | n77 |
| DC_20_n78 | 20 | n78 |
| DC_21_n77 | 21 | n77 |
| DC_21_n78 | 21 | n78 |
| DC_21_n79 | 21 | n79 |
| DC_25_n41 | 25 | n41 |
| DC_26_n41 | 26 | n41 |
| DC_26_n77 | 26 | n77 |
| DC_26_n78 | 26 | n78 |
| DC_26_n79 | 26 | n79 |
| DC_28_n51 | 28 | n51 |
| DC_28_n77 | 28 | n77 |
| DC_28_n78 | 28 | n78 |
| DC_28_n79 | 28 | n79 |
| DC_30_n5 | 30 | n5 |
| DC_30_n66 | 30 | n66 |
| DC_38_n78 | 38 | n78 |
| DC_39_n78 | 39 | n78 |
| DC_39_n79 | 39 | n79 |
| DC_40_n77 | 40 | n77 |
| DC_41_n77 | 41 | n77 |
| DC_41_n78 | 41 | n78 |
| DC_41_n79 | 41 | n79 |
| DC_42_n51 | 42 | n51 |
| DC_42_n77 | 42 | n77 |
| DC_42_n78 | 42 | n78 |
| DC_42_n79 | 42 | n79 |
| DC_66_n71 | 66 | n71 |
| DC_66_n5 | 66 | n5 |
| DC_66_n78 | 66 | n78 |
| DC_1_n257 | 1 | n257 |
| DC_2-2_n257 | CA_2-2 | n257 |
| DC_2_n257 | CA_2 | n257 |
| DC_2_n260 | 2 | n260 |
| DC_2_n260 | CA_2 | n260 |
| DC_2-2_n260 | CA_2-2 | n260 |
| DC_3_n257 | 3 | n257 |

-continued

| 3GPP Dual-Connectivity Band | 3GPP LTE Band | 3GPP NR Band |
|---|---|---|
| DC_3_n258 | 3 | n258 |
| DC_5_n257 | 5 | n257 |
| DC_5-5_n257 | CA_5-5 | n257 |
| DC_5-5_n260 | CA_5-5 | n260 |
| DC_5_n260 | 5 | n260 |
| DC_5_n261 | 5 | n261 |
| DC_7-7_n257 | CA_7-7 | n257 |
| DC_7_n257 | 7 | n257 |
| DC_7_n258 | 7 | n258 |
| DC_8_n257 | 8 | n257 |
| DC_8_n258 | 8 | n258 |
| DC_11_n257 | 11 | n257 |
| DC_12_n260 | 12 | n260 |
| DC_13_n257 | 13 | n257 |
| DC_13_n260 | 13 | n260 |
| DC_18_n257 | 18 | n257 |
| DC_19_n257 | 19 | n257 |
| DC_20_n258 | 20 | n258 |
| DC_21_n257 | 21 | n257 |
| DC_26_n257 | 26 | n257 |
| DC_28_n257 | 28 | n257 |
| DC_28_n258 | 28 | n258 |
| DC_30_n260 | 30 | n260 |
| DC_39_n258 | 39 | n258 |
| DC_41_n257 | 41 | n257 |
| DC_41_n258 | 41 | n258 |
| DC_42_n257 | 42 | n257 |
| DC_48-48_n257 | CA_48-48 | n257 |
| DC_48_n257 | CA_48 | n257 |
| DC_48-48_n260 | CA_48-48 | n260 |
| DC_48_n260 | CA_48 | n260 |
| DC_66-66_n257 | CA_66-66 | n257 |
| DC_66_n257 | 66 | n257 |
| DC_66-66_n260 | CA_66-66 | n260 |
| DC_66_n260 | 66 | n260 |
| DC_66_n261 | 66 | n261 |
| DC_n77-n257 | N/A | n77, n257 |
| DC_n78-n257 | N/A | n78, n257 |
| DC_n79-n257 | N/A | n79, n257. |

11. The repeater of claim 1, wherein the server port is configured to be coupled to a server antenna that is located inside a structure to provide spatial isolation for the DL signal of the second frequency range within the structure.

12. The repeater of claim 11, wherein the structure is a building or a vehicle.

13. The repeater of claim 1, wherein a DL power of the DL signal is limited to isolate the DL signal within a structure.

14. The repeater of claim 1, further comprising:

m additional UL filtering and amplification paths coupled between the server port and the donor port, wherein each UL filtering and amplification path is configured to filter an UL signal of a selected frequency range; and n additional DL filtering and amplification paths coupled between the server port and the donor port, wherein each DL filtering and amplification path is configured to filter a DL signal of a selected frequency range, wherein n is a positive integer and m is an integer greater than or equal to 0 that is less than or equal to n.

15. The repeater of claim 14, wherein the selected frequency range of the UL signal and the selected frequency range of the DL signal are selected from one or more Third Generation Partnership Project (3GPP) operating band combinations comprising:

| 3GPP LTE CA Band | 3GPP LTE Band |
|---|---|
| CA_1-3-5 | 1, 3, 5 |
| CA_1-1-3-5 | 1, 3, 5 |
| CA_1-1-3-7 | 1, 3, 7 |
| CA_1-3-7 | 1, 3, 7 |
| CA_1-3-3-7 | 1, 3, 7 |
| CA_1-3-3-7-7 | 1, 3, 7 |
| CA_1-3-7-7 | 1, 3, 7 |
| CA_1-3-8 | 1, 3, 8 |
| CA_1-3-3-8 | 1, 3, 8 |
| CA_1-3-3-43 | 1, 3, 43 |
| CA_1-3-11 | 1, 3, 11 |
| CA_1-3-18 | 1, 3, 18 |
| CA_1-3-19 | 1, 3, 19 |
| CA_1-3-3-19 | 1, 3, 19 |
| CA_1-3-20 | 1, 3, 20 |
| CA_1-3-3-20 | 1, 3, 20 |
| CA_1-3-21 | 1, 3, 21 |
| CA_1-3-3-21 | 1, 3, 21 |
| CA_1-3-26 | 1, 3, 26 |
| CA_1-3-28 | 1, 3, 28 |
| CA_1-3-3-28 | 1, 3, 28 |
| CA_1-1-3-28 | 1, 3, 28 |
| CA_1-3-32 | 1, 3, 32 |
| CA_1-3-38 | 1, 3, 38 |
| CA_1-3-40 | 1, 3, 40 |
| CA_1-3-41 | 1, 3, 41 |
| CA_1-3-42 | 1, 3, 42 |
| CA_1-3-3-42 | 1, 3, 42 |
| CA_1-3-43 | 1, 3, 43 |
| CA_1-3-46 | 1, 3, 46 |
| CA_1-5-7 | 1, 5, 7 |
| CA_1-5-7-7 | 1, 5, 7 |
| CA_1-5-40 | 1, 5, 40 |
| CA_1-5-41 | 1, 5, 41 |
| CA_1-5-46 | 1, 5, 46 |
| CA_1-7-8 | 1, 7, 8 |
| CA_1-7-7-8 | 1, 7, 8 |
| CA_1-7-20 | 1, 7, 20 |
| CA_1-7-26 | 1, 7, 26 |
| CA_1-7-7-26 | 1, 7, 26 |
| CA_1-7-28 | 1, 7, 28 |
| CA_1-7-32 | 1, 7, 32 |
| CA_1-7-40 | 1, 7, 40 |
| CA_1-7-42 | 1, 7, 42 |
| CA_1-7-46 | 1, 7, 46 |
| CA_1-8-11 | 1, 8, 11 |
| CA_1-8-20 | 1, 8, 20 |
| CA_1-8-28 | 1, 8, 28 |
| CA_1-8-38 | 1, 8, 38 |
| CA_1-8-40 | 1, 8, 40 |
| CA_1-11-18 | 1, 11, 18 |
| CA_1-11-28 | 1, 11, 28 |
| CA_1-18-28 | 1, 18, 28 |
| CA_1-18-42 | 1, 18, 42 |
| CA_1-19-21 | 1, 19, 21 |
| CA_1-19-28 | 1, 19, 28 |
| CA_1-19-42 | 1, 19, 42 |
| CA_1-20-28 | 1, 20, 28 |
| CA_1-20-32 | 1, 20, 32 |
| CA_1-20-42 | 1, 20, 42 |
| CA_1-20-43 | 1, 20, 43 |
| CA_1-21-28 | 1, 21, 28 |
| CA_1-21-42 | 1, 21, 42 |
| CA_1-28-40 | 1, 28, 40 |
| CA_1-28-42 | 1, 28, 42 |
| CA_1-32-42 | 1, 32, 42 |
| CA_1-32-43 | 1, 32, 43 |
| CA_1-41-42 | 1, 41, 42 |
| CA_1-42-42 | 1, 42, 42 |
| CA_1-42-43 | 1, 42, 43 |
| CA_2-4-5 | 2, 4, 5 |
| CA_2-2-4-5 | 2, 4, 5 |
| CA_2-4-4-5 | 2, 4, 5 |
| CA_2-4-12-12 | 2, 4, 12 |
| CA_2-5-12-12 | 2, 5, 12 |
| CA_2-2-5-30 | 2, 5, 30 |
| CA_2-5-46 | 2, 5, 46 |
| CA_2-2-5-66 | 2, 5, 66 |
| CA_2-2-7-12 | 2, 7, 12 |

| 3GPP LTE CA Band | 3GPP LTE Band |
|---|---|
| CA_2-2-7-66 | 2, 7, 66 |
| CA_2-7-66-66 | 2, 7, 66 |
| CA_2-2-12-30 | 2, 12, 30 |
| CA_2-2-12-66 | 2, 12, 66 |
| CA_2-2-12-66-66 | 2, 12, 66 |
| CA_2-2-13-66 | 2, 13, 66 |
| CA_2-2-14-66-66 | 2, 14, 66 |
| CA_2-2-30-66 | 2, 30, 66 |
| CA_2-4-7 | 2, 4, 7 |
| CA_2-4-7-7 | 2, 4, 7 |
| CA_2-4-12 | 2, 4, 12 |
| CA_2-2-4-12 | 2, 4, 12 |
| CA_2-2-5-66-66 | 2, 5, 66 |
| CA_2-4-4-12 | 2, 4, 12 |
| CA_2-4-13 | 2, 4, 13 |
| CA_2-4-28 | 2, 4, 28 |
| CA_2-4-29 | 2, 4, 29 |
| CA_2-4-30 | 2, 4, 30 |
| CA_2-4-71 | 2, 4, 71 |
| CA_2-2-4-71 | 2, 4, 71 |
| CA_2-5-7 | 2, 5, 7 |
| CA_2-5-12 | 2, 5, 12 |
| CA_2-2-5-12 | 2, 5, 12 |
| CA_2-5-13 | 2, 5, 13 |
| CA_2-5-28 | 2, 5, 28 |
| CA_2-5-29 | 2, 5, 29 |
| CA_2-5-30 | 2, 5, 30 |
| CA_2-5-46 | 2, 5, 46 |
| CA_2-5-66 | 2, 5, 66 |
| CA_2-5-66-66 | 2, 5, 66 |
| CA_2-7-12 | 2, 7, 12 |
| CA_2-7-28 | 2, 7, 28 |
| CA_2-7-30 | 2, 7, 30 |
| CA_2-7-46 | 2, 7, 46 |
| CA_2-7-66 | 2, 7, 66 |
| CA_2-7-7-66 | 2, 7, 66 |
| CA_2-12-30 | 2, 12, 30 |
| CA_2-12-66 | 2, 12, 66 |
| CA_2-12-66-66 | 2, 12, 66 |
| CA_2-13-46 | 2, 13, 46 |
| CA_2-13-48 | 2, 13, 48 |
| CA_2-13-48-48 | 2, 13, 48 |
| CA_2-13-66 | 2, 13, 66 |
| CA_2-13-66-66 | 2, 13, 66 |
| CA_2-14-30 | 2, 14, 30 |
| CA_2-2-14-30 | 2, 14, 30 |
| CA_2-14-66 | 2, 14, 66 |
| CA_2-2-14-66 | 2, 14, 66 |
| CA_2-14-66-66 | 2, 14, 66 |
| CA_2-14-66-66-66 | 2, 14, 66 |
| CA_2-2-29-30 | 2, 29, 30 |
| CA_2-29-30 | 2, 29, 30 |
| CA_2-29-66 | 2, 29, 66 |
| CA_2-30-66 | 2, 30, 66 |
| CA_2-30-66-66 | 2, 30, 66 |
| CA_2-46-48 | 2, 46, 48 |
| CA_2-46-66 | 2, 46, 66 |
| CA_2-46-46-66 | 2, 46, 66 |
| CA_2-48-66 | 2, 48, 66 |
| CA_2-48-48-66 | 2, 48, 66 |
| CA_2-66-71 | 2, 66, 71 |
| CA_2-2-66-71 | 2, 66, 71 |
| CA_2-66-66-71 | 2, 66, 71 |
| CA_3-5-7 | 3, 5, 7 |
| CA_3-5-7-7 | 3, 5, 7 |
| CA_3-5-28 | 3, 5, 28 |
| CA_3-5-40 | 3, 5, 40 |
| CA_3-5-40-40 | 3, 5, 40 |
| CA_3-5-41 | 3, 5, 41 |
| CA_3-3-7-8 | 3, 7, 8 |
| CA_3-3-7-7-8 | 3, 7, 8 |
| CA_3-7-7-8 | 3, 7, 8 |
| CA_3-7-8 | 3, 7, 8 |
| CA_3-7-20 | 3, 7, 20 |
| CA_3-3-7-20 | 3, 7, 20 |
| CA_3-7-26 | 3, 7, 26 |
| CA_3-7-7-26 | 3, 7, 26 |
| CA_3-7-28 | 3, 7, 28 |
| CA_3-3-7-28 | 3, 7, 28 |
| CA_3-7-32 | 3, 7, 32 |
| CA_3-7-38 | 3, 7, 38 |
| CA_3-7-40 | 3, 7, 40 |
| CA_3-7-42 | 3, 7, 42 |
| CA_3-7-46 | 3, 7, 46 |
| CA_3-8-11 | 3, 8, 11 |
| CA_3-8-20 | 3, 8, 20 |
| CA_3-8-28 | 3, 8, 28 |
| CA_3-8-32 | 3, 8, 32 |
| CA_3-8-38 | 3, 8, 38 |
| CA_3-8-40 | 3, 8, 40 |
| CA_3-11-18 | 3, 11, 18 |
| CA_3-11-26 | 3, 11, 26 |
| CA_3-11-28 | 3, 11, 28 |
| CA_3-18-42 | 3, 18, 42 |
| CA_3-19-21 | 3, 19, 21 |
| CA_3-3-19-21 | 3, 19, 21 |
| CA_3-19-42 | 3, 19, 42 |
| CA_3-20-281 | 3, 20, 28 |
| CA_3-3-20-281 | 3, 20, 28 |
| CA_3-20-32 | 3, 20, 32 |
| CA_3-20-42 | 3, 20, 42 |
| CA_3-20-43 | 3, 20, 43 |
| CA_3-21-28 | 3, 21, 28 |
| CA_3-21-42 | 3, 21, 42 |
| CA_3-28-38 | 3, 28, 38 |
| CA_3-28-40 | 3, 28, 40 |
| CA_3-28-41 | 3, 28, 41 |
| CA_3-28-42 | 3, 28, 42 |
| CA_3-28-42-42 | 3, 28, 42 |
| CA_3-32-42 | 3, 32, 42 |
| CA_3-32-43 | 3, 32, 43 |
| CA_3-32-46 | 3, 32, 46 |
| CA_3-41-42 | 3, 41, 42 |
| CA_3-41-42-42 | 3, 41, 42 |
| CA_3-42-43 | 3, 42, 43 |
| CA_4-5-12 | 4, 5, 12 |
| CA_4-4-5-12 | 4, 5, 12 |
| CA_4-5-12-12 | 4, 5, 12 |
| CA_4-5-13 | 4, 5, 13 |
| CA_4-5-29 | 4, 5, 29 |
| CA_4-5-30 | 4, 5, 30 |
| CA_4-4-5-30 | 4, 5, 30 |
| CA_4-7-12 | 4, 7, 12 |
| CA_4-7-28 | 4, 7, 28 |
| CA_4-12-30 | 4, 12, 30 |
| CA_4-4-12-30 | 4, 12, 30 |
| CA_4-29-30 | 4, 29, 30 |
| CA_4-4-29-30 | 4, 29, 30 |
| CA_5-7-28 | 5, 7, 28 |
| CA_5-7-46 | 5, 7, 46 |
| CA_5-12-46 | 5, 12, 46 |
| CA_5-12-48 | 5, 12, 48 |
| CA_5-12-66 | 5, 12, 66 |
| CA_5-30-66 | 5, 30, 66 |
| CA_5-30-66-66 | 5, 30, 66 |
| CA_5-40-41 | 5, 40, 41 |
| CA_5-46-66 | 5, 46, 66 |
| CA_7-8-20 | 7, 8, 20 |
| CA_7-8-38 | 7, 8, 38 |
| CA_7-8-40 | 7, 8, 40 |
| CA_7-12-66 | 7, 12, 66 |
| CA_7-20-281 | 7, 20, 28 |
| CA_7-20-32 | 7, 20, 32 |
| CA_7-20-38 | 7, 20, 38 |
| CA_7-20-42 | 7, 20, 42 |
| CA_7-28-38 | 7, 28, 38 |
| CA_7-28-40 | 7, 28, 40 |
| CA_7-30-66 | 7, 30, 66 |
| CA_7-32-46 | 7, 32, 46 |
| CA_7-46-66 | 7, 46, 66 |
| CA_8-11-28 | 8, 11, 28 |
| CA_8-20-281 | 8, 20, 28 |
| CA_8-28-41 | 8, 28, 41 |
| CA_8-39-41 | 8, 39, 41 |

| 3GPP LTE CA Band | 3GPP LTE Band |
|---|---|
| CA_12-30-66 | 12, 30, 66 |
| CA_12-30-66-66 | 12, 30, 66 |
| CA_13-46-66 | 13, 46, 66 |
| CA_13-48-66 | 13, 48, 66 |
| CA_13-48-48-66 | 13, 48, 66 |
| CA_14-30-66 | 14, 30, 66 |
| CA_14-30-66-66 | 14, 30, 66 |
| CA_19-21-42 | 19, 21, 42 |
| CA_20-32-42 | 20, 32, 42 |
| CA_20-32-43 | 20, 32, 43 |
| CA_20-38-40 | 20, 38, 40 |
| CA_25-26-41 | 25, 26, 41 |
| CA_25-25-26-41 | 25, 26, 41 |
| CA_20-38-40-40 | 20, 38, 40 |
| CA_21-28-42 | 21, 28, 42 |
| CA_29-30-66-66 | 29, 30, 66 |
| CA_20-38-40 | 20, 38, 40 |
| CA_28-41-42 | 28, 41, 42 |
| CA_28-41-42-42 | 28, 41, 42 |
| CA_29-30-66 | 29, 30, 66 |
| CA_29-46-66 | 29, 46, 66 |
| CA_29-66-70 | 29, 66, 70 |
| CA_29-66-66-70 | 29, 66, 70 |
| CA_32-42-43 | 32, 42, 43 |
| CA_46-48-66 | 46, 48, 66 |
| CA_46-48-71 | 46, 48, 71 |
| CA_46-48-48-71 | 46, 48, 71 |
| CA_66-70-71 | 66, 70, 71 |
| CA_1-3-5-7 | 1, 3, 5, 7 |
| CA_1-3-5-7-7 | 1, 3, 5, 7 |
| CA_1-3-5-40 | 1, 3, 5, 40 |
| CA_1-3-5-41 | 1, 3, 5, 41 |
| CA_1-3-7-7-26 | 1, 3, 7, 26 |
| CA_1-3-7-8 | 1, 3, 7, 8 |
| CA_1-3-3-7-8 | 1, 3, 7, 8 |
| CA_1-3-7-7-8 | 1, 3, 7, 8 |
| CA_1-3-3-7-7-8 | 1, 3, 7, 8 |
| CA_1-3-7-20 | 1, 3, 7, 20 |
| CA_1-3-7-26 | 1, 3, 7, 26 |
| CA_1-3-7-28 | 1, 3, 7, 28 |
| CA_1-3-7-7-28 | 1, 3, 7, 28 |
| CA_1-3-7-32 | 1, 3, 7, 32 |
| CA_1-3-7-40 | 1, 3, 7, 40 |
| CA_1-3-7-42 | 1, 3, 7, 42 |
| CA_1-3-8-11 | 1, 3, 8, 11 |
| CA_1-3-8-20 | 1, 3, 8, 20 |
| CA_1-3-8-28 | 1, 3, 8, 28 |
| CA_1-3-8-38 | 1, 3, 8, 38 |
| CA_1-3-11-28 | 1, 3, 11, 28 |
| CA_1-3-8-40 | 1, 3, 8, 40 |
| CA_1-3-18-42 | 1, 3, 18, 42 |
| CA_1-3-19-21 | 1, 3, 19, 21 |
| CA_1-3-19-42 | 1, 3, 19, 42 |
| CA_1-3-20-281 | 1, 3, 20, 28 |
| CA_1-3-3-20-28 | CA_1-3-3-20-28 |
| CA_1-3-20-32 | 1, 3, 20, 32 |
| CA_1-3-20-42 | 1, 3, 20, 42 |
| CA_1-3-20-43 | 1, 3, 20, 43 |
| CA_1-3-21-28 | 1, 3, 21, 28 |
| CA_1-3-21-42 | 1, 3, 21, 42 |
| CA_1-3-28-42 | 1, 3, 28, 42 |
| CA_1-3-32-42 | 1, 3, 32, 42 |
| CA_1-3-32-43 | 1, 3, 32, 43 |
| CA_1-3-41-42 | 1, 3, 41, 42 |
| CA_1-3-42-43 | 1, 3, 42, 43 |
| CA_1-5-7-46 | 1, 5, 7, 46 |
| CA_1-7-8-20 | 1, 7, 8, 20 |
| CA_1-7-8-40 | 1, 7, 8, 40 |
| CA_1-7-20-281 | 1, 7, 20, 28 |
| CA_1-7-20-32 | 1, 7, 20, 32 |
| CA_1-7-20-42 | 1, 7, 20, 42 |
| CA_1-8-11-28 | 1, 8, 11, 28 |
| CA_1-8-20-28 | 1, 8, 20, 28 |
| CA_1-19-21-42 | 1, 19, 21, 42 |
| CA_1-20-32-42 | 1, 20, 32, 42 |
| CA_1-20-32-43 | 1, 20, 32, 43 |
| CA_1-21-28-42 | 1, 21, 28, 42 |
| CA_1-32-42-43 | 1, 32, 42, 43 |
| CA_2-2-5-12-66 | 2, 5, 12, 66 |
| CA_2-2-5-30-66 | 2, 5, 30, 66 |
| CA_2-2-7-12-66 | 2.7, 12, 66 |
| CA_2-2-12-30-66 | 2, 12, 30, 66 |
| CA_2-2-14-30-66 | 2, 14, 30, 66 |
| CA_2-4-5-12 | 2, 4, 5, 12 |
| CA_2-4-5-29 | 2, 4, 5, 29 |
| CA_2-4-5-30 | 2, 4, 5, 30 |
| CA_2-4-7-12 | 2, 4, 7, 12 |
| CA_2-4-12-30 | 2, 4, 12, 30 |
| CA_2-4-29-30 | 2, 4, 29, 30 |
| CA_2-5-7-28 | 2, 5, 7, 28 |
| CA_2-5-12-66 | 2, 5, 12, 66 |
| CA_2-5-30-66 | 2, 5, 30, 66 |
| CA_2-5-30-66-66 | 2, 5, 30, 66 |
| CA_2-7-12-66 | 2, 7, 12, 66 |
| CA_2-7-46-66 | 2, 7, 46, 66 |
| CA_2-12-30-66 | 2, 12, 30, 66 |
| CA_2-12-30-66-66 | 2, 12, 30, 66 |
| CA_2-13-48-66 | 2, 13, 48, 66 |
| CA_2-14-30-66 | 2, 14, 30, 66 |
| CA_2-14-30-66-66 | 2, 14, 30, 66 |
| CA_2-29-30-66 | 2, 29, 30, 66 |
| CA_2-46-48-66 | 2, 46, 48, 66 |
| CA_3-7-8-20 | 3, 7, 8, 20 |
| CA_3-7-8-38 | 3, 7, 8, 38 |
| CA_3-7-8-40 | 3, 7, 8, 40 |
| CA_3-7-20-281 | 3, 7, 20, 28 |
| CA_3-7-20-32 | 3, 7, 20, 32 |
| CA_3-7-20-42 | 3, 7, 20, 42 |
| CA_3-7-28-38 | 3, 7, 28, 38 |
| CA_3-7-32-46 | 3, 7, 32, 46 |
| CA_3-8-11-28 | 3, 8, 11, 28 |
| CA_3-8-20-28 | 3, 8, 20, 28 |
| CA_3-19-21-42 | 3, 19, 21, 42 |
| CA_3-20-32-42 | 3, 20, 32, 42 |
| CA_3-20-32-43 | 3, 20, 32, 43 |
| CA_3-21-28-42 | 3, 21, 28, 42 |
| CA_3-28-41-42 | 3, 28, 41, 42 |
| CA_3-32-42-43 | 3, 32, 42, 43 |
| CA_1-3-7-8-20 | 1, 3, 7, 8, 20 |
| CA_1-3-7-20-281 | 1, 3, 7, 20, 28 |
| CA_1-3-7-20-32 | 1, 3, 7, 20, 32 |
| CA_1-3-7-20-42 | 1, 3, 7, 20, 42 |
| CA_1-3-8-11-28 | 1, 3, 8, 11, 28 |
| CA_1-3-20-32-42 | 1, 3, 20, 32, 42 |
| CA_1-3-20-32-43 | 1, 3, 20, 32, 43 |
| CA_1-3-32-42-43 | 1, 3, 32, 42, 43. |

16. The repeater of claim 14, wherein the selected frequency range of the UL signal and the selected frequency range of the DL signal are selected from Third Generation Partnership Project (3GPP) operating band combinations:

| 3GPP LTE Dual-Connectivity Band | 3GPP LTE Band |
|---|---|
| DC_1-3-19 | 1, 3, 19 |
| DC_1-19-21 | 1, 19, 21. |

17. The repeater of claim 1, wherein the second frequency range is a Third Generation Partnership Project (3GPP) frequency division duplex (FDD) band or a 3GPP time division duplex (TDD) band.

18. A repeater comprising:
a first port;
a second port;
a first first-direction filtering and amplification path coupled between the first port and the second port, wherein the first first-direction filtering and amplification path is configured to filter a first-direction signal of a first frequency range;

a first second-direction filtering and amplification path coupled between the first port and the second port, wherein the first second-direction filtering and amplification path is configured to filter a second-direction signal of the first frequency range; and a second second-direction filtering and amplification path coupled between the first port and the second port, wherein the second second-direction filtering and amplification path is configured to filter a second-direction signal of a second frequency range, wherein a first-direction signal of the second frequency range is associated with the first-direction signal of the first frequency range using carrier aggregation (CA) or dual-connectivity to enable information configured for communication on the first-direction signal of the second frequency range to only be communicated on the first-direction signal of the first frequency range without having a second first-direction filtering and amplification path for the first-direction signal of the second frequency range.

19. The repeater of claim 18, wherein a DL output power from an output of the second second-direction filtering and amplification path is less than a threshold, wherein the threshold is one of:
17 decibel-milliwatts (dBm); or
0 decibel-milliwatts (dBm).

20. The repeater of claim 19, wherein the repeater is coupled to a cradle.

21. The repeater of claim 18, wherein the first port is configured to be coupled to a user equipment (UE) via a wired connection.

22. The repeater of claim 18, wherein the first-direction signal of the second frequency range is prohibited by a regulatory body from amplification using one of:
the repeater; or
a consumer signal booster;
wherein the first-direction signal of the second frequency range is prohibited by the regulatory body from amplification using the repeater or the consumer signal booster due to adjacent signal interference with the first-direction signal of the second frequency range.

23. The repeater of claim 18, wherein the second frequency range is a Third Generation Partnership Project (3GPP) frequency division duplex (FDD) band or a 3GPP time division duplex (TDD) band.

24. The repeater of claim 18, wherein the first frequency range and the second frequency range are configured for CA in intra-band CA operating bands selected from Third Generation Partnership Project (3GPP) operating bands:

| 3GPP LTE CA Band | 3GPP LTE Band |
| --- | --- |
| CA_1 | 1 |
| CA_2 | 2 |
| CA_3 | 3 |
| CA_5 | 5 |
| CA_7 | 7 |
| CA_8 | 8 |
| CA_12 | 12 |
| CA_23 | 23 |
| CA_27 | 27 |
| CA_28 | 28 |
| CA_38 | 38 |
| CA_39 | 39 |
| CA_40 | 40 |
| CA_41 | 41 |
| CA_42 | 42 |
| CA_43 | 43 |
| CA_48 | 48 |
| CA_66 | 66 |
| CA_70 | 70. |

25. The repeater of claim 18, wherein the first frequency range and the second frequency range are configured for CA in intra-band CA operating bands selected from Third Generation Partnership Project (3GPP) operating bands:

| NR CA Band | NR Band |
| --- | --- |
| CA_n77 | n77 |
| CA_n78 | n78 |
| CA_n79 | n79 |
| CA_n257B | n257 |
| CA_n257D | n257 |
| CA_n257E | n257 |
| CA_n257F | n257 |
| CA_n257G | n257 |
| CA_n257H | n257 |
| CA_n257I | n257 |
| CA_n257J | n257 |
| CA_n257K | n257 |
| CA_n257L | n257 |
| CA_n257M | n257 |
| CA_n260B | n260 |
| CA_n260C | n260 |
| CA_n260D | n260 |
| CA_n260E | n260 |
| CA_n260F | n260 |
| CA_n260G | n260 |
| CA_n260H | n260 |
| CA_n260I | n260 |
| CA_n260J | n260 |
| CA_n260K | n260 |
| CA_n260L | n260 |
| CA_n260M | n260 |
| CA_n260O | n260 |
| CA_n260P | n260 |
| CA_n260Q | n260 |
| CA_n261B | n261 |
| CA_n261C | n261 |
| CA_n261D | n261 |
| CA_n261E | n261 |
| CA_n261F | n261 |
| CA_n261G | n261 |
| CA_n261H | n261 |
| CA_n261I | n261 |
| CA_n261J | n261 |
| CA_n261K | n261 |
| CA_n261L | n261 |
| CA_n261M | n261 |
| CA_n261O | n261 |
| CA_n261P | n261 |
| CA_n261Q | n261. |

26. The repeater of claim 18, wherein the first frequency range and the second frequency range are configured for CA in CA operating band combinations selected from Third Generation Partnership Project (3GPP) operating band combinations:

| 3GPP LTE CA Band | 3GPP LTE Band |
| --- | --- |
| CA_1-3 | 1, 3 |
| CA_1-1-3 | 1, 3 |
| CA_1-1-5 | 1, 5 |
| CA_1-1-7 | 1, 7 |
| CA_1-1-28 | 1, 28 |
| CA_1-3-3 | 1, 3 |
| CA_1-5 | 1, 5 |

| 3GPP LTE CA Band | 3GPP LTE Band |
|---|---|
| CA_1-7 | 1, 7 |
| CA_1-7-7 | 1, 7 |
| CA_1-8 | 1, 8 |
| CA_1-11 | 1, 11 |
| CA_1-18 | 1, 18 |
| CA_1-19 | 1, 19 |
| CA_1-20 | 1, 20 |
| CA_1-21 | 1, 21 |
| CA_1-26 | 1, 26 |
| CA_1-28 | 1, 28 |
| CA_1-32 | 1, 32 |
| CA_1-38 | 1, 38 |
| CA_1-40 | 1, 40 |
| CA_1-41 | 1, 41 |
| CA_1-42 | 1, 42 |
| CA_1-42-42 | 1, 42 |
| CA_1-43 | 1, 43 |
| CA_1-46 | 1, 46 |
| CA_2-4 | 2, 4 |
| CA_2-2-4 | 2, 4 |
| CA_2-2-4-4 | 2, 4 |
| CA_2-4-4 | 2, 4 |
| CA_2-5 | 2, 5 |
| CA_2-2-5 | 2, 5 |
| CA_2-2-7 | 2, 7 |
| CA_2-7 | 2, 7 |
| CA_2-7-7 | 2, 7 |
| CA_2-12 | 2, 12 |
| CA_2-2-12 | 2, 12 |
| CA_2-2-12-12 | 2, 12 |
| CA_2-2-29 | 2, 29 |
| CA_2-7-46 | 2, 7, 46 |
| CA_2-12-12 | 2, 12 |
| CA_2-13 | 2, 13 |
| CA_2-2-13 | 2, 13 |
| CA_2-14 | 2, 14 |
| CA_2-2-14 | 2, 14 |
| CA_2-17 | 2, 17 |
| CA_2-28 | 2, 28 |
| CA_2-29 | 2, 29 |
| CA_2-30 | 2, 30 |
| CA_2-2-30 | 2, 30 |
| CA_2-46 | 2, 46 |
| CA_2-2-46 | 2, 46 |
| CA_2-46-46 | 2, 46 |
| CA_2-48-48 | 2, 48 |
| CA_2-49 | 2, 49 |
| CA_2-66 | 2, 66 |
| CA_2-48 | 2, 48 |
| CA_2-2-66 | 2, 66 |
| CA_2-2-66-66 | 2, 66 |
| CA_2-66-66 | 2, 66 |
| CA_2-66-66-66 | 2, 66 |
| CA_2-71 | 2, 71 |
| CA_2-2-71 | 2, 71 |
| CA_3-5 | 3, 5 |
| CA_3-7 | 3, 7 |
| CA_3-3-7 | 3, 7 |
| CA_3-3-7-7 | 3, 7 |
| CA_3-7-7 | 3, 7 |
| CA_3-8 | 3, 8 |
| CA_3-3-8 | 3, 8 |
| CA_3-11 | 3, 11 |
| CA_3-18 | 3, 18 |
| CA_3-19 | 3, 19 |
| CA_3-3-19 | 3, 19 |
| CA_3-20 | 3, 20 |
| CA_3-3-20 | 3, 20 |
| CA_3-3-21 | 3, 21 |
| CA_3-3-28 | 3, 28 |
| CA_3-3-41 | 3, 41 |
| CA_3-3-42 | 3, 42 |
| CA_3-21 | 3, 21 |
| CA_3-26 | 3, 26 |
| CA_3-27 | 3, 27 |
| CA_3-28 | 3, 28 |
| CA_3-31 | 3, 31 |
| CA_3-32 | 3, 32 |
| CA_3-38 | 3, 38 |
| CA_3-40 | 3, 40 |
| CA_3-40-40 | 3, 40 |
| CA_3-41 | 3, 41 |
| CA_3-42 | 3, 42 |
| CA_3-42-42 | 3, 42 |
| CA_3-43 | 3, 43 |
| CA_3-46 | 3, 46 |
| CA_3-3-46 | 3, 46 |
| CA_3-69 | 3, 69 |
| CA_4-5 | 4, 5 |
| CA_4-4-5 | 4, 5 |
| CA_4-7 | 4, 7 |
| CA_4-4-7 | 4, 7 |
| CA_4-7-7 | 4, 7 |
| CA_4-12 | 4, 12 |
| CA_4-4-12 | 4, 12 |
| CA_4-4-12-12 | 4, 12 |
| CA_4-12-12 | 4, 12 |
| CA_4-13 | 4, 13 |
| CA_4-4-13 | 4, 13 |
| CA_4-17 | 4, 17 |
| CA_4-27 | 4, 27 |
| CA_4-28 | 4, 28 |
| CA_4-29 | 4, 29 |
| CA_4-4-29 | 4, 29 |
| CA_4-30 | 4, 30 |
| CA_4-4-30 | 4, 30 |
| CA_4-46 | 4, 46 |
| CA_4-46-46 | 4, 46 |
| CA_4-48 | 4, 48 |
| CA_4-71 | 4, 71 |
| CA_4-4-71 | 4, 71 |
| CA_5-5-40 | 5, 40 |
| CA_5-7 | 5, 7 |
| CA_5-7-7 | 5, 7 |
| CA_5-12 | 5, 12 |
| CA_5-12-12 | 5, 12 |
| CA_5-13 | 5, 13 |
| CA_5-17 | 5, 17 |
| CA_5-25 | 5, 25 |
| CA_5-28 | 5, 28 |
| CA_5-29 | 5, 29 |
| CA_5-30 | 5, 30 |
| CA_5-38 | 5, 38 |
| CA_5-40 | 5, 40 |
| CA_5-40-40 | 5, 40 |
| CA_5-41 | 5, 41 |
| CA_5-46 | 5, 46 |
| CA_5-48 | 5, 48 |
| CA_5-66 | 5, 66 |
| CA_5-5-66 | 5, 66 |
| CA_5-66-66 | 5, 66 |
| CA_5-5-66-66 | 5, 66 |
| CA_7-8 | 7, 8 |
| CA_7-7-8 | 7, 8 |
| CA_7-12 | 7, 12 |
| CA_7-20 | 7, 20 |
| CA_7-22 | 7, 22 |
| CA_7-26 | 7, 26 |
| CA_7-7-26 | 7, 26 |
| CA_7-28 | 7, 28 |
| CA_7-7-28 | 7, 28 |
| CA_7-30 | 7, 30 |
| CA_7-32 | 7, 32 |
| CA_7-40 | 7, 40 |
| CA_7-42 | 7, 42 |
| CA_7-42-42 | 7, 42 |
| CA_7-46 | 7, 46 |
| CA_7-7-46 | 7, 46 |
| CA_7-66 | 7, 66 |
| CA_7-66-66 | 7, 66 |
| CA_7-7-66-66 | 7, 66 |
| CA_8-11 | 8, 11 |
| CA_8-20 | 8, 20 |

| 3GPP LTE CA Band | 3GPP LTE Band |
|---|---|
| CA_8-27 | 8, 27 |
| CA_8-28 | 8, 28 |
| CA_8-32 | 8, 32 |
| CA_8-38 | 8, 38 |
| CA_8-39 | 8, 39 |
| CA_8-40 | 8, 40 |
| CA_8-41 | 8, 41 |
| CA_8-42 | 8, 42 |
| CA_8-46 | 8, 46 |
| CA_11-18 | 11, 18 |
| CA_11-26 | 11, 26 |
| CA_11-28 | 11, 28 |
| CA_11-41 | 11, 41 |
| CA_11-42 | 11, 42 |
| CA_11-46 | 11, 46 |
| CA_12-25 | 12, 25 |
| CA_12-30 | 12, 30 |
| CA_12-46 | 12, 46 |
| CA_12-48 | 12, 48 |
| CA_12-48 | 12, 48 |
| CA_12-66 | 12, 66 |
| CA_12-66-66 | 12, 66 |
| CA_13-46 | 13, 46 |
| CA_13-48 | 13, 48 |
| CA_13-48-48 | 13, 48 |
| CA_13-66 | 13, 66 |
| CA_13-66-66 | 13, 66 |
| CA_14-66 | 14, 66 |
| CA_14-66-66 | 14, 66 |
| CA_14-66-66-66 | 14, 66 |
| CA_14-30 | 14, 30 |
| CA_18-281 | 18, 28 |
| CA_18-42 | 18, 42 |
| CA_19-21 | 19, 21 |
| CA_19-282 | 19, 28 |
| CA_19-42 | 19, 42 |
| CA_19-46 | 19, 46 |
| CA_20-281 | 20, 28 |
| CA_20-31 | 20, 31 |
| CA_20-32 | 20, 32 |
| CA_20-38 | 20, 38 |
| CA_20-40 | 20, 40 |
| CA_20-40-40 | 20, 40 |
| CA_20-42 | 20, 42 |
| CA_20-42-42 | 20, 42 |
| CA_20-43 | 20, 43 |
| CA_20-67 | 20, 67 |
| CA_20-75 | 20, 75 |
| CA_20-76 | 20, 76 |
| CA_21-28 | 21, 28 |
| CA_21-42 | 21, 42 |
| CA_21-46 | 21, 46 |
| CA_23-29 | 23, 29 |
| CA_25-26 | 25, 26 |
| CA_25-25-26 | 25, 26 |
| CA_25-41 | 25, 41 |
| CA_25-25-41 | 25, 41 |
| CA_25-46 | 25, 46 |
| CA_26-41 | 26, 41 |
| CA_26-46 | 26, 46 |
| CA_26-48 | 26, 48 |
| CA_26-48-48 | 26, 48 |
| CA_28-32 | 28, 32 |
| CA_28-38 | 28, 38 |
| CA_28-40 | 28, 40 |
| CA_28-41 | 28, 41 |
| CA_28-42 | 28, 42 |
| CA_28-42-42 | 28, 42 |
| CA_28-46 | 28, 46 |
| CA_29-30 | 29, 30 |
| CA_29-66 | 29, 66 |
| CA_29-66-66 | 29, 66 |
| CA_29-70 | 29, 70 |
| CA_30-66 | 30, 66 |
| CA_30-66-66 | 30, 66 |
| CA_32-42 | 32, 42 |
| CA_32-43 | 32, 43 |
| CA_34-39 | 34, 39 |
| CA_34-41 | 34, 41 |
| CA_38-40 | 38, 40 |
| CA_38-40-40 | 38, 40 |
| CA_39-41 | 39, 41 |
| CA_39-40 | 39, 40 |
| CA_39-42 | 39, 42 |
| CA_39-46 | 39, 46 |
| CA_40-41 | 40, 41 |
| CA_40-42 | 40, 42 |
| CA_40-43 | 40, 43 |
| CA_40-46 | 40, 46 |
| CA_41-42 | 41, 42 |
| CA_41-42-42 | 41, 42 |
| CA_41-46 | 41, 46 |
| CA_41-48 | 41, 48 |
| CA_42-43 | 42, 43 |
| CA_42-46 | 42, 46 |
| CA_46-48 | 46, 48 |
| CA_46-48-48 | 46, 48 |
| CA_46-66 | 46, 66 |
| CA_46-46-66 | 46, 66 |
| CA_46-66-66 | 46, 66 |
| CA_46-70 | 46, 70 |
| CA_46-71 | 46, 71 |
| CA_48-66 | 48, 66 |
| CA_48-66-66 | 48, 66 |
| CA_48-66-66-66 | 48, 66 |
| CA_48-48-66 | 48, 66 |
| CA_48-71 | 48, 71 |
| CA_48-48-71 | 48, 71 |
| CA_66-70 | 66, 70 |
| CA_66-66-70 | 66, 70 |
| CA_66-71 | 66, 71 |
| CA_66-66-71 | 66, 71 |
| CA_70-71 | 70, 71. |

27. The repeater of claim 18, wherein the first frequency range and the second frequency range are configured for CA in CA operating band combinations selected from Third Generation Partnership Project (3GPP) operating band combinations:

| 3GPP NR CA Band | 3GPP NR Band |
|---|---|
| CA_n3-n77 | n3, n77 |
| CA_n3-n78 | n3, n78 |
| CA_n3-n79 | n3, n79 |
| CA_n8-n75 | n8, n75 |
| CA n8-n78 | n8, n78 |
| CA_n8-n79 | n8, n79 |
| CA_n28-n75 | n28, n75 |
| CA_n28_n78 | n28, n78 |
| CA_n41-n78 | n41, n78 |
| CA_n75-n78 | n75, n78 |
| CA_n77-n79 | n77, n79 |
| CA_n78-n79 | n78, n79 |
| CA_nX-nY | nX, nY |
| CA_n8-n258 | n8, n258 |
| CA_n71-n257 | n71, n257 |
| CA_n77-n257 | n77, n257 |
| CA_n78-n257 | n78, n257 |
| CA_n79-n257 | n79, n257. |

28. The repeater of claim 18, wherein the first frequency range and the second frequency range are configured for dual-connectivity in operating band combinations selected from Third Generation Partnership Project (3GPP) operating band combinations:

| 3GPP LTE Dual-Connectivity Band | 3GPP LTE Band |
| --- | --- |
| DC_1-3 | 1, 3 |
| DC_1-5 | 1, 5 |
| DC_1-7 | 1, 7 |
| DC_1-8 | 1, 8 |
| DC_1-11 | 1, 11 |
| DC_1-19 | 1, 19 |
| DC_1-20 | 1, 20 |
| DC_1-21 | 1, 21 |
| DC_1-42 | 1, 42 |
| DC_2-4 | 2, 4 |
| DC_2-5 | 2, 5 |
| DC_2-7 | 2, 7 |
| DC_2-12 | 2, 12 |
| DC_2-13 | 2, 13 |
| DC_2-30 | 2, 30 |
| DC_2-66 | 2, 66 |
| DC_3-5 | 3, 5 |
| DC_3-7 | 3, 7 |
| DC_3-8 | 3, 8 |
| DC_3-11 | 3, 11 |
| DC_3-18 | 3, 18 |
| DC_3-19 | 3, 19 |
| DC_3-20 | 3, 20 |
| DC_3-21 | 3, 21 |
| DC_3-26 | 3, 26 |
| DC_3-28 | 3, 28 |
| DC_3-40 | 3, 40 |
| DC_3-42 | 3, 42 |
| DC_4-5 | 4, 5 |
| DC_4-7 | 4, 7 |
| DC_4-12 | 4, 12 |
| DC_4-13 | 4, 13 |
| DC_4-17 | 4, 17 |
| DC_5-7 | 5, 7 |
| DC_5-12 | 5, 12 |
| DC_5-17 | 5, 17 |
| DC_5-30 | 5, 30 |
| DC_5-40 | 5, 40 |
| DC_5-66 | 5, 66 |
| DC_7-8 | 7, 8 |
| DC_7-20 | 7, 20 |
| DC_7-26 | 7, 26 |
| DC_7-28 | 7, 28 |
| DC_8-39 | 8, 39 |
| DC_8-41 | 8, 41 |
| DC_11-18 | 11, 18 |
| DC_11-26 | 11, 26 |
| DC_12-30 | 12, 30 |
| DC_12-66 | 12, 66 |
| DC_19-21 | 19, 21 |
| DC_19-42 | 19, 42 |
| DC_21-42 | 21, 42 |
| DC_21-28 | 21, 28 |
| DC_26-46 | 26, 46 |
| DC_26-48 | 26, 48 |
| DC_28-41 | 28, 41 |
| DC_28-42 | 28, 42 |
| DC_30-66 | 30, 66 |
| DC_39-41 | 39, 41 |
| DC_40-42 | 40, 42 |
| DC_41-42 | 41, 42. |

29. The repeater of claim 18, wherein the first frequency range and the second frequency range are configured for dual-connectivity in operating band combinations selected from Third Generation Partnership Project (3GPP) operating band combinations:

| 3GPP Dual-Connectivity Band | 3GPP LTE Band | 3GPP NR Band |
| --- | --- | --- |
| DC_1_n28 | 1 | n28 |
| DC_1_n40 | 1 | n40 |
| DC_1_n51 | 1 | n51 |
| DC_1_n77 | 1 | n77 |
| DC_1_n78 | 1 | n78 |
| DC_1_n79 | 1 | n79 |
| DC_2_n5 | 2 | n5 |
| DC_2_n66 | 2 | n66 |
| DC_2_n71 | 2 | n71 |
| DC_2_n78 | 2 | n78 |
| DC_3_n7 | 3 | n7 |
| DC_3_n28 | 3 | n28 |
| DC_3_n40 | 3 | n40 |
| DC_3_n51 | 3 | n51 |
| DC_3_n77 | 3 | n77 |
| DC_3_n78 | 3 | n78 |
| DC_3_n79 | 3 | n79 |
| DC_5_n40 | 5 | n40 |
| DC_5_n66 | 5 | n66 |
| DC_5_n78 | 5 | n78 |
| DC_7_n28 | 7 | n28 |
| DC_7_n51 | 7 | n51 |
| DC_7_n78 | 7 | n78 |
| DC_7-7_n78 | CA_7-7 | n78 |
| DC_8_n40 | 8 | n40 |
| DC_8_n77 | 8 | n77 |
| DC_8_n78 | 8 | n78 |
| DC_8_n79 | 8 | n79 |
| DC_11_n77 | 11 | n77 |
| DC_11_n78 | 11 | n78 |
| DC_11_n79 | 11 | n79 |
| DC_12_n5 | 12 | n5 |
| DC_12_n66 | 12 | n66 |
| DC_18_n77 | 18 | n77 |
| DC_18_n78 | 18 | n78 |
| DC_18_n79 | 18 | n79 |
| DC_19_n77 | 19 | n77 |
| DC_19_n78 | 19 | n78 |
| DC_19_n79 | 19 | n79 |
| DC_20_n8 | 20 | n8 |
| DC_20_n28 | 20 | n28 |
| DC_20_n51 | 20 | n51 |
| DC_20_n77 | 20 | n77 |
| DC_20_n78 | 20 | n78 |
| DC_21_n77 | 21 | n77 |
| DC_21_n78 | 21 | n78 |
| DC_21_n79 | 21 | n79 |
| DC_25_n41 | 25 | n41 |
| DC_26_n41 | 26 | n41 |
| DC_26_n77 | 26 | n77 |
| DC_26_n78 | 26 | n78 |
| DC_26_n79 | 26 | n79 |
| DC_28_n51 | 28 | n51 |
| DC_28_n77 | 28 | n77 |
| DC_28_n78 | 28 | n78 |
| DC_28_n79 | 28 | n79 |
| DC_30_n5 | 30 | n5 |
| DC_30_n66 | 30 | n66 |
| DC_38_n78 | 38 | n78 |
| DC_39_n78 | 39 | n78 |
| DC_39_n79 | 39 | n79 |
| DC_40_n77 | 40 | n77 |
| DC_41_n77 | 41 | n77 |
| DC_41_n78 | 41 | n78 |
| DC_41_n79 | 41 | n79 |
| DC_42_n51 | 42 | n51 |
| DC_42_n77 | 42 | n77 |
| DC_42_n78 | 42 | n78 |
| DC_42_n79 | 42 | n79 |
| DC_66_n71 | 66 | n71 |
| DC_66_n5 | 66 | n5 |
| DC_66_n78 | 66 | n78 |
| DC_1_n257 | 1 | n257 |
| DC_2-2_n257 | CA_2-2 | n257 |
| DC_2_n257 | CA_2 | n257 |
| DC_2_n260 | 2 | n260 |
| DC_2_n260 | CA_2 | n260 |
| DC_2-2_n260 | CA_2-2 | n260 |
| DC_3_n257 | 3 | n257 |
| DC_3_n258 | 3 | n258 |
| DC_5_n257 | 5 | n257 |
| DC_5-5_n257 | CA_5-5 | n257 |

-continued

| 3GPP Dual-Connectivity Band | 3GPP LTE Band | 3GPP NR Band |
|---|---|---|
| DC_5-5_n260 | CA_5-5 | n260 |
| DC_5_n260 | 5 | n260 |
| DC_5_n261 | 5 | n261 |
| DC_7-7_n257 | CA_7-7 | n257 |
| DC_7_n257 | 7 | n257 |
| DC_7_n258 | 7 | n258 |
| DC_8_n257 | 8 | n257 |
| DC_8_n258 | 8 | n258 |
| DC_11_n257 | 11 | n257 |
| DC_12_n260 | 12 | n260 |
| DC_13_n257 | 13 | n257 |
| DC_13_n260 | 13 | n260 |
| DC_18_n257 | 18 | n257 |
| DC_19_n257 | 19 | n257 |
| DC_20_n258 | 20 | n258 |
| DC_21_n257 | 21 | n257 |
| DC_26_n257 | 26 | n257 |
| DC_28_n257 | 28 | n257 |
| DC_28_n258 | 28 | n258 |
| DC_30_n260 | 30 | n260 |
| DC_39_n258 | 39 | n258 |
| DC_41_n257 | 41 | n257 |
| DC_41_n258 | 41 | n258 |
| DC_42_n257 | 42 | n257 |
| DC_48-48_n257 | CA_48-48 | n257 |
| DC_48_n257 | CA_48 | n257 |
| DC_48-48_n260 | CA_48-48 | n260 |
| DC_48_n260 | CA_48 | n260 |
| DC_66-66_n257 | CA_66-66 | n257 |
| DC_66_n257 | 66 | n257 |
| DC_66-66_n260 | CA_66-66 | n260 |
| DC_66_n260 | 66 | n260 |
| DC_66_n261 | 66 | n261 |
| DC_n77-n257 | N/A | n77, n257 |
| DC_n78-n257 | N/A | n78, n257 |
| DC_n79-n257 | N/A | n79, n257. |

30. The repeater of claim 18, wherein the first direction is an uplink (UL) direction and the second direction is a downlink (DL) direction.

31. The repeater of claim 18, wherein the first direction is a downlink (DL) direction and the second direction is an uplink (UL) direction.

32. The repeater of claim 18, wherein the first port is a server port and the second port is a donor port.

33. The repeater of claim 18, wherein the first port is a server port that is configured to be coupled to a server antenna that is located inside a structure to provide spatial isolation for the second-direction signal of the second frequency range within the structure, wherein the structure is a building or a vehicle.

34. The repeater of claim 33, wherein the structure is a building or a vehicle.

35. The repeater of claim 18, wherein a downlink (DL) power of the first-direction signal or the second-direction signal is limited to 17 decibel-milliwatts (dBm) equivalent isotropically radiated power (EIRP) to provide spatial isolation for the first-direction signal or the second-direction signal that is a DL signal.

36. The repeater of claim 18, further comprising:
m additional first-direction filtering and amplification paths coupled between the first port and the second port, wherein each first-direction filtering and amplification path is configured to filter a first-direction signal of a selected frequency range; and
n additional second-direction filtering and amplification path coupled between the first port and the second port, wherein each second-direction filtering and amplification path is configured to filter a second-direction signal of a selected frequency range, wherein n is a positive integer and m is an integer greater than or equal to 0 that is less than n.

37. The repeater of claim 36, wherein the selected frequency range of the first-direction signal and the selected frequency range of the second-direction signal are selected from Third Generation Partnership Project (3GPP) operating band combinations:

| 3GPP LTE CA Band | 3GPP LTE Band |
|---|---|
| CA_1-3-5 | 1, 3, 5 |
| CA_1-1-3-5 | 1, 3, 5 |
| CA_1-1-3-7 | 1, 3, 7 |
| CA_1-3-7 | 1, 3, 7 |
| CA_1-3-3-7 | 1, 3, 7 |
| CA_1-3-3-7-7 | 1, 3, 7 |
| CA_1-3-7-7 | 1, 3, 7 |
| CA_1-3-8 | 1, 3, 8 |
| CA_1-3-3-8 | 1, 3, 8 |
| CA_1-3-3-43 | 1, 3, 43 |
| CA_1-3-11 | 1, 3, 11 |
| CA_1-3-18 | 1, 3, 18 |
| CA_1-3-19 | 1, 3, 19 |
| CA_1-3-3-19 | 1, 3, 19 |
| CA_1-3-20 | 1, 3, 20 |
| CA_1-3-3-20 | 1, 3, 20 |
| CA_1-3-21 | 1, 3, 21 |
| CA_1-3-3-21 | 1, 3, 21 |
| CA_1-3-26 | 1, 3, 26 |
| CA_1-3-28 | 1, 3, 28 |
| CA_1-3-3-28 | 1, 3, 28 |
| CA_1-1-3-28 | 1, 3, 28 |
| CA_1-3-32 | 1, 3, 32 |
| CA_1-3-38 | 1, 3, 38 |
| CA_1-3-40 | 1, 3, 40 |
| CA_1-3-41 | 1, 3, 41 |
| CA_1-3-42 | 1, 3, 42 |
| CA_1-3-3-42 | 1, 3, 42 |
| CA_1-3-43 | 1, 3, 43 |
| CA_1-3-46 | 1, 3, 46 |
| CA_1-5-7 | 1, 5, 7 |
| CA_1-5-7-7 | 1, 5, 7 |
| CA_1-5-40 | 1, 5, 40 |
| CA_1-5-41 | 1, 5, 41 |
| CA_1-5-46 | 1, 5, 46 |
| CA_1-7-8 | 1, 7, 8 |
| CA_1-7-7-8 | 1, 7, 8 |
| CA_1-7-20 | 1, 7, 20 |
| CA_1-7-26 | 1, 7, 26 |
| CA_1-7-7-26 | 1, 7, 26 |
| CA_1-7-28 | 1, 7, 28 |
| CA_1-7-32 | 1, 7, 32 |
| CA_1-7-40 | 1, 7, 40 |
| CA_1-7-42 | 1, 7, 42 |
| CA_1-7-46 | 1, 7, 46 |
| CA_1-8-11 | 1, 8, 11 |
| CA_1-8-20 | 1, 8, 20 |
| CA_1-8-28 | 1, 8, 28 |
| CA_1-8-38 | 1, 8, 38 |
| CA_1-8-40 | 1, 8, 40 |
| CA_1-11-18 | 1, 11, 18 |
| CA_1-11-28 | 1, 11, 28 |
| CA_1-18-28 | 1, 18, 28 |
| CA_1-18-42 | 1, 18, 42 |
| CA_1-19-21 | 1, 19, 21 |
| CA_1-19-28 | 1, 19, 28 |
| CA_1-19-42 | 1, 19, 42 |
| CA_1-20-28 | 1, 20, 28 |
| CA_1-20-32 | 1, 20, 32 |
| CA_1-20-42 | 1, 20, 42 |
| CA_1-20-43 | 1, 20, 43 |
| CA_1-21-28 | 1, 21, 28 |
| CA_1-21-42 | 1, 21, 42 |
| CA_1-28-40 | 1, 28, 40 |
| CA_1-28-42 | 1, 28, 42 |
| CA_1-32-42 | 1, 32, 42 |
| CA_1-32-43 | 1, 32, 43 |
| CA_1-41-42 | 1, 41, 42 |
| CA_1-42-42 | 1, 42, 42 |

| 3GPP LTE CA Band | 3GPP LTE Band |
| --- | --- |
| CA_1-42-43 | 1, 42, 43 |
| CA_2-4-5 | 2, 4, 5 |
| CA_2-2-4-5 | 2, 4, 5 |
| CA_2-4-4-5 | 2, 4, 5 |
| CA_2-4-12-12 | 2, 4, 12 |
| CA_2-5-12-12 | 2, 5, 12 |
| CA_2-2-5-30 | 2, 5, 30 |
| CA_2-5-46 | 2, 5, 46 |
| CA_2-5-66 | 2, 5, 66 |
| CA_2-2-7-12 | 2, 7, 12 |
| CA_2-2-7-66 | 2, 7, 66 |
| CA_2-7-66-66 | 2, 7, 66 |
| CA_2-2-12-30 | 2, 12, 30 |
| CA_2-2-12-66 | 2, 12, 66 |
| CA_2-2-12-66-66 | 2, 12, 66 |
| CA_2-2-13-66 | 2, 13, 66 |
| CA_2-2-14-66-66 | 2, 14, 66 |
| CA_2-2-30-66 | 2, 30, 66 |
| CA_2-4-7 | 2, 4, 7 |
| CA_2-4-7-7 | 2, 4, 7 |
| CA_2-4-12 | 2, 4, 12 |
| CA_2-2-4-12 | 2, 4, 12 |
| CA_2-2-5-66-66 | 2, 5, 66 |
| CA_2-4-4-12 | 2, 4, 12 |
| CA_2-4-13 | 2, 4, 13 |
| CA_2-4-28 | 2, 4, 28 |
| CA_2-4-29 | 2, 4, 29 |
| CA_2-4-30 | 2, 4, 30 |
| CA_2-4-71 | 2, 4, 71 |
| CA_2-2-4-71 | 2, 4, 71 |
| CA_2-5-7 | 2, 5, 7 |
| CA_2-5-12 | 2, 5, 12 |
| CA_2-2-5-12 | 2, 5, 12 |
| CA_2-5-13 | 2, 5, 13 |
| CA_2-5-28 | 2, 5, 28 |
| CA_2-5-29 | 2, 5, 29 |
| CA_2-5-30 | 2, 5, 30 |
| CA_2-5-46 | 2, 5, 46 |
| CA_2-5-66 | 2, 5, 66 |
| CA_2-5-66-66 | 2, 5, 66 |
| CA_2-7-12 | 2, 7, 12 |
| CA_2-7-28 | 2, 7, 28 |
| CA_2-7-30 | 2, 7, 30 |
| CA_2-7-46 | 2, 7, 46 |
| CA_2-7-66 | 2, 7, 66 |
| CA_2-7-7-66 | 2, 7, 66 |
| CA_2-12-30 | 2, 12, 30 |
| CA_2-12-66 | 2, 12, 66 |
| CA_2-12-66-66 | 2, 12, 66 |
| CA_2-13-46 | 2, 13, 46 |
| CA_2-13-48 | 2, 13, 48 |
| CA_2-13-48-48 | 2, 13, 48 |
| CA_2-13-66 | 2, 13, 66 |
| CA_2-13-66-66 | 2, 13, 66 |
| CA_2-14-30 | 2, 14, 30 |
| CA_2-2-14-30 | 2, 14, 30 |
| CA_2-14-66 | 2, 14, 66 |
| CA_2-2-14-66 | 2, 14, 66 |
| CA_2-14-66-66 | 2, 14, 66 |
| CA_2-14-66-66-66 | 2, 14, 66 |
| CA_2-2-29-30 | 2, 29, 30 |
| CA_2-29-30 | 2, 29, 30 |
| CA_2-29-66 | 2, 29, 66 |
| CA_2-30-66 | 2, 30, 66 |
| CA_2-30-66-66 | 2, 30, 66 |
| CA_2-46-48 | 2, 46, 48 |
| CA_2-46-66 | 2, 46, 66 |
| CA_2-46-46-66 | 2, 46, 66 |
| CA_2-48-66 | 2, 48, 66 |
| CA_2-48-48-66 | 2, 48, 66 |
| CA_2-66-71 | 2, 66, 71 |
| CA_2-2-66-71 | 2, 66, 71 |
| CA_2-66-66-71 | 2, 66, 71 |
| CA_3-5-7 | 3, 5, 7 |
| CA_3-5-7-7 | 3, 5, 7 |
| CA_3-5-28 | 3, 5, 28 |
| CA_3-5-40 | 3, 5, 40 |
| CA_3-5-40-40 | 3, 5, 40 |
| CA_3-5-41 | 3, 5, 41 |
| CA_3-3-7-8 | 3, 7, 8 |
| CA_3-3-7-7-8 | 3, 7, 8 |
| CA_3-7-7-8 | 3, 7, 8 |
| CA_3-7-8 | 3, 7, 8 |
| CA_3-7-20 | 3, 7, 20 |
| CA_3-3-7-20 | 3, 7, 20 |
| CA_3-7-26 | 3, 7, 26 |
| CA_3-7-7-26 | 3, 7, 26 |
| CA_3-7-28 | 3, 7, 28 |
| CA_3-3-7-28 | 3, 7, 28 |
| CA_3-7-32 | 3, 7, 32 |
| CA_3-7-38 | 3, 7, 38 |
| CA_3-7-40 | 3, 7, 40 |
| CA_3-7-42 | 3, 7, 42 |
| CA_3-7-46 | 3, 7, 46 |
| CA_3-8-11 | 3, 8, 11 |
| CA_3-8-20 | 3, 8, 20 |
| CA_3-8-28 | 3, 8, 28 |
| CA_3-8-32 | 3, 8, 32 |
| CA_3-8-38 | 3, 8, 38 |
| CA_3-8-40 | 3, 8, 40 |
| CA_3-11-18 | 3, 11, 18 |
| CA_3-11-26 | 3, 11, 26 |
| CA_3-11-28 | 3, 11, 28 |
| CA_3-18-42 | 3, 18, 42 |
| CA_3-19-21 | 3, 19, 21 |
| CA_3-3-19-21 | 3, 19, 21 |
| CA_3-19-42 | 3, 19, 42 |
| CA_3-20-281 | 3, 20, 28 |
| CA_3-3-20-28 | 3, 20, 28 |
| CA_3-20-32 | 3, 20, 32 |
| CA_3-20-42 | 3, 20, 42 |
| CA_3-20-43 | 3, 20, 43 |
| CA_3-21-28 | 3, 21, 28 |
| CA_3-21-42 | 3, 21, 42 |
| CA_3-28-38 | 3, 28, 38 |
| CA_3-28-40 | 3, 28, 40 |
| CA_3-28-41 | 3, 28, 41 |
| CA_3-28-42 | 3, 28, 42 |
| CA_3-28-42-42 | 3, 28, 42 |
| CA_3-32-42 | 3, 32, 42 |
| CA_3-32-43 | 3, 32, 43 |
| CA_3-32-46 | 3, 32, 46 |
| CA_3-41-42 | 3, 41, 42 |
| CA_3-41-42-42 | 3, 41, 42 |
| CA_3-42-43 | 3, 42, 43 |
| CA_4-5-12 | 4, 5, 12 |
| CA_4-4-5-12 | 4, 5, 12 |
| CA_4-5-12-12 | 4, 5, 12 |
| CA_4-5-13 | 4, 5, 13 |
| CA_4-5-29 | 4, 5, 29 |
| CA_4-5-30 | 4, 5, 30 |
| CA_4-4-5-30 | 4, 5, 30 |
| CA_4-7-12 | 4, 7, 12 |
| CA_4-7-28 | 4, 7, 28 |
| CA_4-12-30 | 4, 12, 30 |
| CA_4-4-12-30 | 4, 12, 30 |
| CA_4-29-30 | 4, 29, 30 |
| CA_4-4-29-30 | 4, 29, 30 |
| CA_5-7-28 | 5, 7, 28 |
| CA_5-7-46 | 5, 7, 46 |
| CA_5-12-46 | 5, 12, 46 |
| CA_5-12-48 | 5, 12, 48 |
| CA_5-12-66 | 5, 12, 66 |
| CA_5-30-66 | 5, 30, 66 |
| CA_5-30-66-66 | 5, 30, 66 |
| CA_5-40-41 | 5, 40, 41 |
| CA_5-46-66 | 5, 46, 66 |
| CA_7-8-20 | 7, 8, 20 |
| CA_7-8-38 | 7, 8, 38 |
| CA_7-8-40 | 7, 8, 40 |
| CA_7-12-66 | 7, 12, 66 |
| CA_7-20-28 | 7, 20, 28 |
| CA_7-20-32 | 7, 20, 32 |
| CA_7-20-38 | 7, 20, 38 |

-continued

| 3GPP LTE CA Band | 3GPP LTE Band |
|---|---|
| CA_7-20-42 | 7, 20, 42 |
| CA_7-28-38 | 7, 28, 38 |
| CA_7-28-40 | 7, 28, 40 |
| CA_7-30-66 | 7, 30, 66 |
| CA_7-32-46 | 7, 32, 46 |
| CA_7-46-66 | 7, 46, 66 |
| CA_8-11-28 | 8, 11, 28 |
| CA_8-20-28 | 8, 20, 28 |
| CA_8-28-41 | 8, 28, 41 |
| CA_8-39-41 | 8, 39 , 41 |
| CA_12-30-66 | 12, 30, 66 |
| CA_12-30-66-66 | 12, 30, 66 |
| CA_13-46-66 | 13, 46, 66 |
| CA_13-48-66 | 13, 48, 66 |
| CA_13-48-48-66 | 13, 48, 66 |
| CA_14-30-66 | 14, 30, 66 |
| CA_14-30-66-66 | 14, 30, 66 |
| CA_19-21-42 | 19, 21, 42 |
| CA_20-32-42 | 20, 32, 42 |
| CA_20-32-43 | 20, 32, 43 |
| CA_20-38-40 | 20, 38, 40 |
| CA_25-26-41 | 25, 26, 41 |
| CA_25-25-26-41 | 25, 26, 41 |
| CA_20-38-40-40 | 20, 38, 40 |
| CA_21-28-42 | 21, 28, 42 |
| CA_29-30-66-66 | 29, 30, 66 |
| CA_20-38-40 | 20, 38, 40 |
| CA_28-41-42 | 28, 41, 42 |
| CA_28-41-42-42 | 28, 41, 42 |
| CA_29-30-66 | 29, 30, 66 |
| CA_29-46-66 | 29, 46, 66 |
| CA_29-66-70 | 29, 66, 70 |
| CA_29-66-66-70 | 29, 66, 70 |
| CA_32-42-43 | 32, 42, 43 |
| CA_46-48-66 | 46, 48, 66 |
| CA_46-48-71 | 46, 48, 71 |
| CA_46-48-48-71 | 46, 48, 71 |
| CA_66-70-71 | 66, 70, 71 |
| CA_1-3-5-7 | 1, 3, 5, 7 |
| CA_1-3-5-7-7 | 1, 3, 5, 7 |
| CA_1-3-5-40 | 1, 3, 5, 40 |
| CA_1-3-5-41 | 1, 3, 5, 41 |
| CA_1-3-7-7-26 | 1, 3, 7, 26 |
| CA_1-3-7-8 | 1, 3, 7, 8 |
| CA_1-3-3-7-8 | 1, 3, 7, 8 |
| CA_1-3-7-7-8 | 1, 3, 7, 8 |
| CA_1-3-3-7-7-8 | 1, 3, 7, 8 |
| CA_1-3-7-20 | 1, 3, 7, 20 |
| CA_1-3-7-26 | 1, 3, 7, 26 |
| CA_1-3-7-28 | 1, 3, 7, 28 |
| CA_1-3-7-7-28 | 1, 3, 7, 28 |
| CA_1-3-7-32 | 1, 3, 7, 32 |
| CA_1-3-7-40 | 1, 3, 7, 40 |
| CA_1-3-7-42 | 1, 3, 7, 42 |
| CA_1-3-8-11 | 1, 3, 8, 11 |
| CA_1-3-8-20 | 1, 3, 8, 20 |
| CA_1-3-8-28 | 1, 3, 8, 28 |
| CA_1-3-8-38 | 1, 3, 8, 38 |
| CA_1-3-11-28 | 1, 3, 11, 28 |
| CA_1-3-8-40 | 1, 3, 8, 40 |
| CA_1-3-18-42 | 1, 3, 18, 42 |
| CA_1-3-19-21 | 1, 3, 19, 21 |
| CA_1-3-19-42 | 1, 3, 19, 42 |
| CA_1-3-20-28 | 1, 3, 20, 28 |
| CA_1-3-3-20-28 | CA_1-3-3-20-28 |
| CA_1-3-20-32 | 1, 3, 20, 32 |
| CA_1-3-20-42 | 1, 3, 20, 42 |
| CA_1-3-20-43 | 1, 3, 20, 43 |
| CA_1-3-21-28 | 1, 3, 21, 28 |
| CA_1-3-21-42 | 1, 3, 21, 42 |
| CA_1-3-28-42 | 1, 3, 28, 42 |
| CA_1-3-32-42 | 1, 3, 32, 42 |
| CA_1-3-32-43 | 1, 3, 32, 43 |
| CA_1-3-41-42 | 1, 3, 41, 42 |
| CA_1-3-42-43 | 1, 3, 42, 43 |
| CA_1-5-7-46 | 1, 5, 7, 46 |
| CA_1-7-8-20 | 1, 7, 8, 20 |
| CA_1-7-8-40 | 1, 7, 8, 40 |
| CA_1-7-20-28 | 1, 7, 20, 28 |
| CA_1-7-20-32 | 1, 7, 20, 32 |
| CA_1-7-20-42 | 1, 7, 20, 42 |
| CA_1-8-11-28 | 1, 8, 11, 28 |
| CA_1-8-20-28 | 1, 8, 20, 28 |
| CA_1-19-21-42 | 1, 19, 21, 42 |
| CA_1-20-32-42 | 1, 20, 32, 42 |
| CA_1-20-32-43 | 1, 20, 32, 43 |
| CA_1-21-28-42 | 1, 21, 28, 42 |
| CA_1-32-42-43 | 1, 32, 42, 43 |
| CA_2-2-5-12-66 | 2, 5, 12, 66 |
| CA_2-2-5-30-66 | 2, 5, 30, 66 |
| CA_2-2-7-12-66 | 2. 7, 12, 66 |
| CA_2-2-12-30-66 | 2, 12, 30, 66 |
| CA_2-2-14-30-66 | 2, 14, 30, 66 |
| CA_2-4-5-12 | 2, 4, 5, 12 |
| CA_2-4-5-29 | 2, 4, 5, 29 |
| CA_2-4-5-30 | 2, 4, 5, 30 |
| CA_2-4-7-12 | 2, 4, 7, 12 |
| CA_2-4-12-30 | 2, 4, 12, 30 |
| CA_2-4-29-30 | 2, 4, 29, 30 |
| CA_2-5-7-28 | 2, 5, 7, 28 |
| CA_2-5-12-66 | 2, 5, 12, 66 |
| CA_2-5-30-66 | 2, 5, 30, 66 |
| CA_2-5-30-66-66 | 2, 5, 30, 66 |
| CA_2-7-12-66 | 2, 7, 12, 66 |
| CA_2-7-46-66 | 2, 7, 46, 66 |
| CA_2-12-30-66 | 2, 12, 30, 66 |
| CA_2-12-30-66-66 | 2, 12, 30, 66 |
| CA_2-13-48-66 | 2, 13, 48, 66 |
| CA_2-14-30-66 | 2, 14, 30, 66 |
| CA_2-14-30-66-66 | 2, 14, 30, 66 |
| CA_2-29-30-66 | 2, 29, 30, 66 |
| CA_2-46-48-66 | 2, 46, 48, 66 |
| CA_3-7-8-20 | 3, 7, 8, 20 |
| CA_3-7-8-38 | 3, 7, 8, 38 |
| CA_3-7-8-40 | 3, 7, 8, 40 |
| CA_3-7-20-28 | 3, 7, 20, 28 |
| CA_3-7-20-32 | 3, 7, 20, 32 |
| CA_3-7-20-42 | 3, 7, 20, 42 |
| CA_3-7-28-38 | 3, 7, 28, 38 |
| CA_3-7-32-46 | 3, 7, 32, 46 |
| CA_3-8-11-28 | 3, 8, 11, 28 |
| CA_3-8-20-28 | 3, 8, 20, 28 |
| CA_3-19-21-42 | 3, 19, 21, 42 |
| CA_3-20-32-42 | 3, 20, 32, 42 |
| CA_3-20-32-43 | 3, 20, 32, 43 |
| CA_3-21-28-42 | 3, 21, 28, 42 |
| CA_3-28-41-42 | 3, 28, 41, 42 |
| CA_3-32-42-43 | 3, 32, 42, 43 |
| CA_1-3-7-8-20 | 1, 3, 7, 8, 20 |
| CA_1-3-7-20-28 | 1, 3, 7, 20, 28 |
| CA_1-3-7-20-32 | 1, 3, 7, 20, 32 |
| CA_1-3-7-20-42 | 1, 3, 7, 20, 42 |
| CA_1-3-8-11-28 | 1, 3, 8, 11, 28 |
| CA_1-3-20-32-42 | 1, 3, 20, 32, 42 |
| CA_1-3-20-32-43 | 1, 3, 20, 32, 43 |
| CA_1-3-32-42-43 | 1, 3, 32, 42, 43. |

38. The repeater of claim 37, wherein the selected frequency range of the first-direction signal and the selected frequency range of the second-direction signal are selected from Third Generation Partnership Project (3GPP) operating band combinations:

| 3GPP LTE Dual-Connectivity Band | 3GPP LTE Band |
|---|---|
| DC_1-3-19 | 1, 3, 19 |
| DC_1-19-21 | 1, 19, 21. |

39. A repeater comprising:
a server port;
a donor port;
a first uplink (UL) filtering and amplification path coupled between the server port and the donor port, wherein the first UL filtering and amplification path is configured to filter an UL signal of a first frequency range;
a first downlink (DL) filtering and amplification path coupled between the server port and the donor port, wherein the first DL filtering and amplification path is configured to filter a DL signal of the first frequency range; and
a second DL filtering and amplification path coupled between the server port and the donor port, wherein the second DL filtering and amplification path is configured to filter a DL signal of a second frequency range,
wherein an UL signal of the second frequency range is associated with the UL signal of the first frequency range using carrier aggregation (CA) or dual-connectivity to enable information configured for communication on the UL signal of the second frequency range to only be communicated on the UL signal of the first frequency range without having a second UL filtering and amplification path for the UL signal of the second frequency range,
wherein a DL output power from an output of the second DL filtering and amplification path is less than a threshold,
wherein the threshold is one of:
17 decibel-milliwatts (dBm); or
0 dBm.

40. The repeater of claim 1, wherein:
the first frequency range comprises one or more of Third Generation Partnership Project (3GPP) long-term evolution (LTE) frequency bands 1 through 85 or a channel within bands 1 through 85; and
the second frequency range comprises one or more of 3GPP LTE frequency bands 1 through 85 or a channel within bands 1 through 85;
the first frequency range comprises one or more of 3GPP fifth generation (5G) frequency bands 1 through 86 or 257 through 261 or a channel within bands 1 through 86 or 256 through 261; or
the second frequency range comprises one or more of 3GPP 5G frequency bands 1 through 86 or 257 through 261 or a channel within bands 1 through 86 or 257 through 261.

41. The repeater of claim 18, wherein:
the first frequency range comprises one or more of a Third Generation Partnership Project (3GPP) long-term evolution (LTE) frequency band or channel within bands 1 through 85;
the second frequency range comprises one or more of a 3GPP LTE frequency band or channel within bands 1 through 85;
the first frequency range comprises one or more of a 3GPP fifth generation (5G) frequency band or channel within bands 1 through 86 or 257 through 261; or
the second frequency range comprises one or more of a 3GPP 5G frequency band or channel within bands 1 through 86 or 257 through 261.

\* \* \* \* \*